US012441669B2

(12) United States Patent
De Ruiter et al.

(10) Patent No.: US 12,441,669 B2
(45) Date of Patent: Oct. 14, 2025

(54) PC$_{NHC}$P METAL COMPLEXES AND USES THEREOF

(71) Applicant: Technion Research & Development Foundation Ltd., Haifa (IL)

(72) Inventors: Graham De Ruiter, Haifa (IL); Subhash Garhwal, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 471 days.

(21) Appl. No.: 18/042,752

(22) PCT Filed: Aug. 22, 2021

(86) PCT No.: PCT/IL2021/051024
§ 371 (c)(1),
(2) Date: Feb. 23, 2023

(87) PCT Pub. No.: WO2022/043993
PCT Pub. Date: Mar. 3, 2022

(65) Prior Publication Data
US 2023/0322647 A1     Oct. 12, 2023

Related U.S. Application Data

(60) Provisional application No. 63/181,562, filed on Apr. 29, 2021, provisional application No. 63/069,395, filed on Aug. 24, 2020.

(51) Int. Cl.
| | | |
|---|---|---|
| C07C 5/25 | (2006.01) | |
| B01J 31/12 | (2006.01) | |
| B01J 31/22 | (2006.01) | |
| B01J 31/24 | (2006.01) | |
| C07B 59/00 | (2006.01) | |
| C07F 15/02 | (2006.01) | |

(52) U.S. Cl.
CPC .......... C07C 5/2575 (2013.01); B01J 31/121 (2013.01); B01J 31/2273 (2013.01); B01J 31/2452 (2013.01); C07B 59/00 (2013.01); C07F 15/02 (2013.01); B01J 2231/32 (2013.01); B01J 2231/42 (2013.01); B01J 2531/0244 (2013.01); B01J 2531/842 (2013.01); C07B 2200/05 (2013.01); C07C 2523/745 (2013.01)

(58) Field of Classification Search
CPC .................................................. C07C 5/2575
USPC ....................................................... 548/103
See application file for complete search history.

(56) References Cited

FOREIGN PATENT DOCUMENTS

WO     2016019038 A1     2/2016

OTHER PUBLICATIONS

Bauer at al; "Iron Catalysis in Organic Synthesis" Chemical Reviews 115 pp. 3170-3387. (2015).
Lutz et al; "Two-State Reactivity in Iron-Catalyzed Alkene Isomerization Confers σ-Base Resistance" Journal of the American Chemical Society 142 pp. 15527-15535. (2020).
Manna et al; "High molecular weight poly(lactic acid) produced by an efficient iron catalyst bearing a bis(amidinato)-N-heterocyclic carbene ligand" Polyhedron 84, pp. 160-167. (2014).
Massad et al; "Stereoselective Access to Fully Substituted Aldehyde-Derived Silyl Enol Ethers by Iridium-Catalyzed Alkene Isomerization" Angewandte Chemie International Edition 59, 1pp. 5549-15553. (2020).
Mayer et al; "Iron-Catalyzed Isomerizations of Olefins" ChemCatChem 3, pp. 1567-1571. (2011).
Miyaura et al; "Palladium-Catalyzed Cross-Coupling Reactions of Organoboron Compounds" Chemical Reviews, 95, pp. 2457-2483. (1995).
Mokhtarzadeh et al; "Synthesis and Protonation of an Encumbered Iron Tetraisocyanide Dianion" Inorganic Chemistry 54, pp. 5579-5587. (2015).
Molloy et al; "Positional and Geometrical Isomerisation of Alkenes: The Pinnacle of Atom Economy" Angewandte Chemie International Edition 58, pp. 13654-13664. (2019).
Morris "Mechanisms of the H2- and transfer hydrogenation of polar bonds catalyzed by iron group hydrides" Dalton Transactions 47, pp. 10809-10826. (2018).
Mukherjee et al; "Homogeneous Catalysis by Cobalt and Manganese Pincer Complexes" ACS Catalysis 8, pp. 11435-11469. (2018).
Obligacion et al; "Cobalt Catalyzed Z-Selective Hydroboration of Terminal Alkynes and Elucidation of the Origin of Selectivity" Journal of the American Chemical Society137 pp. 5855-5858. (2015).
Palmer et al ; "Cobalt-Catalyzed Stereoretentive Hydrogen Isotope Exchange of C(sp3)-H Bonds" ACS Catalysis. 7, pp. 5674-5678. (2017).
Parkin "Applications of deuterium isotope effects for probing aspects of reactions involving oxidative addition and reductive elimination of H—H and C—H bonds" Journal of Labelled Compounds and Radiopharmaceuticals 50, pp. 1088-1114. (2007).
Peruzzini et al Elsevier, pp. 1-578. (2001).
Plikhta et al; "ward New Organometallic Architectures: Synthesis of Carbene-Centered Rhodium and Palladium Bisphosphine Complexes. Stability and Reactivity of [PCBImPRh(L)][PF6] Pincers" Inorganic Chemistry 54, pp. 9517-9528. (2015).
Pony et al; "Iron-catalysed tritiation of pharmaceuticals" Nature 529, pp. 195-199. (2016).
Pospech et al; "Alternative Metals for Homogeneous Catalyzed Hydroformylation Reaction" Angewandte Chemie International Edition 52, pp. 2852-2872 . (2013).
Prechtl et al; "H/D Exchange at Aromatic and Heteroaromatic Hydrocarbons Using D2O as the Deuterium Source and Ruthenium Dihydrogen Complexes as the Catalyst" Angewandte Chemie 46, pp. 2269-2272. (2007).

(Continued)

Primary Examiner — Taofiq A Solola
(74) Attorney, Agent, or Firm — Knobbe, Martens, Olson & Bear, LLP

(57) ABSTRACT

PC$_{NHC}$P pincer metal complexes are useful as catalysts in various chemical reactions such as hydrogen isotope exchange (HIE) in C(sp$^3$)-H and/or C(sp$^2$)-H bond of an organic compound, e.g., a pharmaceutically active compound. The complexes are also useful in hydroboration of alkynes with excellent selectivity; and alkene isomerization with high stereo- and regioselectivity.

35 Claims, 1 Drawing Sheet

(56) References Cited

OTHER PUBLICATIONS

Rivada-Wheelaghan et al; "CZ-Selective (Cross-)Dimerization of Terminal Alkynes Catalyzed by an Iron Complex" ngewandte Chemie International Edition 55, pp. 6942-6945. (2016).

Schild et al; "Light Enhanced Fe-Mediated Nitrogen Fixation: Mechanistic Insights Regarding H2 Elimination, HER, and NH3 Generation" ACS Catalysys 9, pp. 4286-4295. (2019).

Steinke et al; "Noninnocent Behavior of Ancillary Ligands: Apparent Trans Coupling of a Saturated N-Heterocyclic Carbene Unit with an Ethyl Ligand Mediated by Nickel" American Chemical Society 131, pp. 10461-10466. (2009).

Sternberg et al; "Chemistry and Catalytic Properties of the Iron Pentacarbonyl-Aqueous Alkali System" Chemical Society 78, pp. 5704-5705. (1956).

Sternberg et al; "Binuclear Iron Carbonyls and Their Significance as Catalytic Intermediates" Chemical Society 79, pp. 6116-6121. (1957).

Subramaniyan et al; "Facile synthesis of Pd(ii) and Ni(iI) pincer carbene complexes by the double C—H bond activation of a new hexahydropyrimidine-based bis(phosphine): catalysis of C—N couplings" Dalton Transactions . 48, pp. 7203-7210. (2019).

Sung et al; "Synthesis and reactivity of a PC carbene p. cobalt (i) complex: the missing link in the cobalt PXP pincer series (X=B, C, N)" Chemical Science 9, pp. 8234-8241. (2018).

Suzuki Cross-Coupling Reactions of Organoboranes: An Easy Way to Construct C—C Bonds (Nobel Lecture) Angewandte Chemie International Edition 50, pp. 6722-6737. (2011).

Tooley et al; "Olefin Isomerization Catalysis by Heterobimetallic Hydrides, HFeM(CO)8L- (M = Cr, Mo, W; L = CO, PR3" Journal of American Chemistry society 107, pp. 2422-2427. (1985).

Wang et al; "The Golden Age of Transfer Hydrogenation" Chemical Reviews 115, pp. 6621-6686. (2015).

Wang et al; "An Agostic Iridium Pincer Complex as a Highly Efficient and Selective Catalyst for Monoisomerization of 1-Alkenes to trans-2-Alkenes" Angewandte Chemie International Edition 56, pp. 1614-1618. (2017).

Wen et al; "Recent advances in tridentate iron and cobalt complexes for alkene and alkyne hydrofunctionalizations" Coordination Chemistry Reviews alkyne hydrofunctionalizations 386. pp. 138-153. (2019).

Wiedner et al; "Thermodynamic Hydricity of Transition Metal Hydrides" Chemical Reviews 16, pp. 8655-8692.(2016).

Yang et al; "Site-Selective Nickel-Catalyzed Hydrogen Isotope Exchange in N-Heterocycles and Its Application to the Tritiation of Pharmaceuticals" ACS Catalysis 8, pp. 10210-10218. (2018).

Yu et al; "The Reactivity Patterns of Low-Coordinate Iron-Hydride Complexes" Journal of the American Chemical Society 130, pp. 6624-6638. (2008).

Yu et al; "Synthesis of Iron Hydride Complexes Relevant to Hydrogen Isotope Exchange in Pharmaceuticals" Journal of the American Chemical Society 36 pp. 4341-4343. (2017).

Yu et al; "Iron-Catalyzed Tunable and Site-Selective Olefin Transposition" Journal of the American Chemical Society 142, pp. 18223-18230. (2020).

Zarate et al ; "Ni(I)-X Complexes Bearing a Bulky α-Diimine Ligand: Synthesis, Structure, and Superior Catalytic Performance in the Hydrogen Isotope Exchange in Pharmaceuticals" Journal of the American Chemical Society 141, pp. 5034-5044. (2019).

Zhang et al; "Versatile Regioselective Deuteration of Indoles via Transition-Metal-Catalyzed H/D Exchange" ACS Catalysis 10 pp. 7486-7494. (2020).

Nakamura et al; "Managing the scarcity of chemical elements" nature materials 10 pp. 158-161. (2011).

Zhang et al "Luminescent Di- and Tetranuclear Gold Complexes of Bis(diphenylphosphinyl)-Functionalized Dipyrido-Annulated N-Heterocyclic Carbene" Inorganic Chemistry 58 pp. 6328-6335. (2019).

Garhwal et al: "Z-Selective Alkyne Functionalization Catalyzed by a Trans-Dihydride N-Heterocyclic Carbene (NHC) Iron Complex" Inorganic Chemistry pp. 13817-1382. (2020).

Garhwal et al; "Facile H/D Exchange at (Hetero)Aromatic Hydrocarbons Catalyzed by a Stable Trans-Dihydride N-Heterocyclic Carbene (NHC) Iron Complex" Journal of the American Chemical Society 142, pp. 17131-17139. (2020).

Garhwal et al; "Part per million levels of an anionic iron hydride complex catalyzes selective alkene isomerization via two-state reactivity" Chem Catalysis 1, pp. 631-647. (2021).

International Search Report Issued in International Application No. PCT/IL2021/051024, mailed on Nov. 14, 2021.

Alig et al; "First-Row Transition Metal (De)Hydrogenation Catalysis Based on Functional Pincer LigandsS"., Chemical Reviews. 119, pp. 2681-2751. (2019).

Atzrodt et al; Deuterium- and Tritium-Labelled Compounds: Applications in the Life Sciences: Angewandte Chemie International Edition. 57, pp. 1758-1784. (2018).

Baker et al; "Magnetic Circular Dichroism and Density Functional Theory Studies of Iron(II)-Pincer Complexes: Insight into Electronic Structure and Bonding Effects of Pincer NHeterocyclic Carbene Moieties." Organometallics 35, pp. 3692-3700. (2016).

Bauer et al; "Recent developments of iron pincer complexes for catalytic applications" Inorganic Chemistry Frontiers 3, pp. 741-765. (2016).

Beach et al; "Carbonyl-Amplified Catalyst Performance: Balancing Stability against Activity for Five-Coordinate Ruthenium Hydride and Hydridocarbonyl Catalysts" Organometallics 28, pp. 441-447. (2009).

Brown et al; "Synthesis and Applications of Vinylic Organoborane" Aldrichim. Acta 14, pp. 3-11. (1981).

Brown et al; "Ammonia Activation by a Nickel NCN-Pincer Complex featuring a Non-Innocent N-Heterocyclic Carbene: Ammine and Amido Complexes in Equilibrium" Angewandte Chemie International Edition 54, pp. 6274-6277. (2015).

Brunet "Tetracarbonylhydridoferrates, MHFe(C0)4: Versatile Tools in Organic Synthesis and Catalysis" Chemical Reviews 90, pp. 1041-1059. (1990).

Camp et al; "Selecting Double Bond Positions with a Single Cation-Responsive Iridium Olefin Isomerization Catalyst" Journal of the American Chemical Society 143, pp. 2792-2800. (2021).

Carney et al; "Recent Advances of Manganese Catalysis for Organic Synthesis" European Journal of Organic Chemistry pp. 3912-3929. (2016).

Chen et al; "Z-Selective Alkene Isomerization by High-Spin Cobalt(II) Complexes" Journal of the American Chemical Society 136, pp. 945-955. (2014).

Cramer et al; "The Mechanism of Isomerization of Olefins with Transition Metal Catalysts" Journal of the American Chemical Society 88,pp. 3534-354. (1966).

Crossley et al; "Simple, Chemoselective, Catalytic Olefin Isomerization" Journal of the American Chemical Society 136 pp. 16788-16791. (2014).

Crossley et al; "Mn-, Fe-, and Co-Catalyzed Radical Hydrofunctionalizations of Olefins" Chemical Reviews , 116, pp. 8912-9000. (2016).

De-Botton et al; "Regioselective Isomerization of Terminal Alkenes Catalyzed by a PC(sp3)Pincer Complex with a Hemilabile Pendant Arm" ChemCatChem 12, pp. 5959-5965. (2020).

Dröge et al; "The Measure of All Rings—N-Heterocyclic Carbenes" Angewandte Chemie International Edition 49, pp. 6940-6952. (2010).

Eizawa et al; "Remarkable catalytic activity of dinitrogen-bridged dimolybdenum complexes bearing NHC-based PCP-pincer ligands toward nitrogen fixation" Nature Communications 8, 14874. (2017).

Elmore "The Use of Isotopically Labeled Compounds in Drug Discovery" Academic Press,pp. 515-534. (2009).

Fuku-En et al; "Synthesis and Application of New Dipyrido-annulated N-Heterocyclic Carbene with Phosphorus Substitue" Chemistry Letters 43, pp. 468-470. (2014).

Fürstner "Iron Catalysis in Organic Synthesis: A Critical Assessment of What It Takes to Make This Base Metal a Multitasking Champion" ACS Central Science 2, pp. 778-789. (2016).

Gorgas et al; "ighly Efficient and Selective Hydrogenation of Aldehydes: A Well-Defined Fe(II) Catalyst Exhibits Noble-Metal Activity" ACS Catalysis 6,pp. 2664-2672. (2016).

Gorgas et al; "Stable, Yet Highly Reactive Nonclassical Iron(II) Polyhydride Pincer Complexes: Z-Selective Dimerization and

(56) References Cited

OTHER PUBLICATIONS

Hydroboration of Terminal Alkynes". Journal of the American Chemical Society 139, pp. 8130-8133. (2017).
Gorgas et al; "Isoelectronic Manganese and Iron Hydrogenation/Dehydrogenation Catalysts: Similarities and Divergences" Accounts of Chemical Research 51, pp. 1558-1569. (2018).
Gorgas et al; "Iron(II) Bis(acetylide) Complexes as Key Intermediates in the Catalytic Hydrofunctionalization of Terminal Alkynes" ACS Catalysis 8, pp. 7973-7982. (2018).
Green et al; "The High Chemofidelity of Metal-Catalyzed Hydrogen Atom Transfer" Accounts of Chemical Research 51, pp. 2628-2640. (2018).
Gunanathan et al; "Ruthenium Catalyzed Hydroboration of Terminal Alkynes to Z-Vinylboronates" Journal of the American Chemical Society 134, pp. 14349-14352. (2012).
Gutsulyak et al; "Activation of Water, Ammonia, and Other Small Molecules by PCcarbeneP Nickel Pincer Complexes" Journal of the American Chemical Society 135, pp. 11776-11779. (2013).
Harris et al; "Redox-Active Bis(phenolate) N-Heterocyclic Carbene [OCO] Pincer Ligands Support Cobalt Electron Transfer Series Spanning Four Oxidation States" Inorganic Chemistry 56, pp. 12421-12435. (2017).
Harris et al; "Photoinduced Cobalt(III)-Trifluoromethyl Bond Activation Enables Arene C-H Trifluoromethylation" Angewandte Chemie International Edition 57, pp. 1311-1315. (2018).
Hartwig "Organotransition Metal Chemistry: From Bonding to Catalysis" University Science Books. (2010).
Holland "Reaction: Opportunities for Sustainable Catalysts" Chem 2, pp. 443-444. (2017).
Jennerjahn et al; "Benign Catalysis with Iron: Unique Selectivity in Catalytic Isomerization Reactions of Olefins" ChemSusChem 5, pp. 734-739. (2012).
Jiang et al; "Nickel, Ruthenium, and Rhodium NCN-Pincer Complexes Featuring a Six-Membered N-Heterocyclic Carbene Central Moiety and Pyridyl Pendant Arms" Organometallics 37, pp. 1123-1132. (2018).
Jones "Isotope Effects in C—H Bond Activation Reactions by Transition Metals" Accounts of chemical Research C 36, pp. 140-146. (2003).
Junge et al; "Cobalt-Pincer Complexes in Catalysis" Chemistry of European Journal 25, pp. 122-143. (2019).
Kapat et al; "E-Olefins through intramolecular radical relocation" Science 363, pp. 391-396 (2019).
Kaplan et al; "Synthesis and Characterization of a Bis(imino)-N-heterocyclic Carbene Analogue to Bis(imino)pyridine Iron Complexes" Organometallics 31, pp. 7343-7350. (2012).
Katsnelson "Heavy drugs draw heavy interest from pharma backers" Nature Medicine 19, pp. 656-656. (2013).
Kim et al; "Highly Z-Selective Double Bond Transposition in Simple Alkenes and Allylarenes through a Spin-Accelerated Allyl Mechanism" Journal of the American Chemical Society 143, pp. 3070-3074. (2021).
Kumar et al; "Dehydrogenation of n-Alkanes by Solid-Phase Molecular Pincer-Iridium Catalysts. High Yields of α-Olefin Product" Journal of the American Chemical Society 137, pp. 9894-9911. (2017).
Langer et al; "Efficient Hydrogenation of Ketones Catalyzed by an Iron Pincer Complex" Angewandte Chemie International 50, pp. 2120-2124. (2011).
Langer et al; "Low-Pressure Hydrogenation of Carbon Dioxide Catalyzed by an Iron Pincer Complex Exhibiting Noble Metal Activity "Angewandte Chemie International Edition 50, pp. 9948-9952. (2011).
Larionov et al; "Well-defined transition metal hydrides in catalytic isomerizati" Chem Commun 50,pp. 9816-9826. (2014).
Larsen et al; "Stereoselective Alkene Isomerization over One Position"Journal of the American Chemical Society, 136, pp. 10357-10360. (2012).
Larsen et al; "General Catalyst Control of the Monoisomerization of 1-Alkenes to Journal of the American Chemical Societytrans-2-Alkenes" 136 pp. 1226-1229. (2014).
Lenges et al; Synthesis, Structure, and Reactivity of [C5Me5COLL'] Complexes with L = Pyridine and L'= Olefin or L-L'=Bipyridine Organometallics 19, pp. 1247-1254. (2000).
Li et al; "Radical Isomerization and Cycloisomerization Initiated by H• Transfer" Journal of the American Chemical Society 138, pp. 7698-7704. (2016).
Liu et al; "Manganese-Catalyzed C-H Activation" ACS Catalysis 6, pp. 3743-3752. (2016).
Liu et al; "Base-Metal-Catalyzed Olefin Isomerization Reactions" Synthesis 51, pp. 1293-1310. (2019).
Ludwig et al; "Catalyst: Sustainable Catalysis" Chem 2, pp. 313-316. (2017).

PC$_{NHC}$P METAL COMPLEXES AND USES THEREOF

TECHNICAL FIELD

The present invention provides PC$_{NHC}$P pincer metal complexes which are useful as catalysts in various reactions such as hydrogen isotope exchange of C(sp$^3$)-H and/or C(sp$^2$)-H bonds in organic compounds; hydroboration of alkynes with excellent regio- and stereoselectivity; and alkene isomerization with high stereo- and regioselectivity.

BACKGROUND

Driven by their pre-eminent two-electron chemistry, the predictable reactivity and selectivity of precious metals have made them the premier choice as catalysts in many synthetic processes (Cornils et al., 2017; Hartwig, 2010). The growing environmental, economic, and geopolitical concerns associated with using precious metals, in conjunction with their limited availability, are strong incentives to rethink current strategies and establish more environmental friendly alternatives (Ludwig and Schindler, 2017; Nakamura and Sato, 2011). One such methodology relies on using earth-abundant metals such as cobalt (Hapke and Hilt, 2020), manganese (Carney et al., 2016; Liu and Ackermann, 2016) and in particular iron (Fürstner, 2016; Bauer and Knölker, 2015), as catalyst for a variety of organic transformations (Gebbink and Moret, 2019). Indeed, during the past decade we have seen a resurgence of using earth-abundant metals in homogenous catalysis. One of the main reasons behind this resurgence is our ability to utilize the unique properties of earth-abundant metals (e.g., spin-state reactivity) via elaborate ligand designs (Fritz and Schneider, 2019; Holland, 2017).

From the wide variety of available ligand architectures, pincer-type ligands have contributed tremendously to the development of earth-abundant metal catalysis (Junge et al., 2019; Alig et al., 2019; Farrell and Albrecht, 2016). The most commonly encountered structural motifs within this set of ligands are those featuring an XNX (X=NR, PR$_2$, P(OR)$_2$) pincer type geometry with a central amino or pyridine donor (Junge et al., 2019; Alig et al., 2019; Farrell and Albrecht, 2016; Wen et al., 2019; Mukherjee and Milstein, 2018; Gorgas and Kirchner, 2018; Bauer and Hu, 2016). In contrast, earth-abundant metal pincer complexes presenting a carbene as central donor are virtually absent from the literature (Jiang et al., 2018; Harris et al., 2017; Brown et al., 2015; Kaplan et al., 2012), in particular those containing a PC$_{NHC}$P type geometry (Subramaniyan et al., 2019; Sung et al., 2018; Gutsulyak et al., 2013; Steinke et al., 2009). Their absence is quite surprising as carbenes often impart distinct electronic and steric properties to the metal center (Dröge and Glorius, 2010). For instance, when comparing PCP versus PNP pincer complexes of the 2$^{nd}$ and 3$^{rd}$ row transition metals, the PCP complexes featuring a central N-heterocyclic carbene (NHC) typically bind stronger to the metal center (Eizawa et al., 2017; Plikhta et al., 2015), while simultaneously increasing its electron density (Baker et al., 2016), benefitting catalyst stability and reactivity (Eizawa et al., 2017).

Yet, despite these advantages no catalytic activity of iron, cobalt or manganese PC$_{NHC}$P pincer complexes have been reported (Harris et al., 2018; Manna et al., 2014), while synthetic methodologies to access these complexes for iron are currently lacking (Sung et al., 2018). Considering these limitations, developing NHC-centered phosphine-functionalized pincer complexes could hold great benefits for iron-based catalysis, especially when containing metal-hydrides (Morris, 2018; Yu et al., 2017; Gorgas et al., 2017; Gorgas et al., 2016; Langer et al., 2011a; Langer et al., 2011b; Yu et al., 2008).

SUMMARY OF INVENTION

In one aspect, the present invention provides a metal complex of formula I:

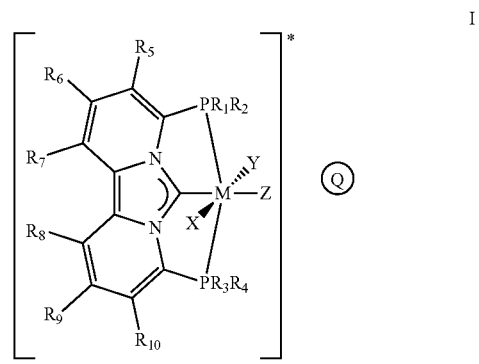

wherein:

$R_1$, $R_2$, $R_3$, and $R_4$ each independently is selected from (C$_1$-C$_{18}$)alkyl, (C$_2$-C$_{18}$)alkenyl, (C$_3$-C$_7$)cycloalkyl, —O—(C$_1$-C$_{18}$)alkyl, (C$_3$-C$_{12}$)heterocyclyl, a 6-14-membered aryl, a 5-10-membered heteroaryl; or $R_1$ and $R_2$, and/or $R_3$ and $R_4$, together with the phosphorus atom to which they are attached form a heterocyclic ring optionally containing one or more heteroatoms selected from O, N, or S;

$R_5$, $R_6$, $R_7$, $R_8$, $R_9$, and $R_{10}$ each independently is selected from H, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, a 5-10-membered heteroaryl, —CF$_3$, —OR, —SR, or —NRR', or any two of adjacent $R_5$, $R_6$, $R_7$, $R_8$, $R_9$, and $R_{10}$ together with the carbon atoms to which they are attached form a 5-14-membered ring optionally containing one or more heteroatoms selected from O, N, or S;

M is an earth-abundant metal such as iron (Fe), manganese (Mn), nickel (Ni), cobalt (Co), scandium (Sc), titanium (Ti), vanadium (V), chromium (Cr), copper (Cu), bismuth (Bi), and zinc (Zn), having an oxidation state selected from −2, −1, 0, +1, +2, +3, +4, +5, and +6;

X, Y and Z each independently is selected from H, deuterium (D), tritium (T), N$_2$, CO, NO, N$_2$O, (C$_1$-C$_{18}$)alkyl, (C$_2$-C$_{18}$)alkenyl, (C$_3$-C$_7$)cycloalkyl, —O—(C$_1$-C$_{18}$)alkyl, (C$_3$-C$_{12}$)heterocyclyl, a 6-14-membered aryl, a 5-10-membered heteroaryl, halogen, azide (N$_3^-$), cyanide (CN$^-$), cyanate (OCN—), isocyanide (RNC), isocyanate (RNCO), thiocyanate (SCN—), isothiocyanate (RNCS), sulfide (S$^{2-}$), oxo (O$^{2-}$), peroxo (R—O—O), hydroperoxo (H—O—O—), superoxide (O$_2^-$), —NRR', —SR, or a coordinating solvent; or one of X, Y and Z is selected from H, D and T, and the other two of X, Y and Z form a bidentate ligand;

R and R' each independently is selected from H, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, a 5-10-membered heteroaryl, or a trialkylsilyl such as trimethylsilyl;

Q is an optional counter ion; and the asterisk represents an optional net charge of said metal complex which depends on the oxidation state of said metal and the groups X, Y and Z, provided that at least one of X, Y and Z, preferably two of X, Y and Z, more preferably X and Y, each independently is selected from H, D, and T.

In another aspect, the present invention provides a metal complex of formula II:

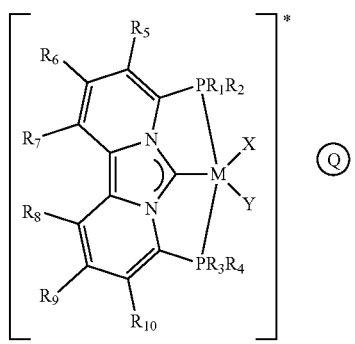

wherein $R_1$, $R_2$, $R_3$, and $R_4$ each independently is selected from $(C_1-C_{18})$alkyl, $(C_2-C_{18})$alkenyl, $(C_3-C_7)$cycloalkyl, —O—$(C_1-C_{18})$alkyl, $(C_3-C_{12})$heterocyclyl, a 6-14-membered aryl, a 5-10 membered heteroaryl; or $R_1$ and $R_2$, and/or $R_3$ and $R_4$, together with the phosphorus atom to which they are attached form a heterocyclic ring optionally containing one or more heteroatoms selected from O, N, or S;

$R_5$, $R_6$, $R_7$, $R_8$, $R_9$, and $R_{10}$ each independently is selected from H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, —$CF_3$, —OR, —SR, or —NRR', or any two of adjacent $R_5$, $R_6$, $R_7$, $R_8$, $R_9$, and $R_{10}$ together with the carbon atoms to which they are attached form a 5-14-membered ring optionally containing one or more heteroatoms each independently selected from O, N or S;

M is an earth-abundant metal such as Fe, Mn, Ni, Co, Sc, Ti, V, Cr, Cu, Bi, and Zn, having an oxidation state selected from −2, −1, 0, +1, +2, +3, +4, +5, and +6;

X and Y each independently is selected from H, D, T, $N_2$, CO, NO, $N_2O$, $(C_1-C_{18})$alkyl, $(C_2-C_{15})$alkenyl, $(C_3-C_7)$cycloalkyl, —O—$(C_1-C_{18})$alkyl, $(C_3-C_{12})$heterocyclyl, a 6-14-membered aryl, a 5-10-membered heteroaryl, halogen, azide ($N_3^-$), cyanide ($CN^-$), cyanate ($OCN^-$), isocyanide (RNC), isocyanate (RNCO), thiocyanate ($SCN^-$), isothiocyanate (RNCS), sulfide ($S^{2-}$), oxo ($O^{2-}$), peroxo (R—O—$O^-$), hydroperoxo (H—O—$O^-$), superoxide ($O_2^-$), —NRR', —SR, or a coordinating solvent, e.g., wherein one of X and Y is H, D, or T, preferably H; or X and Y form a bidentate ligand;

R and R' each independently is selected from H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, or a trialkylsilyl such as trimethylsilyl;

Q is an optional counter ion; and the asterisk represents an optional net charge of said metal complex which depends on the oxidation state of said metal and the groups X and Y.

The specific metal complexes exemplified herein are all iron or manganese complexes and identified as complexes/catalysts $I_1$, $I_2$, $I_3$, $I_4$, $I_5$, $I_6$, $I_7$, $I_8$, $I_9$, and $I_{10}$ (formula I); and complexes/catalysts $II_1$, $II_2$, $II_3$, $II_4$, $II_5$, and $II_6$ (formula II) (see Table 1). Complex $I_1$ is also referred to herein as complex 2 or [$(PC_{NHC}P)FeCl_2$)]; complex $I_2$ is also referred to herein as complex 3 or [$(PC_{NHC}P)Fe(D)_2N_2$)]; complex $I_3$ is also referred to herein as [$(PC_{NHC}P)Mn(CO)_2(H)$]; complex $I_4$ is also referred to herein as [$(PC_{NHC}P)Mn(CO)_2(D)$]; complex $I_5$ is also referred to herein as [$(PC_{NHC}P)FeH_3$][Na]; complex $I_6$ is also referred to herein as [$(PC_{NHC}P)FeD_3$][Na]; complex $I_7$ is also referred to herein as complex 4 or [$(PC_{NHC}P)Fe(H)(\eta^2-H_2Bpin)$]; complex $I_8$ is also referred to herein as [$(PC_{NHC}P)Fe(D)(\eta^2-H_2Bpin)$]; complex $I_9$ is also referred to herein as complex 5 or [$(PC_{NHC}P)Fe(H)(\eta^2-H_2BH_2)$]; and complex $I_{10}$ is also referred to herein as [$PC_{NHC}P)Fe(D)(\eta^2-H_2BH_2)$]. Complex $II_1$ is also referred to herein as complex 1 or [$(PC_{NHC}P)FeCl_2$)]; complex $II_2$ is also referred to herein as complex 9 or [$(PC_{NHC}P)Fe(N_2)_2$)]; complex $II_3$ is also referred to herein as complex 10 or [$(PC_{NHC}P)Fe(H)(N_2)$][Na]; complex $II_4$ is also referred to herein as [$(PC_{NHC}P)Fe(p-Tol)_2N_2$]; complex $II_5$ is also referred to herein as [$(PC_{NHC}P)Fe(Cl)(p-Tol)$]; and complex $II_6$ is also referred to herein as [$(PC_{NHC}P)Fe(Br)(p-Tol)$].

In yet another aspect, the present invention provides a composition comprising a metal complex of the formula I or II, each as defined above, e.g., a metal complex selected from complexes $I_1$, $I_2$, $I_3$, $I_4$, $I_5$, $I_6$, $I_7$, $I_8$, $I_9$, $I_{10}$, $II_1$, $II_2$, $II_3$, $II_4$, $II_5$, and $II_6$.

In a further aspect, the present invention relates to a method for hydrogen isotope exchange (HIE) of $C(sp^3)$-H and/or $C(sp^2)$-H bond in an organic compound, to thereby replace the hydrogen atom in said $C(sp^3)$-H bond and/or said $C(sp^2)$-H bond with either deuterium (H/D exchange) or tritium (H/T exchange), said method comprising reacting said organic compound with a metal complex of the formula I as defined above, e.g., a metal complex selected from complexes $I_1$, $I_2$, $I_3$, $I_4$, $I_5$, $I_6$, $I_7$, $I_8$, $I_9$, and $I_{10}$, in the presence of a deuterium or tritium source, respectively, wherein said organic compound being optionally substituted with a group selected from halogen, pseudohalogen, —OR, —SR, —NRR', —B(OR)$_2$, —BR$_2$—SiR$_3$, —Si(OR)$_3$, —CO—O—R—, —O—CO—R—, —CO—NRR', =O, =S, —CHO, —CO—SR, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, wherein R and R' each independently is selected from H, $(C_1-C_{18})$alkenyl, $(C_2-C_{18})$alkenyl, $(C_3-C_7)$cycloalkyl, $(C_3-C_{12})$heterocyclyl, a 6-14-membered aryl, and a 5-10-membered heteroaryl.

In yet a further aspect, the present invention relates to methods for alkene isomerization with high stereo- and regioselectivity, by reacting said alkene with a metal complex of the formula II as defined above, e.g., a metal complex selected from complexes $II_1$, $II_2$, $II_3$, $II_4$, $II_5$, and $II_6$, but preferably wherein one of X and Y is H, D, or T, e.g., H.

In one particular such aspect, the method disclosed is for isomerization of a 1-alkene to 2-alkene, and comprises reacting said 1-alkene with a metal complex of the formula II as defined above, e.g., the metal complex $II_3$, in a solvent, wherein said alkene being optionally substituted with one or more substituents each independently selected from $(C_1-C_{18})$alkyl, $(C_2-C_{18})$alkenyl, $(C_3-C_7)$cycloalkyl, halogen, —OR, —SR, —NRR', —B(OR)$_2$, —BR$_2$—SiR$_3$, —Si(OR)$_3$—CHO, —O—CO—R, —CO—O—

R, —CO—NRR', —NR—CO—R, =O, =S, ($C_3$-$C_{12}$) heterocyclyl, a 6-14-membered aryl, a 5-10-membered heteroaryl, an electron withdrawing group such as —$NO_2$, —$CF_3$ and —$C_6F_6$; and R and R' each independently selected from H, ($C_1$-$C_{18}$)alkyl, ($C_2$-$C_{18}$)alkenyl, ($C_3$-$C_7$)cycloalkyl, ($C_3$-$C_{12}$)heterocyclyl, a 6-14-membered aryl, a 5-10-membered heteroaryl, or a trialkylsilyl such as trimethylsilyl.

In another particular such aspect, the method disclosed is for isomerization of an alkene substituted at a terminal position thereof with an aryl, e.g., a 6-14-membered aryl, to thereby perform double bond migration by one or more positions towards said aryl, and comprises reacting said alkene with a metal complex of the formula II as defined above, e.g., the metal complex $II_3$, in a solvent,
wherein said alkene and said aryl each independently being optionally substituted with one or more substituents each independently selected from ($C_1$-$C_{18}$)alkyl, ($C_2$-$C_{18}$)alkenyl, ($C_3$-$C_7$)cycloalkyl, halogen, —OR, —SR, —NRR', —B(OR)$_2$, —BR$_2$—SiR$_3$, —Si(OR)$_3$, —CHO, —O—CO—R, —CO—O—R, —CO—NRR', —NR—CO—R, =O, =S, ($C_3$-$C_{12}$)heterocyclyl, a 6-14-membered aryl, a 5-10-membered heteroaryl, an electron withdrawing group such as —$NO_2$, —$CF_3$ and —$C_6F_6$; and R and R' each independently selected from H, ($C_1$-$C_{18}$)alkyl, ($C_2$-$C_{18}$)alkenyl, ($C_3$-$C_7$)cycloalkyl, ($C_3$-$C_{12}$)heterocyclyl, a 6-14-membered aryl, a 5-10-membered heteroaryl, or a trialkylsilyl such as trimethylsilyl.

DETAILED DESCRIPTION OF INVENTION

Figure 1:
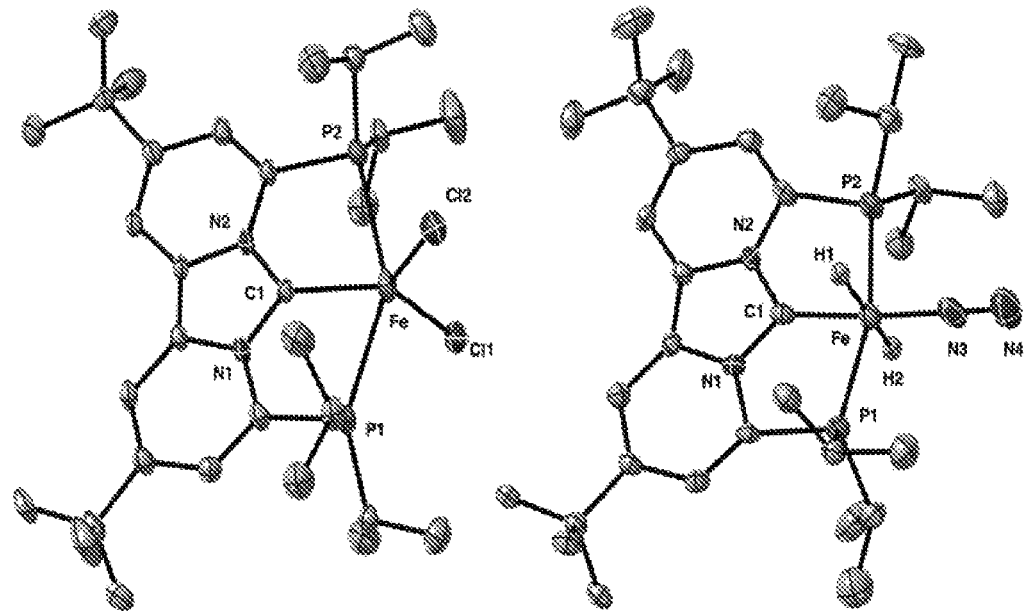
FIG. 1 shows solid state structures of complex 1 (left) and complex 2 (right). Thermal ellipsoids are shown at the 30% probability level. Hydrogen atoms and co-crystallized solvent molecules are omitted for clarity.

Disclosed herein is the synthesis and characterization of the $PC_{NHC}P$ pincer complex [($PC_{NHC}P$)$FeCl_2$)] (1), that upon exposure to 2.2 equiv. of $NaBHEt_3$ generates the trans-dihydride iron(II) dinitrogen complex [$PC_{NHC}P$)Fe(H)$_2N_2$)](2). As shown in Study 1 herein, iron complex 2 is highly stable at room temperature and does not readily reductively eliminate $H_2$ upon exposure to $N_2$, which is a commonly observed pathway for other trans-dihydride iron (II) complexes lacking π-acidic CO ligands. The equatorial $N_2$ ligand in 2 is readily displaced under catalytic conditions enabling hydrogen/deuterium (H/D) exchange at (hetero) aromatic hydrocarbons with benzene-$d_6$ as deuterium source. Deuterium incorporation typically exceeds 90% and is generally regioselective for sterically accessible C($sp^2$)-H bonds unless overriding electronic effects are present. Computational studies indicate that a σ-bond metathesis pathway is mainly responsible for the observed HIE (data not shown). Generally, the reaction occurs under mild conditions ($N_2$, 50° C.), and is tolerant of a wide variety of functional groups including, ethers, esters, amides, halides, and heterocycles. Furthermore, the robustness and stability of the catalyst disclosed holds great potential for other organic transformations that rely on hydride transfer or those that focus on small molecule activation. To the best of our knowledge, complex 2 is one of the very few iron-based catalysts capable of catalytic H/D exchange at heteroaromatics using a readily available deuterium source.

The transition metal catalyzed hydroboration of unsaturated C—C, C—N and C—O bonds is a powerful synthetic method in synthetic organic chemistry. To illustrate, the hydroboration of terminal alkynes offers an atom economical route towards vinylboronate esters that are important starting materials in a diverse set of organic transformations.[2] Because the addition of the borane is typically syn with respect to the C≡C bond, product selectivity commonly favors the more stable (E)-vinylboronate. Accessing the (Z)-vinylboronate is challenging and has mainly been reported with noble metal catalysts like ruthenium, rhodium or iridium. Recent studies, however, have shown that earth-abundant metals can also facilitate the Z-selective hydroboration of terminal alkynes. For instance, Chirik and co-workers reported the first example of an earth-abundant cobalt catalyst capable of Z-selective hydrobration (Obligacion et al., 2015). Kirchner and co-workers reported a non-classical iron polyhydride catalyst [Fe(PNP)(H)$_2$($\eta^2$-$H_2$)] that also showed near exclusive selectivity for the corresponding (Z)-vinylboronate (Gorgas et al., 2017). Interestingly, a few years earlier, Leitner and co-workers reported a similar ruthenium complex [Ru(PNP)(H)$_2$($\eta^2$-$H_2$)] that also showed comparable Z-selectivity.

As demonstrated in Study 2, the stable trans-dihydride iron complex 2 facilitates the hydroboration of alkynes with excellent Z-selectivity. The reaction occurs at room temperature; exhibits a reasonable functional group tolerance that includes halides, ethers, esters, and heteroaromatics; and is selective for the corresponding (Z)-vinylboronate. Interestingly, the corresponding (E)-vinylboronates could also be exclusively accessed by the same catalyst, via isomerization of the formed (Z)-vinylboronate, by simply increasing the reaction temperature to 50° C. Isotope labeling experiments suggest a mechanism most-likely based on a formal syn-hydrometalation of an alkynylboronate intermediate. Additional experiment established that complex 2 was not only active for alkyne hydroboration, but also for Z-selective alkyne homo-dimerization. Although the substrate scope was not as extensive as for the hydroboration, these experiments demonstrate that earth-abundant metal complexes based on the $PC_{NHC}P$ pincer platform disclosed herein can exhibit diverse reactivity. Complex 2 thus presents a dual alkyne functionalization strategy that, in particular for alkyne hydroboration, exhibits a good substrate scope and functional group tolerance (e.g., esters, ethers, halides).

The numerous occurrences of carbon-carbon double bonds in natural products have resulted in a variety of methodologies for synthesizing these important skeletal building blocks. While these methodologies have proven to be highly successful for the synthesis of terminal alkenes, the synthesis of internal alkenes is more challenging primarily due to difficulties in controlling the resulting stereo- and regioselectivity. Although some methods are available for their (E)/(Z)-selective synthesis, the positional isomerization of terminal alkenes is a desirable alternative, because of its perfect atom economy. Typically catalyzed by transition metals, alkene isomerization generally offers good control over both regio- and stereoselectivity. To illustrate, Grotjahn and co-workers reported the first example of a highly active ruthenium catalyst that was selective for the one-bond isomerization of a variety of terminal alkenes (Larsen et al., 2014; Larsen and Grotjahn, 2012). Encompassing Grothjahn's seminal contribution, Huang and co-workers recently reported an unusual iridium pincer complex that showed exceptional activity in the selective isomerization of 1-alkenes to 2-alkenes (TON=19,000; TOF=~500 h$^{-1}$) (Wang et al., 2017). Besides selective one-bond transposition, selective two-bond transposition has also been reported by Miller and co-workers using a sodium responsive iridium catalyst (Camp et al., 2021).

As evident from the above-mentioned examples, the current state-of-the-art in alkene isomerization is defined by precious metals that includes ruthenium, iridium, and palladium. Yet, current efforts in alkene isomerization are shifting towards more sustainable methodologies that are based on earth-abundant metals (Liu et al., 2019).

In recent years, many exciting new discoveries have been reported in earth-abundant metal catalyzed alkene isomerization, although progress is dependent on the metal center (vide infra). For nickel for example, Schoenebeck and co-workers recently reported a bimetallic Ni(I) catalyst that was able to isomerize a variety of alkenes via a radical 1,3-H-atom shift (Kapat et al., 2019). Moving to the left on the periodic table, Shenvi and co-workers demonstrated efficient alkene isomerization with a cobalt-salen complex that proceeded via an unusual hydrogen atom abstraction mechanism from a metal hydride (MHAT) (Crossley et al., 2014; Crossley et al., 2016; Green et al., 2018). Likewise, hallmark studies by Norton and co-workers also pointed toward an MHAT mechanism for the one bond alkene isomerization of 1,1-disubstituted alkenes that is catalyzed by a cobaloxime catalyst (Li et al., 2016). Holland and co-workers on the other hand, reported Z-selective alkene isomerization via an allyl type mechanism that is catalyzed by a sterically demanding high-spin Co(II) diketiminate complex (Chen et al., 2014). Follow-up studies by the same group showed that with a modified cobalt catalyst the observed stereoselectivity correlates with the spin-state of the metal complex via a spin-accelerated allyl-type mechanism (Kim et al., 2021). After these captivating contributions many more important examples of cobalt catalyzed alkene isomerization reactions have been reported in recent years. For iron, on the other hand, surprisingly little progress has been made in the last ten years (Yu et al., 2020; Jennerjahn et al., 2012; Mayer et al., 2011). The lack of progress might be attributed to the limited availability of bespoke iron ligands that are able to support the metal center along the reaction manifold (e.g., alkyl vs. allyl vs. radical type) (Lutz et al., 2020). As a result, ligand free isomerization protocols typically require high temperatures, or high catalyst loadings in combination with stoichiometric amounts of additives. Even under these conditions the resulting stereoselectivity remains far from ideal, in particular for linear aliphatic alkenes. In order to elevate earth-abundant metals to the same prominence as their noble-metal counterparts, there thus remains a clear need for developing bespoke iron complexes with tailor-made ligands that are able to facilitate alkene isomerization with noble metal activity.

Study 3 demonstrates the synthesis and characterization of a rare anionic iron(0) monohydride complex [(PC$_{NHC}$P)Fe(H)(N$_2$)][Na] (10) that is stabilized by PC$_{NHC}$P pincer framework. As shown, complex 10 catalyzes the selective isomerization of 1-alkenes to 2-alkenes with high stereo- and regioselectivity, i.e., may achieve alkene isomerization with noble metal efficiency. Isomerization occurs at room temperature with catalyst loading as low as 6 parts-per-million (ppm; 0.0006 mol %). At these catalyst loadings, turn-over number (TON) of 160,000 are obtained with turn-over frequency (TOF) up to 6,600 per hour. A series of experimental and computational studies confirm that alkene isomerization occurs via an alkyl-type mechanism. Iron complex 10 tolerates a wide set of functional groups (e.g., esters, amides, ethers) and selectively isomerizes the double bond over one-position with high stereo-selectivity (E/Z≥10:1). To the best of our knowledge, not only is [(PC$_{NHC}$P)Fe(H)N$_2$]$^-$ one of the very few well-defined anionic Fe(0) hydride complexes that are not supported by π-acidic carbonyl or isocyanide ligands, but also one of the first earth-abundant metal complexes that exhibits noble-metal like activity in selective alkene isomerization. Study 3 further highlights the reactivity differences between iron-hydride complexes in different oxidation states. Whereas complex 2 was inactive for alkene isomerization, complex 10 was highly active, most likely due to two-state reactivity (as indicated by computational studies), in which a switch from the low-spin singlet to the high-spin triplet manifold provides a low energy isomerization pathway that enables efficient catalysis at room temperature. These reactivity difference provide the foundation for developing new bond-activation strategies, where the difference in oxidation- and spin-state of the metal-hydride could be important.

TABLE 1

Specific iron complexes/catalysts exemplified herein

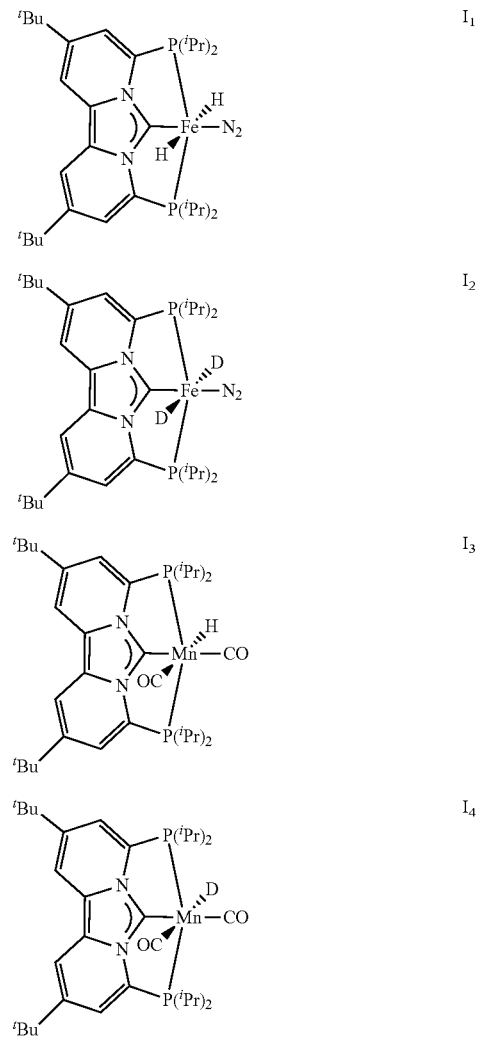

TABLE 1-continued

Specific iron complexes/catalysts exemplified herein

TABLE 1-continued

Specific iron complexes/catalysts exemplified herein

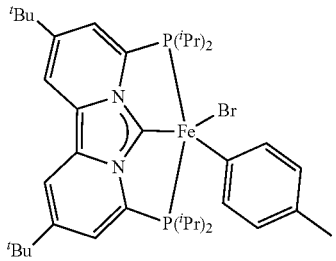

II₆

In one aspect, the present invention thus provides a metal complex of formula I:

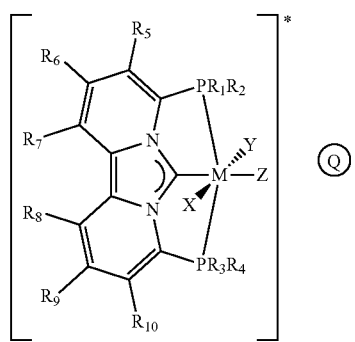

I wherein:
R₁, R₂, R₃, and R₄ each independently is selected from ($C_1$-$C_{18}$)alkyl, ($C_2$-$C_{18}$)alkenyl, ($C_3$-$C_7$)cycloalkyl, —O—($C_1$-$C_{18}$)alkyl, ($C_3$-$C_{12}$)heterocyclyl, a 6-14-membered aryl, a 5-10-membered heteroaryl; or R₁ and R₂, and/or R₃ and R₄, together with the phosphorus atom to which they are attached form a heterocyclic ring optionally containing one or more heteroatoms selected from O, N, or S;
R₅, R₆, R₇, R₈, R₉, and R₁₀ each independently is selected from H, ($C_1$-$C_{18}$)alkyl, ($C_2$-$C_{18}$)alkenyl, ($C_3$-$C_7$)cycloalkyl, ($C_3$-$C_{12}$)heterocyclyl, a 6-14-membered aryl, a 5-10-membered heteroaryl, —$CF_3$, —OR, —SR, or —NRR', or any two of adjacent R₅, R₆, R₇, R₈, R₉, and R₁₀ together with the carbon atoms to which they are attached form a 5-14-membered ring optionally containing one or more heteroatoms selected from O, N, or S;
M is an earth-abundant metal such as Fe, Mn, Ni, Co, Sc, Ti, V, Cr, Cu, Bi, and Zn, having an oxidation state selected from −2, −1, 0, +1, +2, +3, +4, +5, and +6;
X, Y and Z each independently is selected from H, D, T, $N_2$, CO, NO, $N_2O$, $C_1$-$C_{18}$)alkyl, ($C_2$-$C_{18}$)alkenyl, ($C_3$-$C_7$)cycloalkyl, —O—($C_1$-$C_{18}$)alkyl, ($C_3$-$C_{12}$)heterocyclyl, a 6-14-membered aryl, a 5-10-membered heteroaryl, halogen, azide ($N_3^-$), cyanide ($CN^-$), cyanate ($OCN^-$), isocyanide (RNC), isocyanate (RNCO), thiocyanate ($SCN^-$), isothiocyanate (RNCS), sulfide ($S^{2-}$), oxo ($O^{2-}$), peroxo (R—O—O⁻), hydroperoxo (H—O—O⁻), superoxide ($O_2^-$), —NRR', —SR, or a coordinating solvent; or one of X, Y and Z is selected from H, D and T, and the other two of X, Y and Z form a bidentate ligand;
R and R' each independently is selected from H, ($C_1$-$C_{18}$)alkyl, ($C_2$-$C_{18}$)alkenyl, ($C_3$-$C_7$)cycloalkyl, ($C_3$-$C_{12}$)heterocyclyl, a 6-14-membered aryl, a 5-10-membered heteroaryl, or a trialkylsilyl;
Q is an optional counter ion; and
the asterisk represents an optional net charge of said metal complex which depends on the oxidation state of said metal and the groups X, Y and Z,
provided that at least one of X, Y and Z, each independently is H, D, or T.

The term "alkyl" typically means a linear or branched hydrocarbyl having, e.g., 1-18 carbon atoms and includes methyl, ethyl, n-propyl, isopropyl, n-butyl, sec-butyl, isobutyl, tert-butyl, n-pentyl, isoamyl, 2,2-dimethylpropyl, n-hexyl, n-heptyl, n-octyl, n-nonyl, n-decyl, n-undecyl, n-dodecyl, n-tridecyl, n-tetradecyl, n-pentadecyl, n-hexadecyl, and the like. Preferred are ($C_1$-$C_8$)alkyl groups, e.g., ($C_1$-$C_6$)alkyl groups such as methyl, ethyl, isopropyl, and tert-butyl. The term "alkenyl" typically means a linear or branched hydrocarbyl having, e.g., 2-18 carbon atoms and at least one double bond, and includes ethenyl, propenyl, 3-butenyl, 2-ethenylbutyl, 1- and 2-pentenyl, 1-, 2- and 3-hexenyl, 1-, 2-, 3- and 4-heptenyl, 1-, 2-, 3- and 4-octenyl, 1-, 2-, 3- and 4-nonenyl, 1-, 2-, 3-, 4- and 5-decenyl, and the like.

The term "cycloalkyl" means a mono- or bicyclic saturated hydrocarbyl having, e.g., 3-7 carbon atoms such as cyclopropyl, cyclobutyl, cyclopentyl, cyclohexyl, cycloheptyl, and the like. The term "cycloalkenyl" as used herein refers to a mono- or bicyclic hydrocarbyl groups having, e.g., 3-7 carbon atoms, and at least one double bond. Examples of such radicals include, without limiting, cyclopropenyl (e.g., 2-cyclopropen-1-yl), cyclobutenyl (e.g., 2-cyclobuten-1-yl), cyclopentenyl (e.g., 2-cyclopenten-1-yl, or 3-cyclopenten-1-yl), cyclohexenyl (e.g., 2-cyclohexen-1-yl, or 3-cyclohexen-1-yl), and the like.

The term "heterocyclic ring" denotes a mono-, bi-, or poly-cyclic non-aromatic ring of 3-12 atoms containing at least one carbon atom and one to three heteroatoms selected from oxygen, sulfur (optionally oxidized), or nitrogen, which may be saturated or unsaturated, i.e., containing at least one unsaturated bond. Preferred are 5- or 6-membered heterocyclic rings. The term "heterocyclyl" as used herein refers to a univalent group derived from a heterocyclic ring as defined herein by removal of hydrogen from any ring atom. Preferred are 5- or 6-membered heterocyclic rings. Non-limiting examples of heterocyclic rings include azetidine, pyrrolidine, piperidine, morpholine, thiomorpholine, piperazine, oxazolidine, thiazolidine, imidazolidine, oxazoline, thiazoline, imidazoline, dioxole, dioxolane, dihydrooxadiazole, pyran, dihydropyran, tetrahydropyran, thiopyran, dihydrothiopyran, tetrahydrothiopyran, 1-oxidotetrahydrothiopyran, 1,1-dioxidotetrahydrothiopyran, tetrahydrofuran, pyrazolidine, pyrazoline, tetrahydropyrimidine, dihydrotriazole, tetrahydrotriazole, azepane, dihydropyridine, tetrahydropyridine, and the like.

The term "aryl" denotes an aromatic carbocyclic group having, e.g., 6-14, carbon atoms consisting of a single ring or multiple rings either condensed or linked by a covalent bond such as, but not limited to, phenyl, naphthyl, phenanthryl, and biphenyl.

The term "heteroaryl" refers to an aromatic group derived, e.g., from a 5-10-membered mono- or poly-cyclic heteroaromatic ring containing at least one heteroatom selected from N, O, or S. Examples of mono-cyclic heteroaryls include, without being limited to, pyrrolyl, furyl, thienyl, thiazinyl, pyrazolyl, pyrazinyl, imidazolyl, oxazolyl, isoxazolyl, thiazolyl, isothiazolyl, pyridyl, pyrimidinyl, 1,2,3-triazinyl, 1,3,4-triazinyl, and 1,3,5-triazinyl. Polycyclic heteroaryl radicals are preferably composed of two rings such as, but not limited to, benzofuryl, isobenzofuryl, benzothienyl, indolyl, quinolinyl, isoquinolinyl, imidazo[1,2-a]pyridyl, benzimidazolyl, benzthiazolyl, benzoxazolyl, pyrido[1,2-a]pyrimidinyl and 1,3-benzodioxinyl.

According to the present invention, each one of the alkyl, alkenyl, cycloalkyl, cycloalkenyl, heterocyclyl, aryl, and heteroaryl referred to herein, independently, may optionally be substituted by one or more groups such as halogen, ($C_1$-$C_8$)alkyl, ($C_3$-$C_7$)cycloalkyl, —O—($C_1$-$C_8$)alkyl, —COO($C_1$-$C_8$)alkyl, —CO($C_1$-$C_8$)alkyl, —CHO, NRR', CONRR', —CN, and —$NO_2$, wherein R and R' each independently is selected from H, $C_1$-$C_{18}$)alkyl, ($C_2$-$C_{18}$)alkenyl, ($C_3$-$C_7$)cycloalkyl, ($C_3$-$C_{12}$)heterocyclyl, a 6-14-membered aryl, a 5-10-membered heteroaryl, or trialkylsilyl such as trimethylsilyl. It should be understood that when a heteroaryl or heterocyclyl is substituted, the substitution may be at any of the carbocyclic or heterocyclic ring atoms.

The term "halogen" as used herein refers to a halogen and includes fluoro, chloro, bromo, and iodo, but it is preferably chloro or bromo.

The term "pseudo-halogen" as used herein refers to a polyatomic analogue of a halogen as defined above, having chemical properties similar to those of a halogen. Examples of pseudo-halogen functional groups include, without being limited to, —CN, —NCO, —OCN, and —$N_3$.

The term "coordinating solvent" as used herein refers to any solvent capable of coordinating with the earth-abundant metal in the formula I or II. Examples of coordinating solvents include, without being limited to, $H_2O$, $D_2O$, acetonitrile, propionitrile, benzonitrile, tetrahydrofuran, 2-methyltetrahydrofuran, acetone, 1,4-dioxane, diethyl ether, methanol, ethanol, isopropyl alcohol, n-butanol, nitromethane, propylene carbonate, benzene, dimethylformamide, and dimethylsulfoxide.

The term "bidentate ligand" as used herein refers to a ligand having two binding sites such as, without being limited to, borohydride, pinacolborohydride, carbonate, nitrate, and carboxylate.

In certain embodiments, the invention provides a metal complex of the formula I, wherein $R_1$, $R_2$, $R_3$, and $R_4$ each independently is selected from ($C_1$-$C_8$)alkyl, e.g., $C_1$-$C_6$) alkyl, ($C_3$-$C_6$)cycloalkyl, or a 6-10-membered aryl. In particular such embodiments, $R_1$, $R_2$, $R_3$, and $R_4$ each independently is a branched ($C_1$-$C_6$)alkyl, e.g., isopropyl or tert-butyl, preferably wherein $R_1$, $R_2$, $R_3$, and $R_4$ are identical.

In certain embodiments, the invention provides a metal complex of the formula I, wherein $R_5$, $R_6$, $R_7$, $R_8$, $R_9$, and $R_{10}$ each independently is selected from H, or ($C_1$-$C_8$)alkyl, or any two of adjacent $R_5$, $R_6$, $R_7$, $R_8$, $R_9$, and $R_{10}$ (i.e., $R_5$ and $R_6$, $R_6$ and $R_7$, $R_8$ and $R_9$, and/or $R_9$ and $R_{10}$), together with the carbon atoms to which they are attached, form a 5-10-membered ring optionally containing one or more heteroatoms each independently selected from O, N or S. Particular such embodiments are those wherein $R_5$, $R_7$, $R_8$, and $R_{10}$ each is H, preferably wherein $R_6$ and $R_9$ each independently is isopropyl or tert-butyl, and more preferably wherein $R_6$ and $R_9$ each is isopropyl or tert-butyl.

In certain embodiments, the invention provides a metal complex of the formula I, wherein X, Y and Z each independently is selected from H, D, T, $N_2$, and CO. In certain particular such embodiments, one of X, Y and Z is H, D or T; and the other two of X, Y and Z each independently is $N_2$ or CO. In other particular such embodiments, one of X, Y and Z is $N_2$ or CO; and the other two of X, Y and Z (i.e., X and Y, X and Z, or Y and Z) each independently is H, D or T (e.g., one of X and Y is H and the other one of X and Y is D; X and Y are each H or D; one of X and Z is H and the other one of X and Z is D; X and Z are each H or D; one of Y and Z is H and the other one of Y and Z is D; or Y and Z are each H or D).

In certain embodiments, the invention provides a metal complex of the formula I, wherein one of X, Y and Z is selected from H, D and T, and the other two of X, Y and Z (i.e., X and Y, X and Z, or Y and Z) form a bidentate ligand.

In certain embodiments, the invention provides a metal complex of the formula I, wherein M is a metal selected from Fe, Mn, Ni, and Co, i.e., a Fe-, Mn-, Ni-, or Co-complex of the formula I, said metal having an oxidation state selected from −2, −1, 0, +1, +2, and +3.

In certain embodiments, the invention provides a metal complex of the formula I, wherein $R_1$, $R_2$, $R_3$, and $R_4$ each independently is selected from $C_1$-$C_8$)alkyl, e.g., $C_1$-$C_6$) alkyl, ($C_3$-$C_6$)cycloalkyl, or a 6-10-membered aryl; $R_5$, $R_6$, $R_7$, $R_8$, $R_9$, and $R_{10}$ each independently is selected from H, or $C_1$-$C_8$)alkyl, or any two of adjacent $R_5$, $R_6$, $R_7$, $R_8$, $R_9$, and $R_{10}$ (i.e., $R_5$ and $R_6$, $R_6$ and $R_7$, $R_8$ and $R_9$, and/or $R_9$ and $R_{10}$), together with the carbon atoms to which they are attached, form a 5-10-membered ring optionally containing one or more heteroatoms each independently selected from O, N, or S; X, Y and Z each independently is selected from H, D, T, $N_2$, and CO, or one of X, Y and Z is selected from H, D and T, and the other two of X, Y and Z form a bidentate ligand; and M is a metal selected from Fe, Mn, Ni, and Co, having an oxidation state selected from −2, −1, 0, +1, +2, and +3. Examples of such metal complexes are those wherein: (i) one of X, Y and Z is H, D or T; and the other two of X, Y and Z each independently is $N_2$ or CO; (ii) one of X, Y and Z is $N_2$ or CO; and the other two of X, Y and Z each independently is H, D or T (e.g., one of X and Y is H and the other one of X and Y is D; X and Y are each H or D; one of X and Z is H and the other one of X and Z is D; X and Z are each H or D; one of Y and Z is H and the other one of Y and Z is D; or Y and Z are each H or D); or (ii) one of X, Y and Z is selected from H, D and T, and the other two of X, Y and Z form a bidentate ligand. In particular such embodiments, $R_1$, $R_2$, $R_3$, and $R_4$ each independently is a branched $C_1$-$C_6$)alkyl, e.g., isopropyl or tert-butyl, preferably wherein $R_1$, $R_2$, $R_3$, and $R_4$ are identical; and $R_5$, $R_7$, $R_8$, and $R_{10}$ each is H. More particular such embodiments are those wherein $R_1$, $R_2$, $R_3$, and $R_4$ each is isopropyl or tert-butyl; and $R_6$ and $R_9$ each is isopropyl or tert-butyl, preferably wherein $R_1$, $R_2$, $R_3$, and $R_4$ each is isopropyl; and $R_6$ and $R_9$ each is tert-butyl. Specific such embodiments are those wherein M is Fe, Co, or Mn, having an oxidation state selected from −2, −1, 0, +1, +2, and +3.

Specific metal complexes of the formula I exemplified herein are those wherein $R_1$, $R_2$, $R_3$, and $R_4$ each is isopropyl; $R_5$, $R_7$, $R_8$, and $R_{10}$ each is H; $R_6$ and $R_9$ each is tert-butyl; and (i) X and Y each is H or D; Z is $N_2$; and M is Fe having an oxidation state of +2 (herein identified complex $I_1$ or $I_2$, respectively); (ii) X and Z each is CO; Y is H or D; and M is Mn having an oxidation state of +1 (herein identified complex $I_3$ or $I_4$, respectively); (iii) X, Y and Z each is H or D; and M is Fe having an oxidation state of +2 (herein identified complex $I_5$ or $I_6$, respectively); (iv) one of X, Y and Z is H or D; the other two of X, Y and Z form the bidentate ligand $\eta^2$-$H_2$Bpin; and M is Fe having an oxidation state of +1 (herein identified complex $I_7$ or $I_8$, respectively); or (v) one of X, Y and Z is H or D; the other two of X, Y and Z form the bidentate ligand $\eta^2$-$H_2BH_2$; and M is Fe having an oxidation state of +1 (herein identified complex $I_9$ or $I_{10}$, respectively). As shown in Table 1, each one of complexes $I_5$ and $I_6$ has a net charge of −1 and group Q is therefore present and represented by the sodium cation.

In another aspect, the present invention provides a metal complex of formula II:

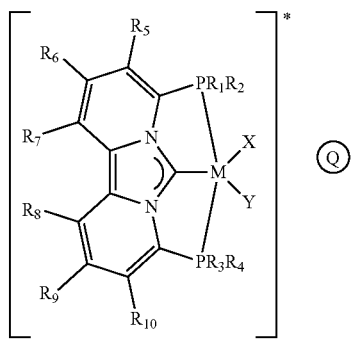

wherein
$R_1$, $R_2$, $R_3$, and $R_4$ each independently is selected from $(C_1$-$C_{18})$alkyl, $(C_2$-$C_{18})$alkenyl, $(C_3$-$C_7)$cycloalkyl, —O—$(C_1$-$C_{18})$alkyl, $(C_3$-$C_{12})$heterocyclyl, a 6-14-membered aryl, a 5-10 membered heteroaryl; or $R_1$ and $R_2$, and/or $R_3$ and $R_4$, together with the phosphorus atom to which they are attached form a heterocyclic ring optionally containing one or more heteroatoms selected from O, N, or S;

$R_5$, $R_6$, $R_7$, $R_8$, $R_9$, and $R_{10}$ each independently is selected from H, $C_1$-$C_{18}$)alkyl, $(C_2$-$C_{18})$alkenyl, $(C_3$-$C_7)$cycloalkyl, $(C_3$-$C_{12})$heterocyclyl, a 6-14-membered aryl, a 5-10-membered heteroaryl, —$CF_3$, —OR, —SR, or —NRR', or any two of adjacent $R_5$, $R_6$, $R_7$, $R_8$, $R_9$, and $R_{10}$ together with the carbon atoms to which they are attached form a 5-14-membered ring optionally containing one or more heteroatoms each independently selected from O, N or S;

M is an earth-abundant metal such as Fe, Mn, Ni, Co, Sc, Ti, V, Cr, Cu, Bi, and Zn, having an oxidation state selected from −2, −1, 0, +1, +2, +3, +4, +5, and +6;

X and Y each independently is selected from H, D, T, $N_2$, CO, NO, $N_2O$, $C_1$-$C_{18}$)alkyl, $(C_2$-$C_{18})$alkenyl, $(C_3$-$C_7)$ cycloalkyl, —O—$(C_1$-$C_{18})$alkyl, $(C_3$-$C_{12})$heterocyclyl, a 6-14-membered aryl, a 5-10-membered heteroaryl, halogen, azide ($N_3^-$), cyanide ($CN^-$), cyanate ($OCN^-$), isocyanide (RNC), isocyanate (RNCO), thiocyanate ($SCN^-$), isothiocyanate (RNCS), sulfide ($S^{2-}$), oxo ($O^{2-}$), peroxo (R—O—$O^-$), hydroperoxo (H—O—$O^-$), superoxide ($O_2^-$); —NRR', —SR, or a coordinating solvent, e.g., wherein one of X and Y is H, D, or T, preferably H; or X and Y form a bidentate ligand;

R and R' each independently is selected from H, $C_1$-$C_{18}$) alkyl, $(C_2$-$C_{18})$alkenyl, $(C_3$-$C_7)$cycloalkyl, $(C_3$-$C_{12})$ heterocyclyl, a 6-14-membered aryl, a 5-10-membered heteroaryl, or a trialkylsilyl such as trimethylsilyl;

Q is an optional counter ion; and the asterisk represents an optional net charge of said metal complex which depends on the oxidation state of said metal and the groups X and Y.

In certain embodiments, the invention provides a metal complex of the formula II, wherein $R_1$, $R_2$, $R_3$, and $R_4$ each independently is selected from $(C_1$-$C_8)$alkyl, e.g., $C_1$-$C_6$) alkyl, $(C_3$-$C_6)$cycloalkyl, or a 6-10-membered aryl. In particular such embodiments, $R_1$, $R_2$, $R_3$, and $R_4$ each independently is a branched $(C_1$-$C_6)$alkyl, e.g., isopropyl or tert-butyl, preferably wherein $R_1$, $R_2$, $R_3$, and $R_4$ are identical.

In certain embodiments, the invention provides a metal complex of the formula II, wherein $R_5$, $R_6$, $R_7$, $R_8$, $R_9$, and $R_{10}$ each independently is selected from H, or $(C_1$-$C_8)$alkyl, or any two of adjacent $R_5$, $R_6$, $R_7$, $R_8$, $R_9$, and $R_{10}$ (i.e., $R_5$ and $R_6$, $R_6$ and $R_7$, $R_8$ and $R_9$, and/or $R_9$ and $R_{10}$), together with the carbon atoms to which they are attached, form a 5-10-membered ring optionally containing one or more heteroatoms each independently selected from O, N or S. Particular such embodiments are those wherein $R_5$, $R_7$, $R_8$, and $R_{10}$ each is H, preferably wherein $R_6$ and $R_9$ each independently is isopropyl or tert-butyl, and more preferably wherein $R_6$ and $R_9$ each is isopropyl or tert-butyl.

In certain embodiments, the invention provides a metal complex of the formula II, wherein X and Y each independently is a halogen, preferably Cl or Br, CO, NO, $N_2O$, H, D, $N_2$, $(C_1$-$C_8)$alkyl, $(C_3$-$C_7)$cycloalkyl, $(C_3$-$C_{12})$heterocyclyl, a 6-14-membered aryl, or a 5-10-membered heteroaryl; or X and Y form a bidentate ligand.

In certain embodiments, the invention provides a metal complex of the formula II, wherein M is a metal selected from Fe, Mn, Ni, and Co, i.e., a Fe-, Mn-, Ni-, or Co-complex of the formula II, said metal having an oxidation state selected from −2, −1, 0, +1, +2, and +3.

In certain embodiments, the invention provides a metal complex of the formula II, wherein $R_1$, $R_2$, $R_3$, and $R_4$ each independently is selected from $(C_1$-$C_8)$alkyl, e.g., $C_1$-$C_6$) alkyl, $(C_3$-$C_6)$cycloalkyl, or a 6-10-membered aryl; $R_5$, $R_6$, $R_7$, $R_8$, $R_9$, and $R_{10}$ each independently is selected from H, or $(C_1$-$C_8)$alkyl, or any two of adjacent $R_5$, $R_6$, $R_7$, $R_8$, $R_9$, and $R_{10}$ (i.e., $R_5$ and $R_6$, $R_6$ and $R_7$, $R_8$ and $R_9$, and/or $R_9$ and $R_{10}$), together with the carbon atoms to which they are attached, form a 5-10-membered ring optionally containing one or more heteroatoms each independently selected from O, N, or S; X and Y each independently is a halogen, preferably Cl or Br, CO, NO, $N_2O$, H, D, $N_2$, $(C_1$-$C_8)$alkyl, $(C_3$-$C_7)$cycloalkyl, $(C_3$-$C_{12})$heterocyclyl, a 6-14-membered aryl, or a 5-10-membered heteroaryl, or X and Y form a bidentate ligand; and M is selected from Fe, Mn, Ni, and Co, having an oxidation state selected from −2, −1, 0, +1, +2, and +3. In particular such embodiments, $R_1$, $R_2$, $R_3$, and $R_4$ each independently is a branched $(C_1$-$C_6)$alkyl, e.g., isopropyl or tert-butyl, preferably wherein $R_1$, $R_2$, $R_3$, and $R_4$ are identical; and $R_5$, $R_7$, $R_8$, and $R_{10}$ each is H. More particular such embodiments are those wherein $R_1$, $R_2$, $R_3$, and $R_4$ each is isopropyl or tert-butyl; and $R_6$ and $R_9$ each is isopropyl or tert-butyl, preferably wherein $R_1$, $R_2$, $R_3$, and $R_4$ each is isopropyl; and $R_6$ and $R_9$ each is tert-butyl. Specific such embodiments are those wherein M is Fe, Co, or Mn, having an oxidation state selected from −2, −1, 0, +1, +2, and +3.

Specific metal complexes of the formula II exemplified herein are those wherein $R_1$, $R_2$, $R_3$, and $R_4$ each is isopropyl; $R_5$, $R_7$, $R_8$, and $R_{10}$ each is H; $R_6$ and $R_9$ each is tert-butyl; and (i) X and Y each is Cl; and M is Fe having an oxidation state of +2 (herein identified complex $II_1$); (ii) X and Y each is $N_2$; and M is Fe having an oxidation state of 0 (herein identified complex $II_2$); (iii) X is H; Y is $N_2$; and M is Fe having an oxidation state of 0 (herein identified complex $II_3$); (iv) X and Y each independently is p-toluene; and M is Fe having an oxidation state of +2 (herein identified complex $II_4$); or (v) X is Cl or Br; Y is p-toluene; and M is Fe having an oxidation state of +2 (herein identified complex $II_5$ or $II_6$, respectively). As shown in Table 1, complex $II_3$ has a net charge of −1 and group Q is therefore present and represented by the sodium cation.

According to the present invention, the metal complexes disclosed herein may have an overall net charge, depending on the oxidation state of the metal (M in the formula I and II) and the specific ligands coordinated therewith (i.e., X, Y and Z in formula I; and X and Y in formula II). In other words, a metal complex as disclosed herein will be charged in all cases wherein the sum of charges of X, Y and Z (formula I), or X and Y (formula II), and the oxidation state of the metal M, is other than zero. For example, since one, two or three of groups X, Y and Z in formula I each is a hydride (anion of hydrogen atom or an isotope thereof), a metal complex of the formula I will have an overall charge in all cases wherein the sum of the charge of each one of the groups X, Y and Z that is not a hydride, and the oxidation state of the metal M, is other than +1, +2 or +3, respectively.

A metal complex having a net charge will be associated with a counter ion represented as group Q in both formulas I and II. In certain embodiments, said counter ion is a cation such as a metal cation, e.g., an alkali metal (e.g., lithium, sodium, and potassium) cation or an alkaline earth metal (e.g., calcium and magnesium) cation; ammonium ($NH_4^+$); or an organic cation derived from an amine of the formula $R_4N^+$, wherein each one of the Rs independently is selected from H, $(C_1-C_{22})$alkyl, preferably $(C_1-C_6)$alkyl such as methyl, ethyl, propyl, isopropyl, n-butyl, sec-butyl, isobutyl, tert-butyl, n-pentyl, 2,2-dimethylpropyl, n-hexyl, and the like, phenyl, or heteroaryl such as pyridyl, imidazolyl, pyrimidinyl, and the like, or two of the Rs together with the nitrogen atom to which they are attached form a 3-7 membered ring optionally containing a further heteroatom selected from N, S and O, such as pyrrolydine, piperidine and morpholine. In other embodiments, the counter ion is an anion such as a halide, sulfate, perchlorate, phosphate, acetate, mesylate, tartrate, borate, carbonate, nitrate, oxalate, formate, azide, cyanide, tetrafluoroborate, hexafluorophoshate, tetraphenyl borate, and a perfluoronated tetraaryl borate; or an anion derived, e.g., from hydrochloric acid, hydrobromic acid, phosphonic acid, sulfuric acid, carbonic acid, acetic acid, maleic acid, fumaric acid, tartaric acid, citric acid, succinic acid, methanesulfonic acid, ethanesulfonic acid, p-toluenesulfonic acid, benzenesulfonic acid, or benzoic acid.

In yet another aspect, the present invention provides a composition comprising a metal complex of the formula I or II, according to any one of the embodiments above. In certain embodiments, the composition disclosed herein comprises a metal complex of the formula I or II, wherein M is a metal selected from Fe, Mn, Ni, and Co, preferably Fe, Co, or Mn, having an oxidation state selected from −2, −1, 0, +1, +2, and +3. In particular such embodiments, the metal complex comprised within said composition is selected from the herein identified complexes $I_1$ to $I_{10}$ and $II_1$ to $II_6$.

In a further aspect, the present invention relates to a method for HIE of $C(sp^3)$-H and/or $C(sp^2)$-H bond in an organic compound, to thereby replace the hydrogen atom in said $C(sp^3)$-H bond and/or said $C(sp^2)$-H bond with either deuterium (H/D exchange) or tritium (H/T exchange), said method comprising reacting said organic compound with a metal complex of the formula I according to any one of the embodiments above, in the presence of a deuterium or tritium source, respectively, wherein said organic compound being optionally substituted with a group selected from halogen, pseudo-halogen, —OR, —SR, —NRR', —B(OR)$_2$, —BR$_2$—SiR$_3$, —Si(OR)$_3$, —CO—O—R—, —O—CO—R—, —CO—NRR', =O, =S, —CHO, —CO—SR, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, wherein R and R' each independently is selected from H, $(C_1-C_{18})$alkyl, $(C_2-C_{18})$alkenyl, $(C_3-C_7)$cycloalkyl, $(C_3-C_{12})$heterocyclyl, a 6-14-membered aryl, and a 5-10-membered heteroaryl.

The term "organic compound" as used herein refers to a compound containing at least one, i.e., one or more, carbon-hydrogen bond, e.g., a hydrocarbon, heterocyclic compound, and aromatic and heteroaromatic compounds. Such organic compounds may be unsubstituted or substituted with one or more groups each independently selected from halogen, pseudo-halogen, ester, amide, amine, ketone, aldehyde, cyano, sulfide, sulfoxide, alkoxide, alcohol, and thiol. Examples of such organic compounds include, inter alia, pharmaceutically active compounds.

In certain embodiments, the organic compound subject to the method for HIE disclosed herein is an aromatic compound, e.g., a 6-14-membered aromatic compound, or a heteroaromatic compound, e.g., a 5-10-membered heteroaromatic compound, or $(C_2-C_{20})$alkene, i.e., a linear or branched hydrocarbon having 2-20 carbon atoms and at least one double bond. According to the present invention, such organic compounds may be subject to HIE in $C(sp^2)$-H bond.

In other embodiments, the organic compound subject to the method for HIE disclosed herein is $(C_1-C_{20})$alkane, i.e., a linear or branched hydrocarbon having 1-20 carbon atoms. According to the present invention, such organic compounds may be subject to HIE in $C(sp^3)$-H bond.

In certain embodiments, the metal complex reacted with said organic compound according to the method of HIE disclosed herein is a metal complex of the formula I, wherein M is Fe, Mn, Ni, or Co, preferably Fe, Co, or Mn, having an oxidation state selected from −2, −1, 0, +1, +2, and +3. In particular such embodiments, said metal complex is selected from the herein identified complexes $I_1$ to $I_{10}$.

The method for HIE disclosed herein could be utilized for exchanging, reversibly, between any two of the hydrogen isotopes, i.e., between hydrogen and deuterium and vice versa, hydrogen and tritium and vice versa, or deuterium and tritium and vice versa, by reacting the organic compound, e.g., an aromatic or heteroaromatic compound, with a metal complex of the formula I as defined in any one of the embodiments above, in the presence of an appropriate hydrogen isotope source, i.e., hydrogen, deuterium, or tritium source. For example, when hydrogen atom(s) is(are) to be exchanged for deuterium, the reaction should be carried out in the presence of a deuterium source; and when hydrogen atom(s) is(are) to be exchanged for tritium, the reaction should be carried out in the presence of a tritium source.

In certain embodiments, the method for HIE disclosed herein is carried out in the presence of a solvent, more specifically a polar- or non-polar solvent. Polar solvents useful in the method of the invention include, without limiting, aprotic solvents such as acetone, dichloromethane (DCM), ethyl acetate, chlorobenzene, 1,2-dichloroethane, tetrahydrofuran, dimethyl sulfoxide, acetonitrile, and combinations thereof; as well as protic solvents such as water, methanol, ethanol, propanol, isopropanol, butanol, t-butyl alcohol, acetic acid, and combinations thereof. Non-polar solvents useful in said method include, without being limited to, pentane, hexane, cyclohexane, diethylether, chloroform, carbon tetrachloride, benzene, toluene, and combinations thereof.

In particular embodiments, the organic compound subject to the HIE process is in the form of a liquid and may thus be used as the solvent for the reaction.

Examples of deuterium sources for use in the method of the invention include, without being limited to, a deuterated organic compound such as benzene-$d_6$, chloroform-d, or acetone-$d_6$, deuterium oxide ($D_2O$), deuterium gas ($D_2$), or a mixture thereof; and examples of tritium sources for use in the method of the invention include, without limiting, tritiated benzene, or tritium gas ($T_2$).

Liquid deuterium or tritium sources, used in the method for HIE disclosed herein may be added to the solvent in which the HIE reaction is carried out, or in certain cases may be used, in addition, as the solvent for the reaction.

In particular embodiments, the method disclosed herein is for H/D exchange, and said method is carried out in the presence of benzene-$d_6$ as the deuterium source. As shown in the experimental section above, this method enables incorporating 95% or more of deuterium to the treated organic compound, e.g., an aromatic- or heteroaromatic compound. As further shown, utilizing said method while using, e.g., benzene-$d_6$ as the deuterium source, easily reducible functional groups such as esters and amides, that optionally substitute the organic compound, e.g., an aromatic or heteroaromatic compound, are well tolerated, i.e., unreacted while performing the HIE process.

In certain embodiments, the method for HIE disclosed herein is carried out at a temperature of from −40° C. to about 100° C., e.g., at room temperature, i.e., at about 18° C. to about 25° C., or at a temperature higher than room temperature and up to about 100° C., e.g., from about 30° C. to about 90° C., from about 40° C. to about 80° C., from about 45° C. to about 60° C., or at about 50° C., and optionally under inert gas atmosphere, e.g., $N_2$ or Ar atmosphere.

In certain embodiments, the deuterium or tritium source utilized according to the method of HIE disclosed herein is either deuterium- or tritium gas, and said gas is introduced to the reaction at a pressure of up to about 10 bar, e.g., from about 0 to about 5 bar, about 0.1 to about 2 bar, about 0.2 to about 1.5 bar, or up to about 1 bar.

In yet a further aspect, the present invention provides methods for isomerization of alkenes, more specifically linear or branched hydrocarbons having at least 3 or 4, and up to, e.g., 12, 16, 20, or 24, carbon atoms, and at least one double bond, with high stereo- and regioselectivity, by reacting said alkene with a metal complex of the formula II as defined above, but preferably wherein one of X and Y is H, D, or T, e.g., H.

In one particular such aspect, disclosed herein is a method for isomerization of a 1-alkene to 2-alkene, said method comprising reacting said 1-alkene with a metal complex of the formula II according to any one of the embodiments above, in a solvent, wherein said alkene being optionally substituted with one or more substituents each independently selected from ($C_1$-$C_{18}$)alkyl, ($C_2$-$C_{18}$)alkenyl, ($C_3$-$C_7$)cycloalkyl, halogen, —OR, —SR, —NRR', —B(OR)$_2$, —BR$_2$—SiR$_3$, —Si(OR)$_3$—CHO, —O—CO—R, —CO—O—R, —CO—NRR', —NR—CO—R, =O, =S, ($C_3$-$C_{12}$) heterocyclyl, a 6-14-membered aryl, a 5-10-membered heteroaryl, an electron withdrawing group such as —NO$_2$, —CF$_3$ and —C$_6$F$_6$; and R and R' each independently selected from H, ($C_1$-$C_{18}$)alkyl, ($C_2$-$C_{18}$)alkenyl, ($C_3$-$C_7$) cycloalkyl, ($C_3$-$C_{12}$)heterocyclyl, a 6-14-membered aryl, a 5-10-membered heteroaryl, or a trialkylsilyl such as trimethylsilyl.

In another particular such aspect, disclosed herein is a method for isomerization of an alkene substituted at a terminal position thereof with an aryl, e.g., a 6-14-membered aryl, to thereby perform double bond migration by one or more positions towards said aryl, said method comprising reacting said alkene with a metal complex of the formula II according to any one of the embodiments above, in a solvent, wherein said alkene and said aryl each independently being optionally substituted with one or more substituents each independently selected from ($C_1$-$C_{18}$)alkyl, ($C_2$-$C_{18}$)alkenyl, ($C_3$-$C_7$)cycloalkyl, halogen, —OR, —SR, —NRR', —B(OR)$_2$, —BR$_2$—SiR$_3$, —Si(OR)$_3$, —CHO, —O—CO—R, —CO—O—R, —CO—NRR', —NR—CO—R, =O, =S, ($C_3$-$C_{12}$)heterocyclyl, a 6-14-membered aryl, a 5-10-membered heteroaryl, an electron withdrawing group such as —NO$_2$, —CF$_3$ and —C$_6$F$_6$; and R and R' each independently selected from H, ($C_1$-$C_{18}$)alkyl, ($C_2$-$C_{18}$) alkenyl, ($C_3$-$C_7$)cycloalkyl, ($C_3$-$C_{12}$)heterocyclyl, a 6-14-membered aryl, a 5-10-membered heteroaryl, or a trialkylsilyl such as trimethylsilyl.

Solvents useful in any one of the methods for alkene isomerization disclosed herein include, without being limited to, benzene, toluene, acetonitrile, propionitrile, benzonitrile, tetrahydrofuran, 2-methyltetrahydrofuran, acetone, 1,4-dioxane, diethyl ether, nitromethane, propylene carbonate, benzene, fluorobenzene, hexafluorobenzene, difluorobenzene, chlorobenzene, hexane, pentane, heptane, neopentane, dimethylformamide, ethylacetate, dimethylsulfoxide, and combinations thereof. In particular embodiments, the solvent utilized is benzene or toluene.

The methods for alkene isomerization disclosed herein may be carried out at any suitable temperature, e.g., at room temperature or at a temperature higher than room temperature but lower than the boiling temperature of the solvent used. In particular embodiments, the temperature at which the alkene isomerization process is carried out is either constant or varying, and within the range of from about 20° C. to about 120° C.

In certain embodiments, the metal complex reacted with said alkene according to each one of the methods of alkene isomerization disclosed herein is a metal complex of the formula II, wherein M is Fe, Mn, Ni, or Co, preferably Fe, Co, or Mn, having an oxidation state selected from −2, −1, 0, +1, +2, and +3, but preferably wherein one of X and Y is H, D, or T, e.g., H. In particular such embodiments, said metal complex is the complex II$_3$.

Unless otherwise indicated, all numbers expressing, e.g., temperatures and pressures, used in this specification, are to be understood as being modified in all instances by the term "about". Accordingly, unless indicated to the contrary, the numerical parameters set forth in this specification are approximations that may vary by up to plus or minus 10% depending upon the desired properties to be obtained by the present invention.

The invention will now be illustrated by the following non-limiting Examples.

EXAMPLES

Study 1. Facile H/D Exchange at (Hetero)Aromatic Hydrocarbons Catalyzed by a Stable Trans-Dihydride N-Heterocyclic Carbene (NHC) Iron Complex Synthesis of Iron PC$_{NHC}$P Pincer Complexes Realizing the lack of current synthetic methodologies for preparing earth-abundant metal PC$_{NHC}$P pincer complexes, we became interested in a ligand platform known as dipyrido[1,2-c;2',1'-e]imidazolin-6-ylidenes, whose rigid framework might allow for strong binding of earth-abundant metals. As shown in Scheme 1, we commenced our studies by synthesizing azolium salt A1 via a modification of a literature procedure (Fuku-en et al., 2014). Subsequent deprotonation of A1 with potassium tert-butoxide (KO$^t$Bu) in tetrahydrofuran (THF), resulted in the formation of free carbene A2.

Addition of FeCl$_2$·1.5THF (1.1 equiv.) to a stirred solution of A2 in THF (15 mL), resulted in the formation of a new paramagnetic species (1) as judged by $^1$H NMR spectroscopy (data not shown). High-resolution mass spectrometry (HRMS) is consistent with the assignment of 1 as [PC$_{NHC}$P)FeCl$_2$] (data not shown), which was also confirmed by X-ray crystallography.

The solid-state structure of 1 is shown in FIG. 1 and features an iron metal center in a distorted trigonal bipyramidal geometry. The axial phosphine donors are only weakly bound to the iron metal center, which is evident from the long iron phosphine distances of 2.782(2) Å (Fe-P1) and 2.765(2) Å (Fe-P2). The iron carbene (Fe-C$_1$) distance of 2.062(6) and the NCN angle of 102.3(5)° are typical for other iron NHCs.

With iron PC$_{NHC}$P pincer complex 1 in hand, we investigated its reactivity towards a variety of hydride donors, because of the wide applicability of transition-metal hydrides in catalysis (Alig et al., 2019; Wiedner et al., 2016; Wang and Astruc, 2015; Larionov et al., 2014; Pospech et al., 2013; Peruzzini and Poli, 2001). Addition, of two equiv. of NaBHEt$_3$ to a THF solution of complex 1 at −110° C., afforded a new diamagnetic species (2) that is stable for several days in solution at room temperature (Scheme 1).

The $^1$H NMR spectrum of complex 2, exhibits a single characteristic triplet at −8.79 ppm (2H), whose $^2$J$_{P-H}$ values of 43.0 Hz are consistent with a tentative assignment of 2 as the trans-dihydride iron complex [PC$_{NHC}$P)Fe(H$_2$)N$_2$)]. Additional T$_1$ measurements (at 298K) support such a trans-dihydride assignment where the decay time of 420 ms is similar to those reported for other transition-metal trans-dihydride complexes. Definite structural assignment of 2 was provided by X-ray crystallography (FIG. 1). Although the crystals were not of sufficient quality to allow comparison of the bond metrics, it does allow for identification of complex 2 as [PC$_{NHC}$P)Fe(H)$_2$N$_2$)] with the coordinated N$_2$ opposite to the PC$_{NHC}$P carbene, forcing the two hydrides in a trans geometry. As a result, the combined spectroscopic (NMR) and crystallographic data confirm the formation of a classical iron(II) trans-dihydride.

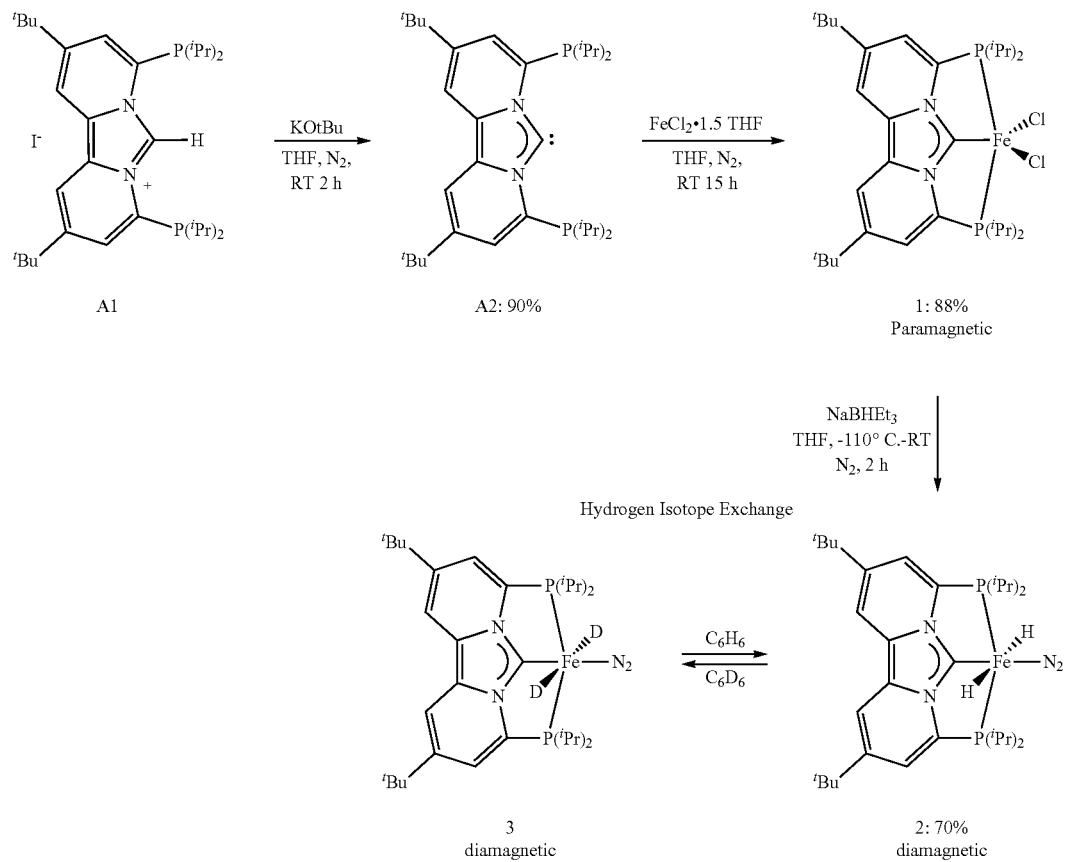

Scheme 1. Synthesis of PC$_{NHC}$P iron complexes 1 and 2, and the observed H/D exchange in benzene-d$_6$ to form complex 3

Hydrogen Isotope Exchange (HIE) at (Hetero)Aromatics

The ability to selectively exchange hydrogen for either deuterium or tritium is important for understanding many fundamental processes in organometallic (Parkin, 2007; Jones, 2003), medicinal (Katsnelson, 2013; Elmore, 2009), and biological chemistry (Atzrodt et al., 2018). Classically, HIE is catalyzed by noble metals such as ruthenium, rhodium, and iridium. In contrast, only a few studies report on the HIE with earth-abundant metals (Zhang et al., 2020; Zarate et al., 2019; Yang et al., 2018; Palmer and Chirik, 2017; Pony Yu et al., 2016; Lenges et al., 2000). Given the importance of earth-abundant metal-hydride species in HIE reactions, we reasoned that iron complex 2 could be a straightforward entry towards facile H/D exchange at aromatic hydrocarbons.

Our studies into H/D exchange started with the observation that the hydride resonance at −8.79 ppm (t, $^2J_{P-H}$=43.0 Hz) in complex 2 slowly disappeared after dissolving 2 in benzene-$d_6$. No other changes in the $^1$H NMR spectrum of 2 were observed. Analysis of the solution by $^2$H and $^{31}$P NMR spectroscopy revealed the appearance of a triplet ($^2$H) at −8.68 ppm ($^2J_{P-D}$=6.6 Hz), and a quintet ($^{31}$P) at 133.27 ppm ($^2J_{D-P}$=6.2 Hz), which is consistent with the formation of the di-deuteride iron(II) complex 3 (Scheme 1). Similarly, dissolving 3 in benzene results to the reformation of complex 2 in quantitative yields.

The reversible H/D exchange between the solvent and complex 2 indicates reversible C(sp²)-H activation, which is promising for allowing catalytic HIE with other hydrocarbons. As evident from Scheme 2, complex 2 indeed efficiently catalyzes the H/D exchange between the solvent (benzene-$d_6$) and a variety of (hetero)aromatic hydrocarbons. The reaction occurs under mild conditions ($N_2$, 50-80° C.) and typically requires less than three hours for high levels of deuterium incorporation. For example, toluene is exclusively deuterated at the mew-, and para-position (>95%), which are the sterically most accessible positions (Scheme 2; [$d_3$]-4). Likewise, for m-xylene, the mew-position was preferentially deuterated (98%). In both substrates, deuteration of the ortho-position was not observed. These data suggest that for toluene and m-xylene, the observed regioselectivity is primarily dictated by steric factors. Notwithstanding, these results are akin to those obtained by Chirik (Pony Yu et al., 2016), and Leitner (Prechtl et al., 2007), whose iron and ruthenium pincer complexes [$H_4$-$^{iPr}$CNC)Fe($N_2$)$_2$] and [(PNP)Ru(H)$_2$($H_2$)] showed comparable regioselectivity.

Encouraged by these initial results, we sought to increase the substrate scope to include a variety of electronically and sterically differentiated substrates (Scheme 2). For example, fluorobenzene was completely deuterated within three hours (Scheme 2, [$d_5$]-6). Monitoring the reaction by $^1$H and $^{19}$F NMR spectroscopy revealed that the ortho- and meta-position are preferentially deuterated (data not shown). Only after 30 minutes deuteration of the para-position is observed, while complete deuteration of the para-positions takes nearly three hours. These results reflect the level of deuteration in the order of ortho (98%)>meta (95%)>para (90%) as shown in Scheme 2. Interestingly, for the related chlorobenzene deuterium incorporation was only observed at the para-position, whereas for 4-fluoroanisole incorporation was observed at the ortho-position (Scheme 2; [$d_1$]-7 and [$d_2$]-9). Clearly, besides the established steric effects, electronic effects are important contributors to the observed regioselectivity (vide infra). Nonetheless, the ability of 2 to efficiently deuterate chlorobenzene demonstrates that the complex 2 is stable towards reductive elimination of $H_2$ and subsequent oxidative addition of the aryl halide.

Scheme 2. Substrate scope for HIE at (hetero)aromatic hydrocarbons, catalyzed by 3*

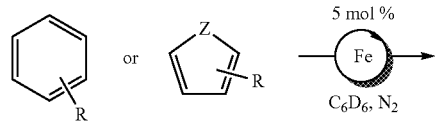

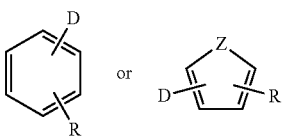

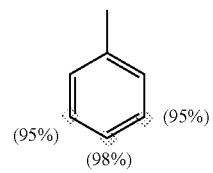

[$d_3$]-4

80° C., 3 h

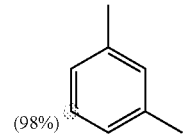

[$d_1$]-5

80° C., 3 h

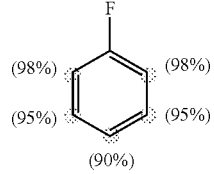

[$d_5$]-6

50° C., 3 h

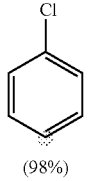

[$d_1$]-7

50° C., 3 h

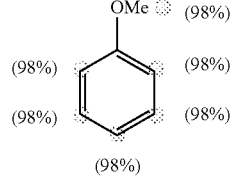

[$d_8$]-8

80° C., 3 h

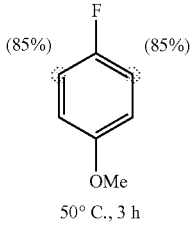

[$d_2$]-9

50° C., 3 h

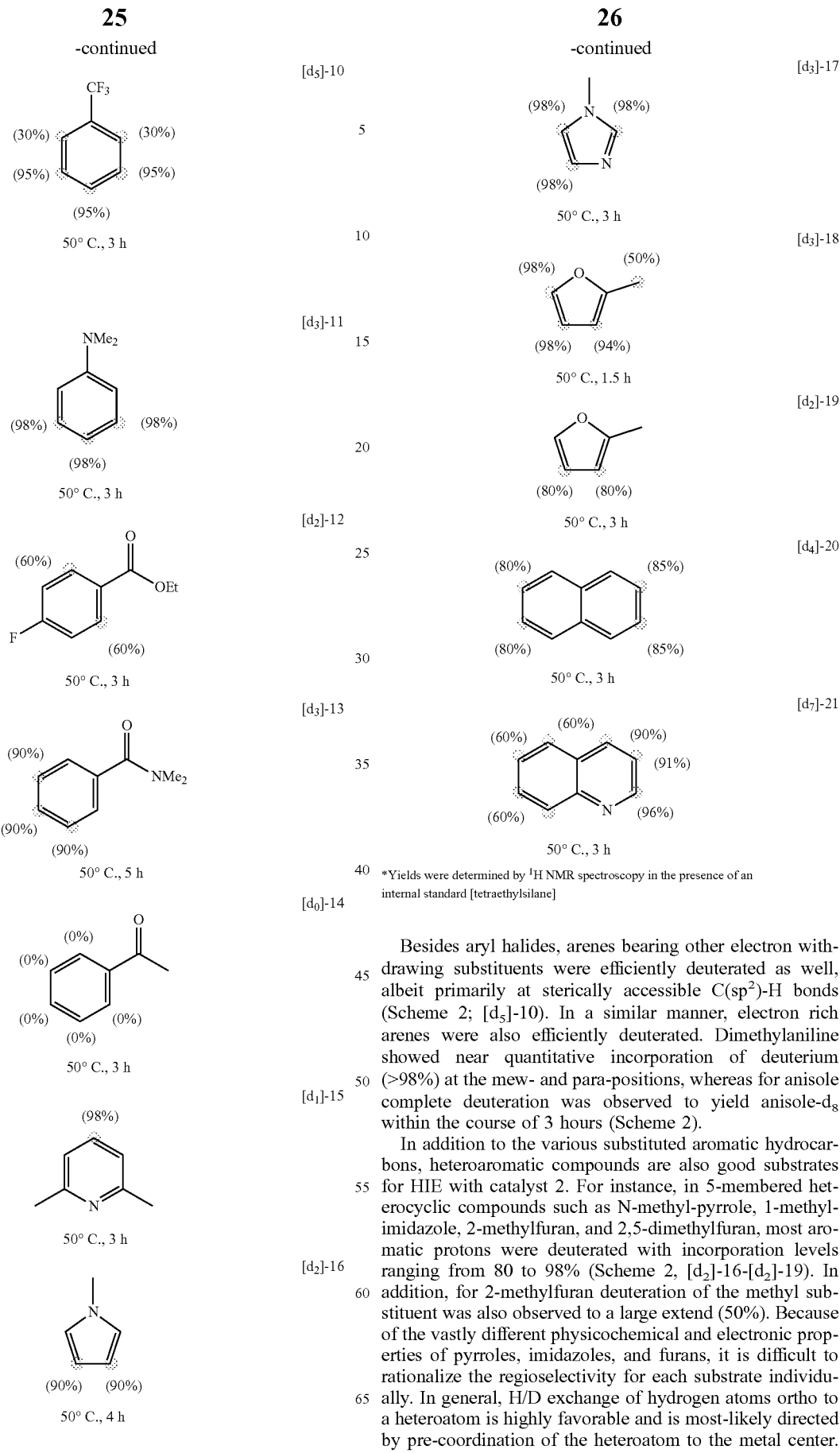

*Yields were determined by ¹H NMR spectroscopy in the presence of an internal standard [tetraethylsilane]

Besides aryl halides, arenes bearing other electron withdrawing substituents were efficiently deuterated as well, albeit primarily at sterically accessible $C(sp^2)$-H bonds (Scheme 2; [d₅]-10). In a similar manner, electron rich arenes were also efficiently deuterated. Dimethylaniline showed near quantitative incorporation of deuterium (>98%) at the mew- and para-positions, whereas for anisole complete deuteration was observed to yield anisole-d₈ within the course of 3 hours (Scheme 2).

In addition to the various substituted aromatic hydrocarbons, heteroaromatic compounds are also good substrates for HIE with catalyst 2. For instance, in 5-membered heterocyclic compounds such as N-methyl-pyrrole, 1-methylimidazole, 2-methylfuran, and 2,5-dimethylfuran, most aromatic protons were deuterated with incorporation levels ranging from 80 to 98% (Scheme 2, [d₂]-16-[d₂]-19). In addition, for 2-methylfuran deuteration of the methyl substituent was also observed to a large extend (50%). Because of the vastly different physicochemical and electronic properties of pyrroles, imidazoles, and furans, it is difficult to rationalize the regioselectivity for each substrate individually. In general, H/D exchange of hydrogen atoms ortho to a heteroatom is highly favorable and is most-likely directed by pre-coordination of the heteroatom to the metal center.

Pre-coordination also explains the deuteration of the C(sp³)-H bonds in 2-methyl furan (Scheme 2; [d₃]-18). However, for 2,5-dimethylfuran ([d₂]-19) and 2,6-dimethylpyridine ([d₁]-15) coordination to the metal center is hampered due to steric crowding and deuteration of the C(sp³)-H bonds is not observed. Furthermore, for 5-membered heterocycles, deuteration of C—H bonds adjacent to methyl substituents is more feasible because they are sterically more accessible compared to their 6-membered counterparts (e.g., compare [d₃]-16-[d₂]-19 with ([d₁]-15). For 6-membered aromatic heterocycles such as 2,6-lutidine deuteration was regioselective for the sterically most accessible para proton (Scheme 2, [d₁]-15). For quinoline all aromatic C—H bonds were deuterated to yield quinoline-d₇ (Scheme 2, [d₇]-21). The different degree of deuteration in quinoline reflects the different bond dissociation energies of the various C(sp²)-H bonds, which are lower for pyridines.

Compared to the previously reported earth-abundant metal complexes (Zhang et al., 2020; Zarate et al., 2019; Yang et al., 2018; Palmer and Chirik, 2017; Pony Yu et al., 2016; Lenges et al., 2000), catalyst 2 typically facilitates higher degrees of deuterium incorporation. Compared to the state-of-the-art, the observed substrate scope and regioselectivity are in agreement with those reported in the seminal work by Chirik and co-workers (Pony Yu et al., 2016). However, the herein reported reaction times are generally shorter (24 vs. 3 hours), with an overall higher degree of deuteration. When compared to the ruthenium catalyst reported by Milstein and Leitner (Prechtl et al., 2007), the herein reported H/D exchange is much faster (3 hours vs. 72 hours), occurs at an overall lower temperature and exhibits a much wider substrate scope. However, it must be noted that a fair comparison is challenging due to the different nature of (i) the used solvents (e.g., benzene vs. THF); (ii) the deuterium source (D₂, D₂O, or C₆D₆); and (iii) the used catalyst loadings.

Nonetheless, the advantage of the herein reported system is that because H₂/D₂ is not required, reducible substituents such as esters ([d₂]-12) and amides ([d₃]-13) are tolerated quite well. For instance, ethyl 4-fluorobenzoate is selectively deuterated at the ortho position (60%), while N,N-dimethylbenzamide is selectively deuterated at the meta- and para position (Scheme 2). The difference in regioselectivity between [d₂]-12 and [d₃]-13 is due to different steric requirements of the directing group, although electronic effects from the fluorine atom cannot be excluded (vide infra). Unfortunately, substrates containing ketones (e.g., acetophenone, benzophenone, and/or cyclohexyl phenyl ketone) are not susceptible for catalytic H/D exchange, most likely due to catalyst deactivation upon addition of the ketone. Nonetheless, these results do not negate the fact that complex 2, tolerates several functional groups (e.g., halides, ethers, esters, amides, and/or heterocycles). An additional advantage of the herein reported system is that catalyst 2 can readily be prepared from simple precursors and does not readily eliminate H₂ upon exposure to N₂ contributing to the overall stability of the catalyst and the straightforward nature of the herein presented HIE.

Study 2. Z-Selective Alkyne Functionalization Catalyzed by a Trans-Dihydride NHC Iron Complex Study 1 discloses an efficient method for synthesizing PC$_{NHC}$P functionalized iron complex 1, which facilitates catalytic HIE at aromatic hydrocarbons upon formation of the stable trans-dihydride iron complex 2 (Scheme 1). Given the importance of transition-metal hydrides in alkyne functionalization strategies, in the present Study, the reactivity of iron complex 2 towards terminal alkynes, in the presence of 4,4,5,5-tetramethyl-1,3,2-dioxaborolane (HBpin), was investigated. Gratifyingly, addition of 2 to a solution of phenylacetylene and HBpin in THF resulted in the quantitative formation of (Z)-phenylvinylboronate ester (Scheme 3, 5a) with excellent stereo-selectivity (E/Z; 2:98). Given that complex 2 is highly active for the hydroboration of phenylacetylene, other terminal alkynes were explored as well (Scheme 3). For example, p-tolylacetylene yielded the corresponding (Z)-tolylvinylboronate ester with excellent stereo-selectivity and in excellent yields. Changing the substitution pattern to either mew or ortho did not considerably change the yield or stereoselectivity (Scheme 3; 5b-5d).

Electronically differentiated phenylacetylenes were also hydroborated efficiently. For example, para substituted phenylacetylenes that bear both electron withdrawing (5f: —F; 5g —Br; or 5h: —CF₃) or electron donating (e.g., 5i: —OMe) substituents, are hydroborated in excellent yields (>95%) with similar Z-selectivities (Scheme 3). Other functional groups such as esters (5j) or heteroaromatics (5k and 5l) are also tolerated, although for the ester (5j) a diminished yield and erosion of the Z-selectivity was observed.

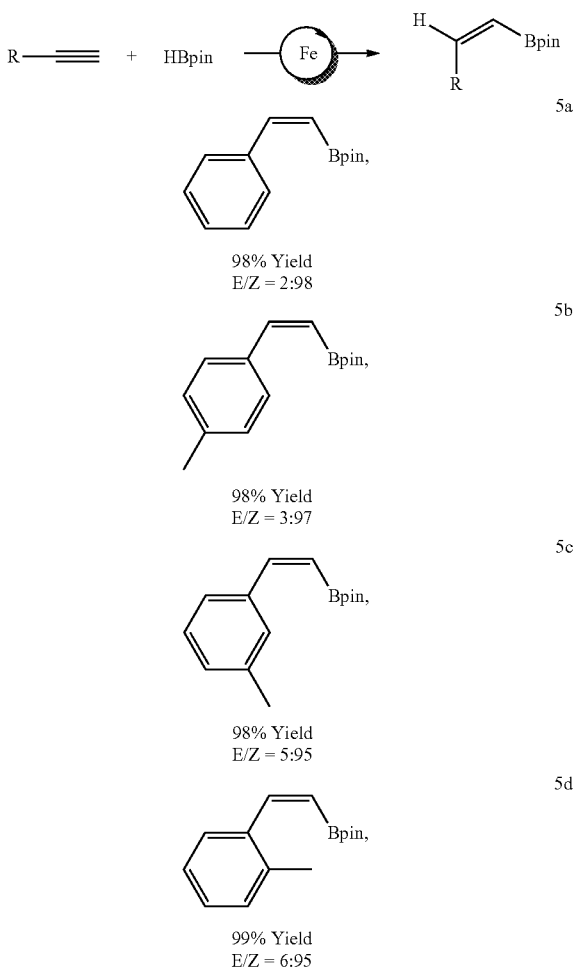

Scheme 3. Scope and limitations of the iron catalyzed (2) hydroboration of alkynes*

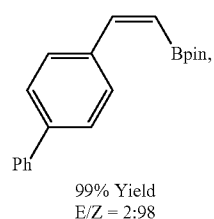

99% Yield
E/Z = 2:98

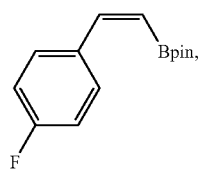

99% Yield
E/Z = 5:95

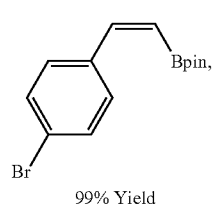

99% Yield
E/Z = 6:94

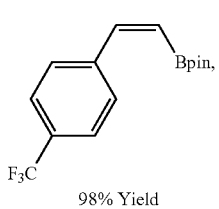

98% Yield
E/Z = 8:92

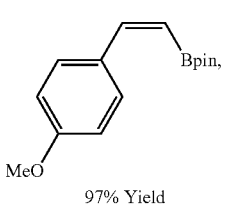

97% Yield
E/Z = 4:96

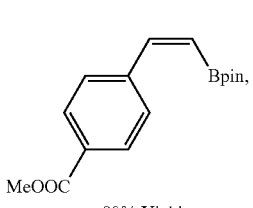

80% Yield
E/Z = 30:40

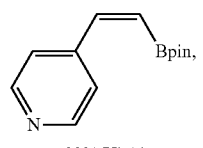

98% Yield
E/Z = 9:91

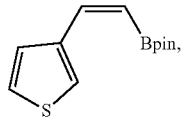

>98% Yield
E/Z = 10:90

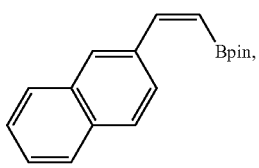

98% Yield
E/Z = 1:99

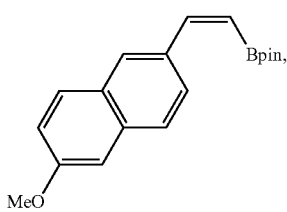

98% Yield
E/Z = 10:90

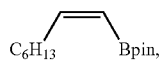

>70% Yield$^c$
E/Z = 44:56

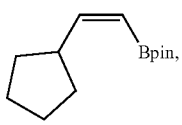

74% Yield$^c$
E/Z = 35:65

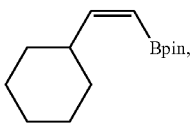

>75% Yield$^c$
E/Z = 35:65

*Reactions were performed with alkyne (0.5 mmol), HBpin (0.55 mmol, 1.1 equiv.), catalyst 2 (2 mol %) in THF (0.5 mL) at room temperature for 4 hours. Yields and selectivity were determined by 1 H NMR spectroscopy with trimethoxybenzene as internal standard. Reactions were performed with 5 mol % catalyst at room temperature for 12 hours.

In contrast, for aliphatic acetylenes higher catalyst loadings and longer reaction times were necessary to obtain reasonable conversion of the starting materials. Yet, under these conditions diminished Z-selectivity was observed when compared to their aromatic counterparts. For example, for 1-octyne only moderate stereo selectivity was obtained (Scheme 4; E/Z~45:55), while using sterically more demanding alkynes did not result in a significant improvement of the observed Z-selectivity (Scheme 4). At higher catalyst loading and pro-longed reaction times, alkene isomerization could become a competing side-reaction (vide infra). No hydroboration is observed for internal alkynes.

These results demonstrate that complex 2 is a good catalyst for the Z-selective hydroboration of terminal alkynes, and one of the few earth-abundant metal alternatives (Gorgas et al., 2017; Obligacion et al., 2015). However, for aliphatic alkynes the observed stereoselectivity is lower than the state-of-the-art as reported by Chirik and Kirchner and a limitation of the catalyst.

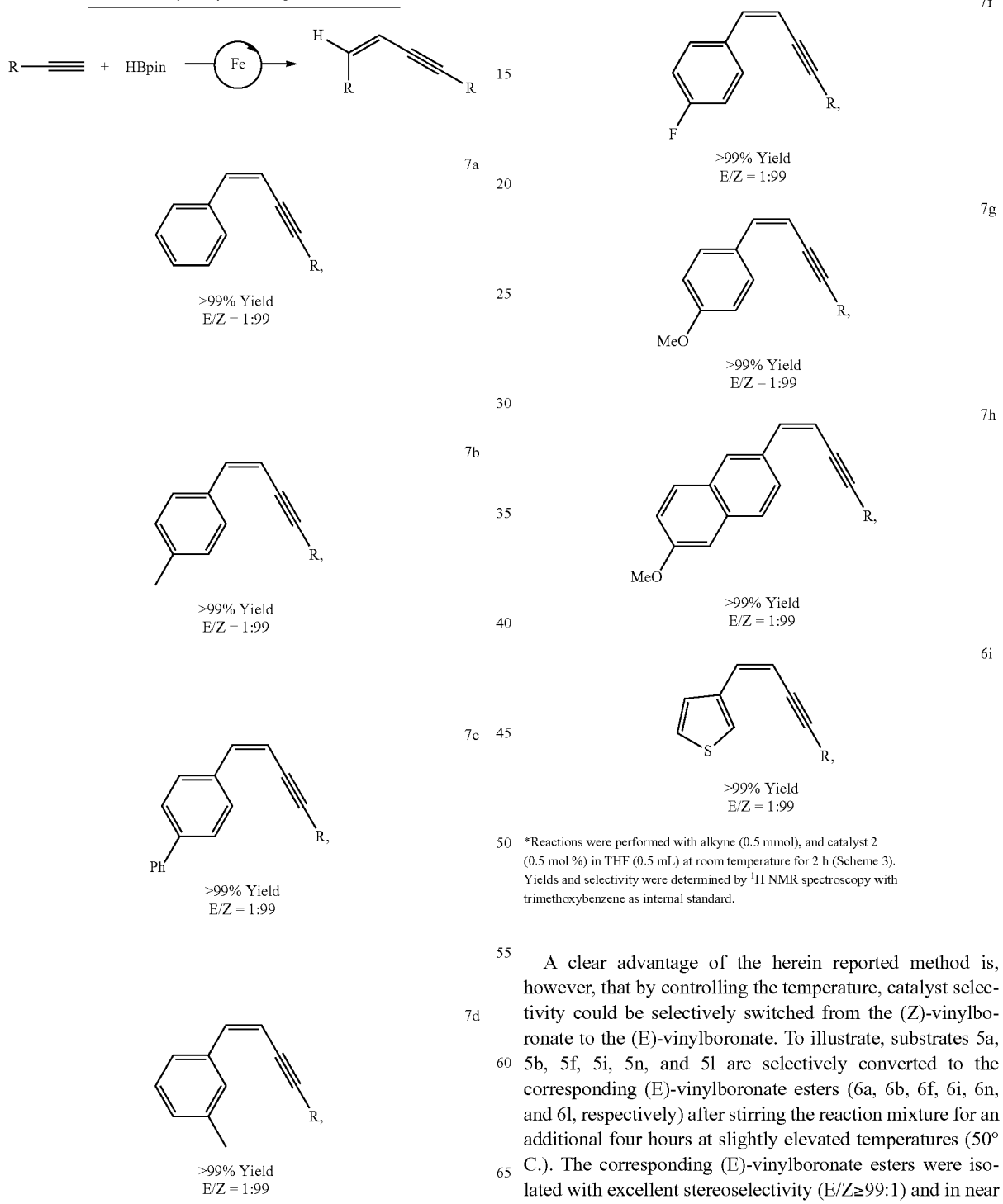

A clear advantage of the herein reported method is, however, that by controlling the temperature, catalyst selectivity could be selectively switched from the (Z)-vinylboronate to the (E)-vinylboronate. To illustrate, substrates 5a, 5b, 5f, 5i, 5n, and 5l are selectively converted to the corresponding (E)-vinylboronate esters (6a, 6b, 6f, 6i, 6n, and 6l, respectively) after stirring the reaction mixture for an additional four hours at slightly elevated temperatures (50° C.). The corresponding (E)-vinylboronate esters were isolated with excellent stereoselectivity (E/Z≥99:1) and in near quantitative yields (Scheme 5).

Scheme 5. Temperature dependent stereoselective synthesis of E- and Z-vinylboronate esters (top); and selective formation of 6a, 6b, 6f, 6i, 6n, and 6l with catalyst 2 under elevated temperatures (50° C.) (bottom)

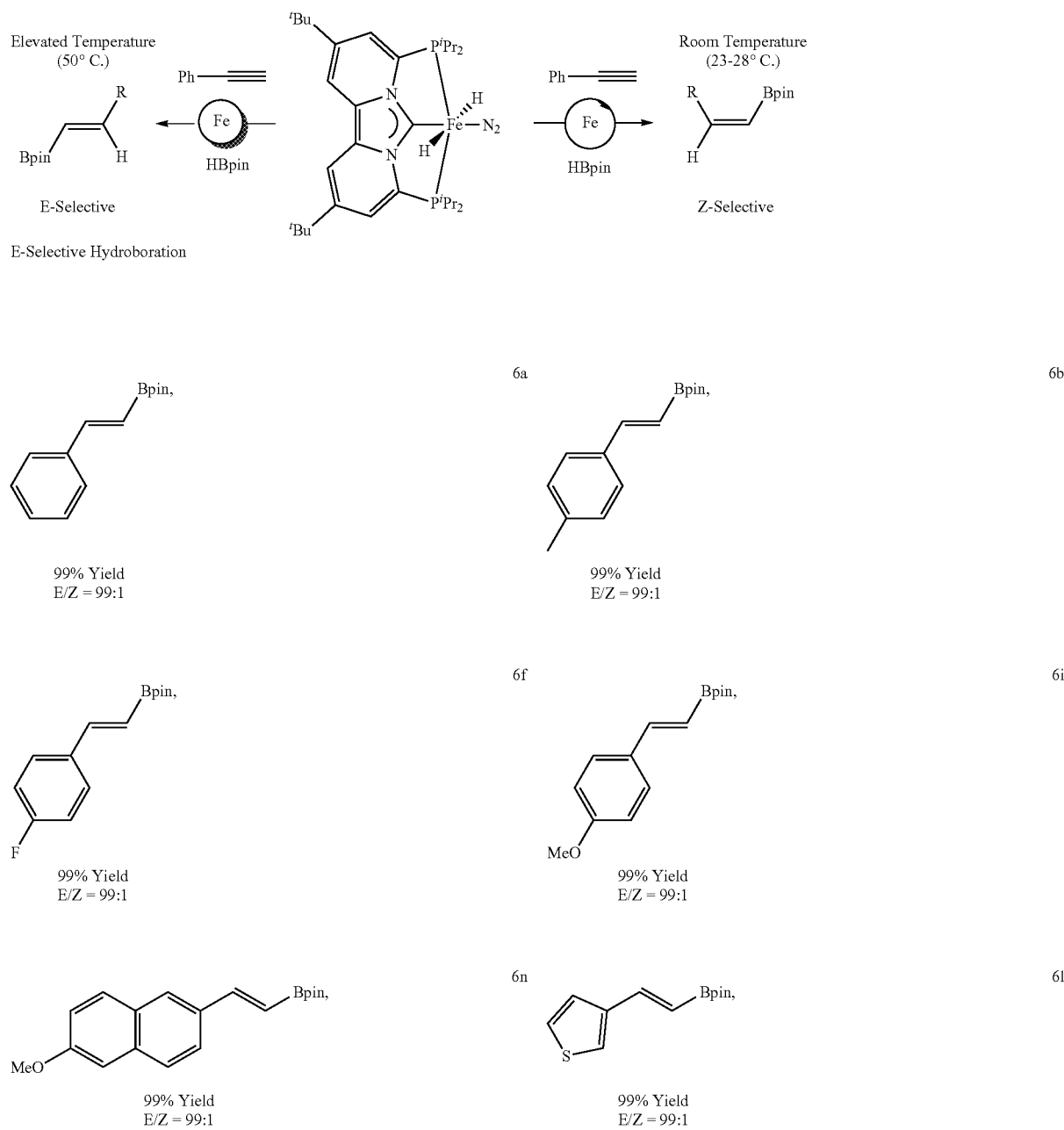

To gain further insight into the type of mechanism of the herein reported hydroboration, we performed a series of stoichiometric experiments. As depicted in Scheme 6, addition of one equiv. of HBpin to complex 2 led to the exclusive formation of [PC$_{NHC}$P)Fe(H)(μ-H)$_2$Bpin)] (4), which might be an important catalytic intermediate. Such a proposal would be consistent with the results reported by Kirchner and Leitner who have shown that their analogous iron and ruthenium complexes ([(PNP)Fe(H)(μ-H)$_2$Bpin)]) and ([PNP)Ru(H)(μ-H)$_2$Bpin)]) are competent pre-catalyst for the Z-selective hydroboration of alkynes (Gorgas et al., 2017; Gunanathan et al., 2012). However, under the herein reported reaction conditions, complex 4 gave 15% yield of the (Z)-vinylboronate after 24 h, suggesting that 4 is an off-cycle species rather than an active (pre)catalyst. It is possible that the poor activity might be related to the reactivity of the Fe—H bond. Calculations by Kirchner and co-workers have shown that for a related iron species [(PNP)Fe(H)(μ-H)$_2$BH$_2$], the Fe—H bond is quite stable and unreactive towards alkynes (Gorgas et al., 2017). To verify for our system, we have synthesized the corresponding complex [(PC$_{NHC}$P)Fe(H)(μ-H)$_2$BH$_2$] (5), and found out that 5 is also catalytically inactive. These data imply that the Fe—H bonds in 4 and 5 are not reactive enough to initiate the hydroboration of terminal alkynes.

Scheme 6. Synthesis of iron PC$_{NHC}$P pincer complexes 4 and 5

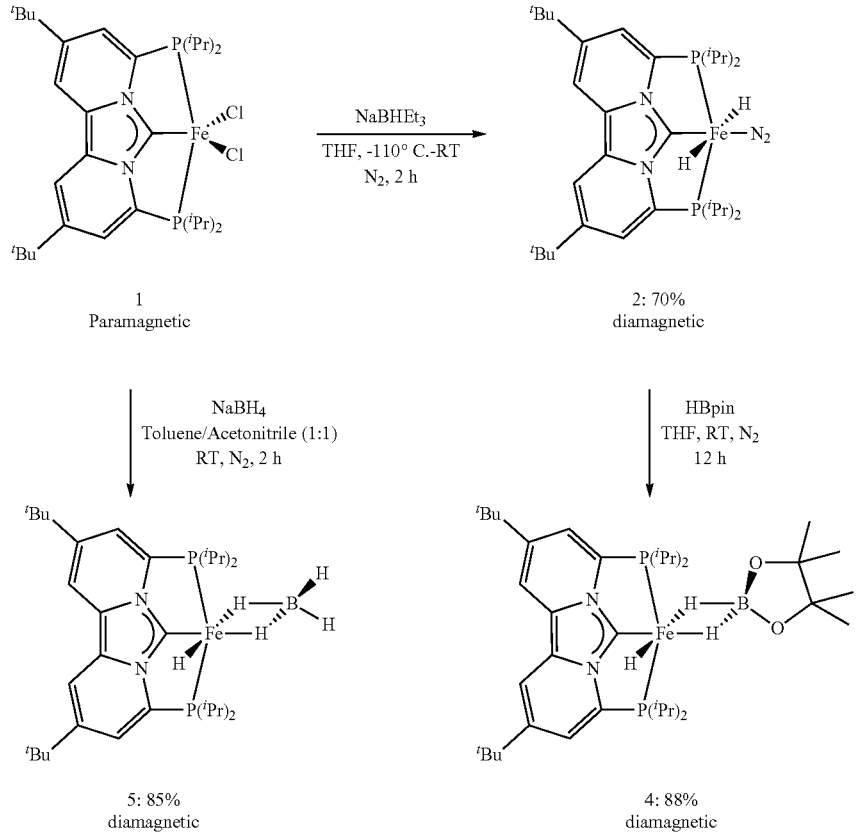

Because complex 4 is probably an off-cycle species, we attempted to isolate an iron(II) bis(acetylide) species that might act as alternative pre-catalyst. Metal-acetylides have been shown by both Chirik and Kirchner to be catalytically relevant intermediates in a syn-hydrometalation pathway. However, adding two equiv. of alkyne to complex 2 resulted in rapid alkyne dimerization. Not dismayed by the additional reactivity of 2 (vide infra), we realized that if such metal-acetylide species are indeed formed, iron dichloride complex 1 should also facilitate the hydroboration of phenylacetylene under basic conditions. Indeed, in the presence of catalytic amount of base (NaHMDS) the corresponding (Z)-vinylboronate is formed in excellent yields (data not shown). Both these observations are consistent with mechanism proposed by Kirchner and co-workers (Gorgas et al., 2018). Given the similar reactivity which we believe is plausible for the herein reported hydroboration as well (data not shown).

Because in the abovementioned experiments alkyne dimerization was observed, we explored this reaction in more detail. Addition of phenylacetylene to a solution complex 2 (0.5 mol %) in THF, gave the corresponding enyne in quantitative yield and with exclusive Z-selectivity. At present, the substrate scope is limited to aromatic acetylenes such as tolyl-, biaryl-, arylhalide, -anisole-, and thiophene-substituted acetylenes (Scheme 4). Most of these substrates give quantitative conversion within 2 hours to the corresponding (Z)-enynes. Aliphatic alkynes such as 1-octyne only produced an intractable mixture of products. Compared to the state-of-the-art for earth-abundant metals, the obtained Z-selectivity in our studies are comparable to those reported by Milstein and Kirchner (Gorgas et al., 2017; Rivada-Wheelaghan et al., 2016), although the herein reported reaction times are generally shorter.

Study 3. Part-Per-Million (PPM) Levels of an Anionic Iron-Hydride Complex Catalyzes Selective Alkene Isomerization Via Two-State Reactivity Experimental General Information. All reactions were performed at room temperature either by using standard Schlenk techniques or by using an $N_2$-filled M. Braun Glovebox unless otherwise specified. Glassware was oven dried at 140° C. for at least 2 h prior to use, and allowed to cool under vacuum. All reagents were used as received unless mentioned otherwise. The iron dichloride and dihydride complex [(PC$_{NHC}$P)FeCl$_2$] and dihydride complex [(PC$_{NHC}$P)FeH$_2$N$_2$], and deuterium labeled compounds (allyl-1,1-d$_2$)benzene and (allyl-3,3-d$_2$)benzene were synthesized according to literature procedure. Anhydrous unstabilized THF and diethyl ether (Et$_2$O) were purchased from Sigma Aldrich and used as received. Terminal alkenes were purchased from Sigma Aldrich or Alfa Aesar and used after filtration over dry activated alumina unless mentioned otherwise. KC$_8$ was synthesized according to literature procedure. The $^1$H, $^2$H, $^{13}$C{$^1$H}, and $^{31}$P NMR spectra were recorded on Bruker AVANCE III 200, 300, 400, and 500 NMR spectrometers at room temperature unless mentioned otherwise. All chemical shifts (δ) are reported in ppm, and coupling constants (J) are in Hz. The $^1$H and $^{13}$C{$^1$H} NMR spectra were referenced using residual solvent peaks in the deuterated solvent. The $^{31}$P chemical shifts are reported relative to the internal lock signal. Deuterated solvents (CDCl$_3$, benzene-d$_6$, toluene-d$_8$ and THF-d$^8$) were purchased from Cambridge Isotope Laboratories, dried over calcium hydride, degassed by three freeze-pump-thaw cycles and vacuum-transferred prior to use. Elemental Analysis were performed by Kolbe Microanalytical laboratory in Oberhausen (Germany).

Synthesis of [((PC$_{NHC}$P)Fe(N$_2$)] (9). As depicted in Scheme 7, in the glovebox, to a frozen suspension of 1 (639.4 mg, 1.0 mmol) in THF (30 mL) was added—drop wise—a frozen suspension of KC$_8$ (283.88 mg, 2.1 equiv.) in THF (5 ml). The resulting reaction mixture was stirred for 2 h at −78° C. and for an additional 15 h at room temperature. Hereafter, the solvent was removed under reduced pressure and the remaining crude solid was re-dissolved in diethyl ether (15 mL) and filtered through a pad of Celite, which was washed with an additional amount of diethyl ether (10 mL). The ether was concentrated under vacuum and the title compound was obtained as dark black crystals upon recrystallization from a concentrated ether solution at room temperature. Yield: 422 mg (70%). $^1$H NMR (300 MHz, THF-d$_8$): δ (ppm) 7.40 (s, 2H, m-bpy-H), 6.90 (s, 2H, m-bpy-H), 2.65 (m, 4H, (CH$_3$)$_2$CH), 1.34 (s, 18H, $^t$Bu), 1.21 (dd, J=13.4, 6.7 Hz, 12H, (CH$_3$)$_2$CH), 1.15 (dd, J=15.7, 7.5 Hz, 12H, (CH$_3$)$_2$CH). $^{13}$C {$^1$H} NMR (75 MHz, THF-d$_8$): δ (ppm) 141.00, 136.96 (t, J=17.4 Hz), 119.47, 116.24, 113.62, 35.76, 30.89, 18.46, 18.22. (carbene carbon not observed). $^{31}$P {$^1$H} NMR (121 MHz, THF-d$_8$): δ (ppm) 124.56 (s).

Anal. Calcd. for [C$_{62}$H$_{100}$N$_{10}$P$_4$Fe] C, 60.98; H, 8.25; N, 11.47. Found: C, 60.84; H, 8.21; N, 11.43.

Synthesis of [(PC$_{NHC}$P)Fe(H)(N$_2$)][Na] (10). As depicted in Scheme 7, in the glovebox, to a frozen suspension of 9 (305.28 mg, 0.25 mmol) in toluene (25 mL) was added—drop wise—a solution of sodium triethylborohydride (NaBHEt$_3$; 1.0 mL, 1.0 mmol) from a 1 M stock solution in toluene. The resulting reaction mixture was stirred for 2 h at −78° C. and for an additional 15 h at room temperature. Hereafter, the reaction mixture was filtered through a pad of celite, which was washed with an amount of toluene (5 mL). The residue was collected with THF (10 mL) and the THF solution was concentrated under reduced pressure to yield a brown solid. The crude solid was re-dissolved in diethyl ether (10 mL) and the title compound was obtained as dark brown crystals upon recrystallization from a concentrated diethyl ether solution at room temperature. Yield: 248 mg (80%). $^1$H NMR (400 MHz, THF-d$_8$): δ (ppm) 6.92 (s, 2H, m-bpy-H), 6.42 (s, 2H, m-bpy-H), 2.52 (hept, J=6.7 Hz, 2H, (CH$_3$)$_2$CH), 2.13-1.95 (m, 2H, (CH$_3$)$_2$CH)), 1.40 (dd, J=6.7, 3.3 Hz, 6H, (CH$_3$)$_2$CH), 1.27 (s, 18H, $^t$Bu), 1.12 (dd, J=15.3, 8.3 Hz, 12H, (CH$_3$)$_2$CH), 0.64 (dd, J=12.2, 6.1 Hz, 6H, (CH$_3$)$_2$CH), −10.85 (t, $^2$J$_{P-H}$=55.1 Hz, 1H, Fe—H). $^{13}$C {$^1$H} NMR (101 MHz, THF-d$_8$): δ (ppm) 143.10 (t, J=9.8 Hz), 139.14, 119.24, 111.87, 111.22, 35.37, 31.01, 29.87 (t, J=5.1 Hz), 29.66 (t, J=6.4 Hz), 20.24, 19.19, 18.74 (t, J=4.1 Hz). (carbene carbon not observed). $^{31}$P {$^1$H} NMR (162 MHz, THF-d$_8$): δ (ppm) 143.13 (s). Anal. Calcd. for [C$_{31}$H$_{51}$N$_4$P$_2$FeNa] C, 60.00; H, 8.28; N, 9.03. Found: C, 58.32; H, 7.94; N, 8.47. Note: Despite several attempts the carbon content was always low.

Scheme 7. Synthesis of iron PC$_{NHC}$P pincer complexes 9 and 10

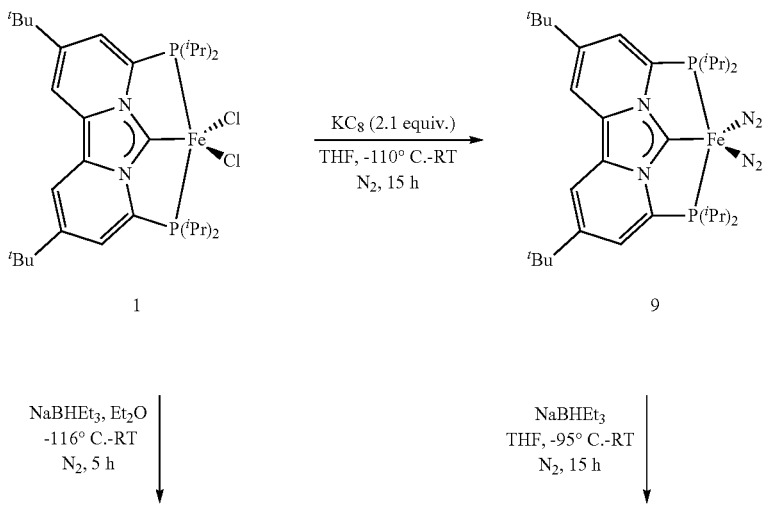

-continued
Fe(II)-dihydride vs. Fe(0)-monohydride

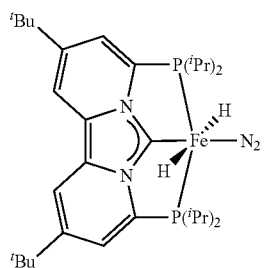
2

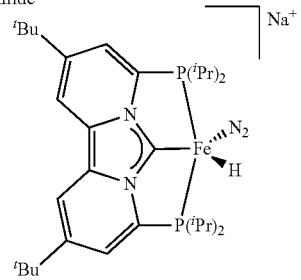
10

Characterized by $^1$H, $^{13}$C, and $^{31}$P NMR spectroscopy, and X-ray crystallography Inactive for Alkene Isomerization Highly Active for Alkene Isomerization General procedure for the single bond alkene isomerization (A): Inside the glovebox, an oven-dried 4 mL vial was charged with substrate (0.1 mmol) and catalyst 10 in toluene-d$_8$ (10 µl to 100 µL, 0.00005 mmol to 0.0005 mmol, and 0.05 mol % to 0.5 mol % from a 0.005 M stock solution) was added. To the reaction mixture was added an additional amount of toluene-d$_8$ or benzene-d$_6$ to make total volume 400 µL. The contents of the vial were subsequently transferred to a J-Young tube and the reaction was monitored by NMR spectroscopy at room temperature. After completion of the reaction at the specified time, the solution was exposed to air and filtered through sort plug of silica to remove the iron catalyst. The silica was washed with an additional 400 µL of toluene-d$_8$ or benzene-d$_6$ to collect all the organic products. The yield and E/Z ratio of the products were determined by combination of $^1$H and $^{13}$C NMR spectroscopy. The stock solution of catalyst 10 was prepared by dissolving 10 (31.0 mg, 0.05 mmol) in toluene-d$_8$ (10 mL).

Results and Discussion

Synthesis of iron hydride PC$_{NHC}$P pincer complexes. Positional alkene isomerization can be generally classified by three major types of mechanisms (i) allyl; (ii) alkyl; and (iii) radical type. The allyl type mechanism results in an overall 1,3-hydrogen shift and requires a low-valent metal complex to facilitate oxidative addition of the alkene. The alkyl type mechanism, on the other hand, is redox-neutral and requires a metal-hydride, which are one of the most common alkene isomerization catalysts (Larionov et al., 2014). Metal hydrides are also involved in radical type mechanisms.

Studies 1-2 hereinabove disclose the synthesis and characterization of a stable trans-dihydride iron complex 2, which demonstrated to be a good catalyst for a variety of organic transformations. Given that complex 2 is stable in the absence of a dihydrogen atmosphere; we rationalized that alkene isomerization could be favored over alkene hydrogenation under the appropriate reaction conditions. Unfortunately, freshly prepared 2 did not show any activity towards the isomerization of allylbenzene. Not dismayed by these results, we then reasoned that exploiting analogous iron-hydride complexes in lower oxidation states (e.g., Fe$^1$ or Fe$^0$) might facilitate more efficient alkene isomerization catalysts. Indeed, the corresponding iron(0)-hydride complex (10) demonstrated to be an exceptional catalyst for the isomerization of a wide variety of terminal alkenes (vide infra).

As depicted in Scheme 7, complex 10 could be readily accessed via a two-step procedure from [PC$_{NHC}$P)FeCl$_2$] (1). In the first step, reduction of complex 1 with two equiv. of potassium graphite (KC$_8$) results in the formation of a new diamagnetic species [(PC$_{NHC}$P)Fe(N$_2$)$_2$] (9), which was fully characterized by $^1$H, $^{13}$C, and $^{31}$P NMR spectroscopy and by X-Ray crystallography. Complex 10 could be generated by the addition of sodium triethylborohydride (NaBHEt$_3$; 2.0 equiv.) to a solution of complex 9 in toluene. The $^1$H NMR spectrum of 10 shows a characteristic triplet at −10.85 ppm ($^2J_{P-H}$=55.1 Hz) and a single phosphine resonance at 141.6 ppm in the $^{31}$P NMR spectrum. These spectroscopic data indicate the presence of a single hydride ligand, which was also confirmed by X-ray crystallography (FIG. 2).

Figure 2:
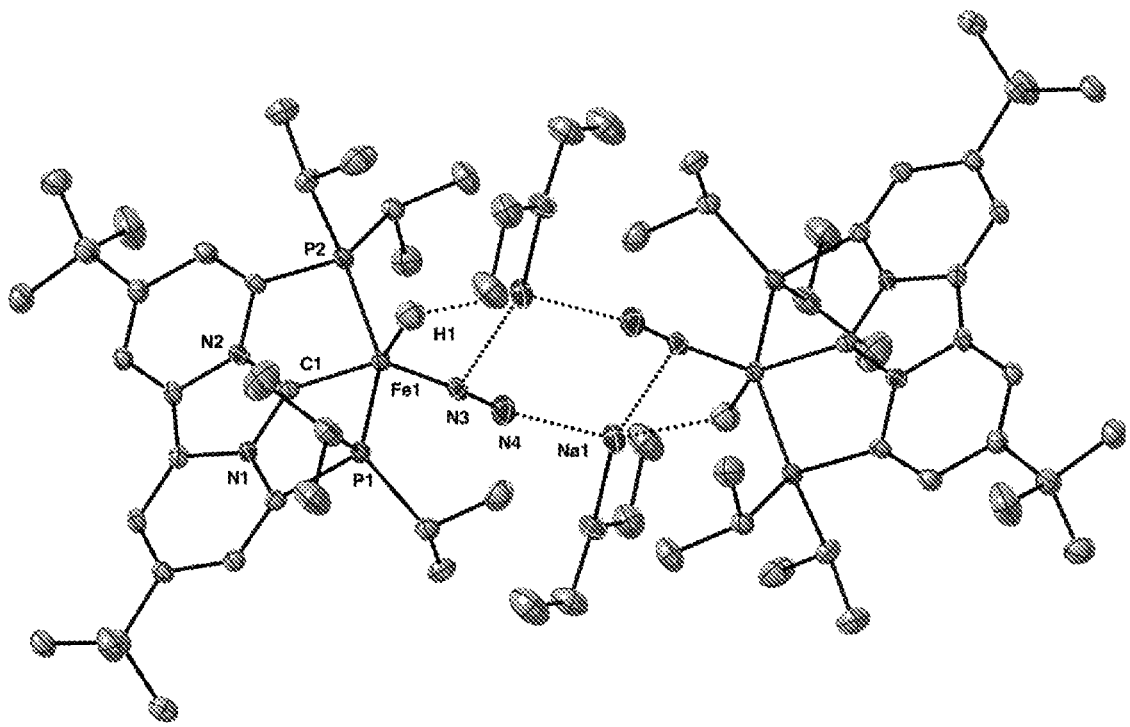
FIG. 2 shows solid state structure of complex 7. Thermal ellipsoids are shown at the 50% probability level. Except for the hydrides, all hydrogen atoms and co-crystallized solvent molecules are omitted for clarity.

The solid-state structure of 10 is shown in FIG. 2 and features a dimeric dinitrogen bridged iron-hydride complex in a trigonal bipyramidal geometry, with the hydride and dinitrogen ligands in the equatorial position and two sodium atoms linking the two iron fragments. The short iron-carbene (Fe$_1$-C$_1$) and iron-phosphine (Fe-P1) distances of 1.831(2) Å and 2.174(7) Å are comparable to those observed in complex 9 and indicate strong binding of the iron metal center to the PC$_{NCH}$P pincer ligand (data not shown) (Kaplan et al., 2012). The Fe1-H$_1$ bond distance of 1.601(2) Å is quite long, but comparable to other iron-hydride complexes in trigonal bipyramidal geometry. Because of the anionic character of the metal complex, the dinitrogen N—N bond distance of 1.155(6) Å is indicative of some N$_2$ activation, which is also witnessed by the short Fe—N bond distance of 1.764(2) Å. Overall, the crystallographic and spectroscopic data confirm that 10 is an anionic iron(0) mono-hydride complexes.

Surprisingly, complex 10 is one of the very few reported anionic iron(0) hydride complexes in the literature. Most recently, Peters and co-workers reported the first example of an anionic iron(0) hydride complex that was not stabilized by carbonyl ligands (Schild and Peters, 2019). Prior to their report, almost all other examples of anionic iron(0) hydride complexes belong to the class of hydridocarbonylferrates (e.g., [HFe(CO)$_4$]$^-$) that were first reported more than 60 years ago (Sternberg et al., 1956; Sternberg et al., 1957; Cramer and Lindsey, 1966; Tooley et al., 1985; Mokhtarzadeh et al., 2015). The catalytic properties of these complexes have been evaluated, although as alkene isomerization catalyst they only showed very poor activity (Brunet, 1990). Complex 10, however, features a strong-field $PC_{NHC}P$ pincer ligand that might bestow electronic properties onto the iron metal center that are distinct from those in traditional hydridocarbonylferrates, ultimately benefitting catalysis.

Selective positional alkene isomerization. With the anionic iron(0) hydride complex in hand, its activity in the isomerization of allylbenzene was investigated. Addition of complex 10 (1 mol %) to a solution of allylbenzene (1 mmol) in toluene-$d_8$ (400 μL) resulted in the formation of trans-β-methylstyrene (E/Z=14:1) within minutes. In the absence of catalyst, no isomerization was observed. After some optimization steps (data not shown), the optimal catalyst loading was found to be 0.1 mol %, which rapidly isomerizes allylbenzene to trans-β-methylstyrene in 15 minutes (Scheme 8). Further investigating the substrate scope revealed that, under these reaction conditions, a diverse set of functional groups are tolerated. For example, biologically relevant substrates containing esters and ethers including estragole, safrole, methyl eugenol, and eugenol acetate, are all converted to their corresponding isomers within 15 minutes and with excellent stereo selectivities (Scheme 8, 5e-5h; E/Z≥25:1). Allylbenzenes with electron withdrawing substituents (e.g., —$CF_3$ or —F; Scheme 8, 5c-5d) or those that contain sensitive functional groups (e.g., —$NO_2$ or —COOMe; Scheme 8, 5h-5i) are also well tolerated. Substrates containing ketones, however, are not tolerated and most likely result in catalyst decomposition as was also observed with the iron(II) dihydride complex 2.

Besides the one-bond isomerization of allylbenzenes, linear aliphatic alkenes are likewise isomerized with good to excellent stereoselectivity (Scheme 8). Both 1-hexene and 1-octene are isomerized to 2-hexene and 2-octene within 15 minutes with 500 ppm (0.05 mol %) of iron complex 10. The short reaction time and low catalyst loading indicate a TOF of ca. 2000 $h^{-1}$. For most other alkenes, catalyst loadings between 0.1-0.2 mol % were necessary to obtain good conversions to the corresponding internal alkenes (Please note that catalyst loadings vary between 0.1 and 0.5 mol %, and are dependent on the purity of the substrate).

It must be noted that the catalyst loading seems to be dependent on the purity of the starting material, with less pure substrates requiring slightly higher catalyst loadings. Notwithstanding, the used catalyst loadings in Scheme 8 are comparable to those used by Grotjahn and Huang for their ruthenium and iridium catalysts respectively (Larsen et al., 2014; Larsen and Grotjahn, 2012; Wang et al., 2017; Massad et al., 2020). However, the TOFs reported in this study are an order of magnitude higher than those reported for one of the most active precious metal catalysts (TOF Fe: 2000 $h^{-1}$ vs. TOF Ir: 524 $h^{-1}$) (Wang et al., 2017). Overall, the obtained stereoselectivity for the isomerization of linear alkenes is good (E/Z≥10:1) and the reaction tolerates a wide variety of functional groups that includes ethers, esters, halides, siloxanes, silanes, and boronic acids (Scheme 8). Complementary to those functional groups, synthetically relevant substrates such as allyl boronic acids and allyl silanes can also be isomerized quite readily (Scheme 8; 6i and 6j).

Scheme 8. Selective isomerization of terminal alkenes catalyzed by complex 10*

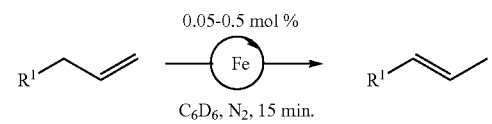

One-Bond Allylbenzene Isomerization

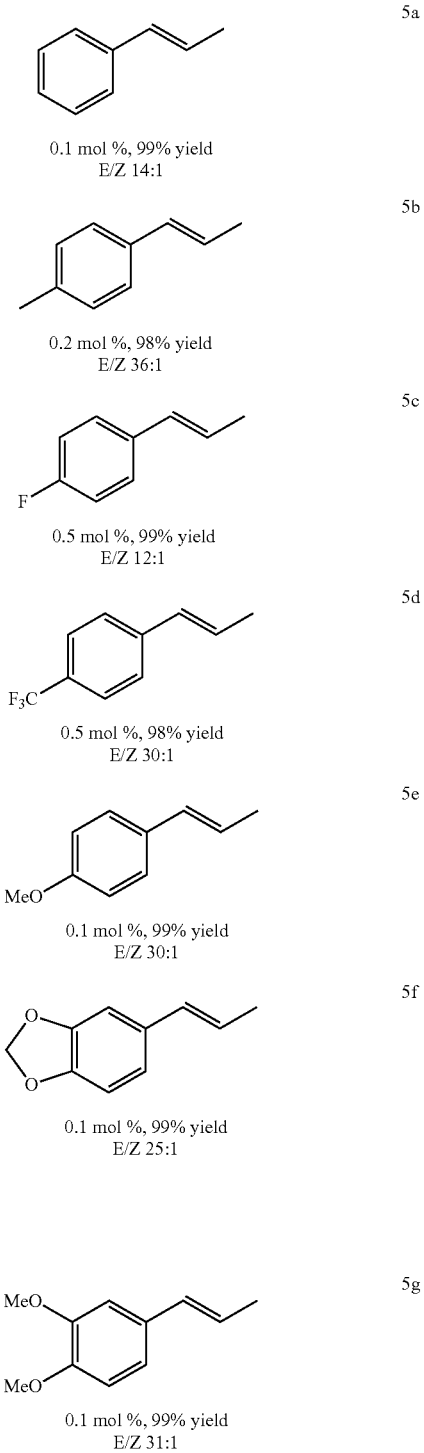

-continued

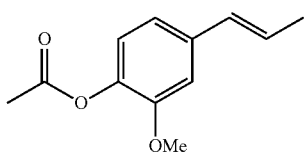

0.2 mol %, 99% yield
E/Z 20:1

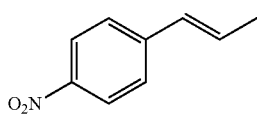

0.2 mol %, 98% yield
E/Z 36:1

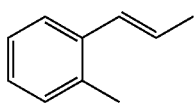

0.1 mol %, 98% yield
E/Z 14:1

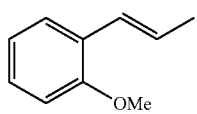

0.1 mol %, 99% yield
E/Z 18:1

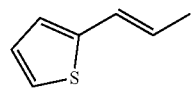

0.2 mol %, 99% yield
E/Z 13:1

One-Bond linear Alkene Isomerization

6a

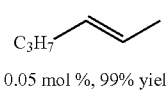

0.05 mol %, 99% yield
E/Z 10:1

6b

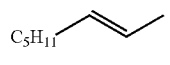

0.05 mol %, 98% yield
E/Z 10:1

6c

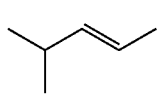

0.1 mol %, 98% yield
E/Z 10:1

6d

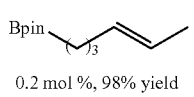

0.2 mol %, 98% yield
E/Z 10:1

6e

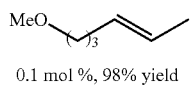

0.1 mol %, 98% yield
E/Z 10:1

5h

5i

5j

5k

5l

6f

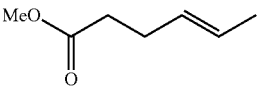

0.2 mol %, 98% yield
E/Z 10:1

6g

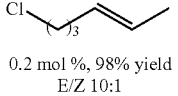

0.2 mol %, 98% yield
E/Z 10:1

6h

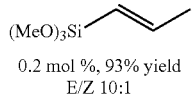

0.2 mol %, 93% yield
E/Z 10:1

6i

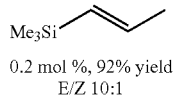

0.2 mol %, 92% yield
E/Z 10:1

6j

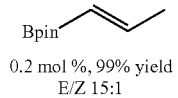

0.2 mol %, 99% yield
E/Z 15:1

6k

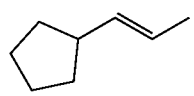

0.1 mol %, 98% yield
E/Z 10:1

6l

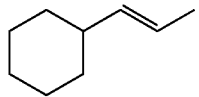

0.1 mol %, 98% yield
E/Z 10:1

*Reactions were performed with 0.05-0.5 mol % catalyst, 0.1 mmol alkene in 400 µL toluene-$d_8$ or benzene-$d_6$ for 15 minutes at room temperature. Yields and stereoselectivites (E vs. Z) were determined by $^1$H and $^{13}$C NMR spectroscopy.

In all these isomerization reactions, the almost exclusive selectivity for one-bond translation of the double bond is desirable and proceeds with a stereo selectivity of at least 10:1 (E/Z) with catalyst loadings at 0.1% or lower (vide infra). Notwithstanding, the herein reported catalyst can also be used for selective multiple-bond isomerization processes (Scheme 9). As expected, at room temperature and with low catalyst loadings, 4-phenylbut-1-ene, 5-phenylpent-1-ene, and 6-phenylhex-1-ene can be selectively isomerized over one position (Scheme 9; 7a-7c). However, when increasing the temperature and catalyst loading, selective two-bond (8a), three-bond (8b), and four-bond (8c) isomerization could be achieved, with good stereoselectivity (E/Z≥15:1). The marked differences in reactivity (i.e., single vs. multiple bond isomerization) are most likely due to the increase in steric demand at the metal center after the first isomerization process, although further investigations are necessary. Overall, these results are in contrast to most other iron catalyzed isomerization reactions, where the stereoselectivity often occurs at the thermodynamically preferred ratio, and where the multiple-bond isomerization has not been investigated.

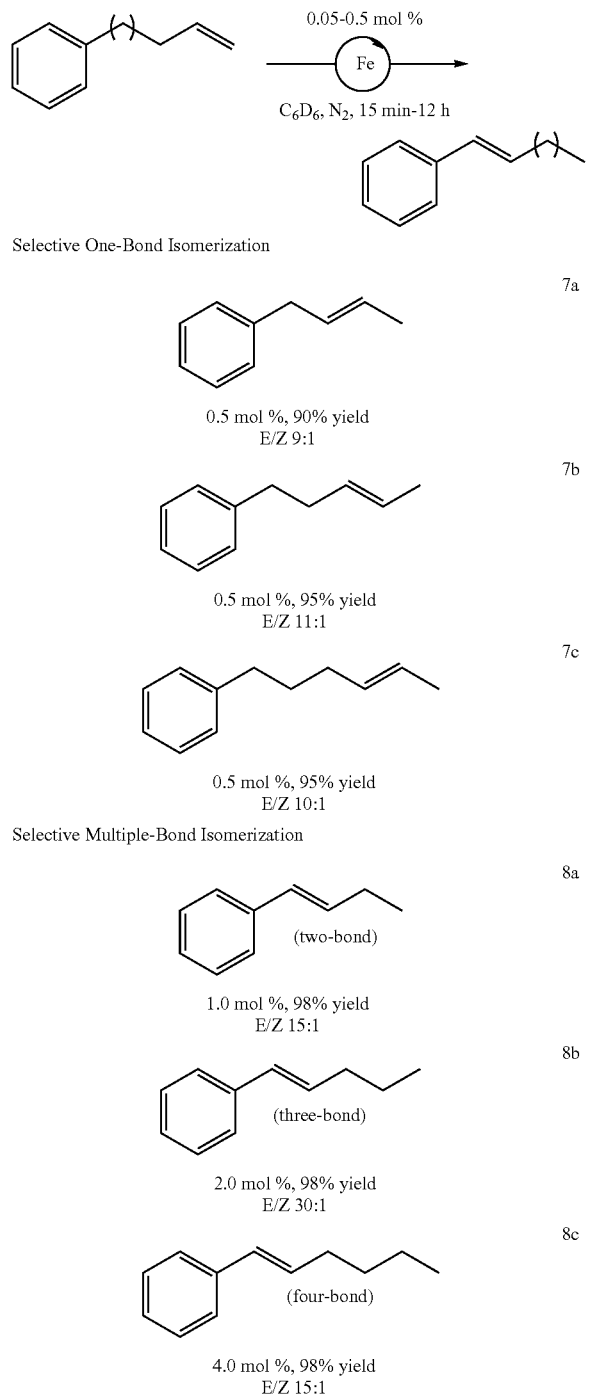

Scheme 9. Selective one- and multiple-bond isomerization of terminal alkenes catalyzed by complex 10*

Selective One-Bond Isomerization 7a  0.5 mol %, 90% yield  E/Z 9:1

7b  0.5 mol %, 95% yield  E/Z 11:1

7c  0.5 mol %, 95% yield  E/Z 10:1

Selective Multiple-Bond Isomerization 8a  (two-bond)  1.0 mol %, 98% yield  E/Z 15:1

8b  (three-bond)  2.0 mol %, 98% yield  E/Z 30:1

8c  (four-bond)  4.0 mol %, 98% yield  E/Z 15:1

*Reactions were performed with 0.5-5.0 mol % catalyst, 0.1 mmol alkene in 400 μL toluene-d$_8$ or benzene-d$_6$ for (i) 15 minutes at room temperature for selective one-bond isomerization and for (ii) 12 h at 50° C. for selective multiple bond isomerization. Yields and stereoselectivites (E vs. Z) were determined by $^1$H and $^{13}$C NMR spectroscopy.

Besides evaluation of the substrate scope in small scale reactions, we also evaluated the isomerization activity of complex 10 in gram scale reactions in order to demonstrate synthetic versatility and utility. Remarkably, when using neat 1-hexene or 1-octene (~12 mmol) catalyst loadings as low 6.25 ppm could be used to aid their isomerization (Scheme 10). Under these conditions a TON of 160,000 was obtained with a maximum TOF of 6600 h$^{-1}$. To the best of our knowledge, these high activities have never been reported with earth-abundant metals and are even surpassing those reported with noble metals such as palladium, ruthenium, and iridium (Larsen et al., 2014; Larsen and Grotjahn, 2012; Wang et al., 2017; De-Botton et al., 2020; Kumar et al., 2015; Beach et al., 2009). These high activities are not only limited to unfunctionalized linear alkenes, allylbenzenes are also isomerized with low ppm levels (50-100 ppm) of catalyst 10 without affecting the stereoselectivity of the isomerization reaction (Scheme 10).

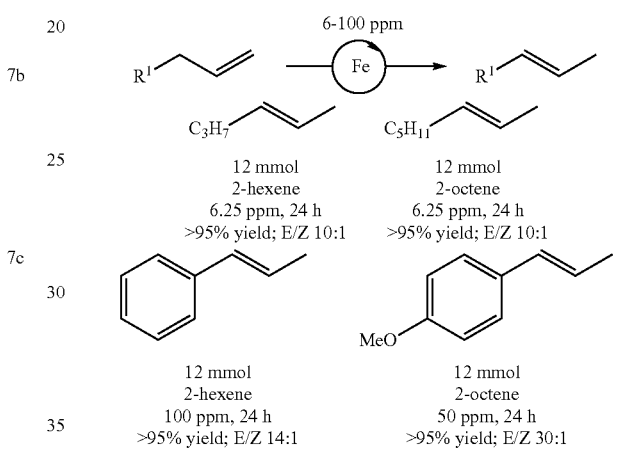

Scheme 10. Gram scale alkene isomerization catalyzed by ppm levels of complex 10*

12 mmol  2-hexene  6.25 ppm, 24 h  >95% yield; E/Z 10:1

12 mmol  2-octene  6.25 ppm, 24 h  >95% yield; E/Z 10:1

12 mmol  2-hexene  100 ppm, 24 h  >95% yield; E/Z 14:1

12 mmol  2-octene  50 ppm, 24 h  >95% yield; E/Z 30:1

*Reactions were performed with 6-100 ppm 10, in neat alkene (ca. 12 mmol) for 12-24 hours at room temperature. Yields and stereoselectivities (E vs. Z) were determined by $^1$H and $^{13}$C NMR spectroscopy.

In order to elucidate the reaction mechanism of this reaction, we performed a series of deuterium labeling experiments. The mechanism of alkene isomerization typically proceeds via an alkyl or allyl-type reaction pathway (Massad and Marek, 2020; Molloy et al., 2019), although radical pathways are also possible (Kapat et al., 2019; Crossley et al., 2014; Crossley et al., 2016; Green et al., 2018). A radical based mechanism, however, was ruled out based on the fact that the isomerization of 1-octene proceeded smoothly even in the presence of known radical scavengers such as 9,10-dihydroantrhacene, xanthene, or 1,1-diphenylethylene (data not shown). In addition, no cyclization was observed with olefins that feature an 1,6-diene motif (data not shown). Although other radical scavengers such as tri-tert-butylhydroxytoluene or TEMPO were investigated, they either engaged in protonation or electron transfer with the catalyst to produce catalytically inactive complexes 9 and 2 respectively (data not shown).

In order to discriminate between an alkyl- or allyl-type mechanism we performed reactivity studies with (allyl-1,1-d$_2$)- and (allyl-3,3-d$_2$)-benzene. As evident from Scheme 11, these studies demonstrate that irrespective of the location of the deuterium label, deuterium is incorporated in all the positions along the carbon chain. Specifically, deuterium incorporation at the 2$^{nd}$ position points towards an alkyl-type mechanism. The operation of an alkyl-type mechanism was further confirmed by a cross-over experiment with (allyl-1, 1-d$_2$)benzene and 3,4-dimethoxy-allylbenzene. In these cross-over experiments, the deuterium label is readily scrambled between the two substrates indicating the involvement of metal-hydride in the alkyl-type mechanism. To completely rule out an allyl type mechanism, we also investigated the isomerization of allylbenzene with iron(0) dinitrogen catalyst 9. As expected, catalyst 9 was not active for alkene isomerization. Instead, after addition allylbenzene to complex 9, a persistent hydride resonance emerged at −11.62 ppm in the $^1$H NMR spectrum of the reaction mixture that might suggest the formation of a π-allyl iron complex that does not readily reductively eliminate the alkene (data not shown).

Scheme 11. Isotope labeling studies in the isomerization of allylbenzene with catalyst 10*

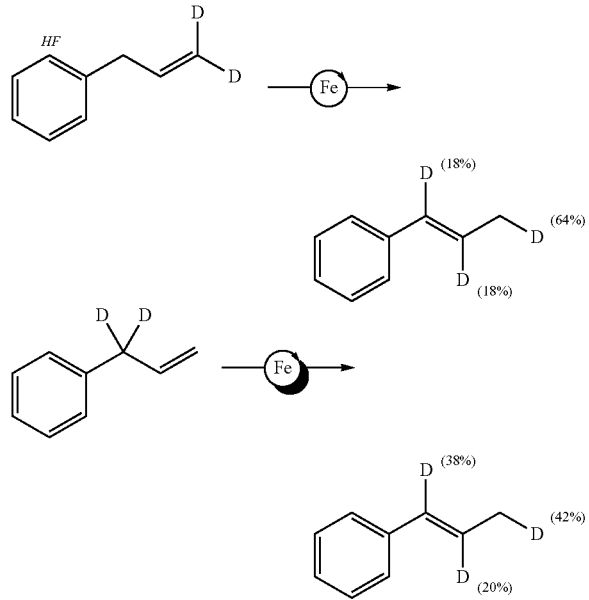

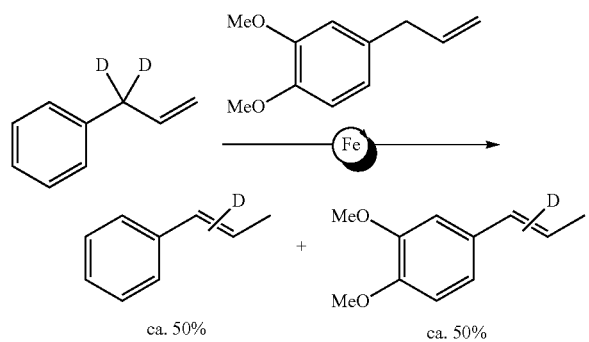

*Reactions were performed with 1 mol % catalyst, 0.2 mmol of total alkene in 400 μL of pentane at room temperature for 15 minutes. Yields and stereoselectivities (E vs. Z) were determined by $^1$H and $^{13}$C NMR spectroscopy.

Study 4. Synthesis of Metal Complexes Other than Those Exemplified in Studies 1-3

Synthesis of [(PC$_{NHC}$P)Mn(CO)$_2$(H)] (I$_3$). In a flame dried schlenk tube, pentacarbonyl bromide (163 mg, 0.60 mmol) and free carbene ligand (PC$_{NHC}$P) (320 mg, 0.63 mmol) were suspended in toluene 30 mL. The orange suspension was heated at 100° C. under the flow of N$_2$ for 20 h. After cooling to the room temperature, the solvent was removed in vacuo. The orange solid was washed with pentane and collected with DCM and dried (yield 90%). This was further treated with NaBHEt$_3$ (1 eq, 0.56 mmol, 560 μL of 1M solution in THF) in DCM (15 mL) and stirred for 45 min at room temperature in a glove box. Then the solvent was removed in in vacuo and the solid was further collected with benzene and evaporated to dryness to get the desired complex as a dark brown solid. $^1$H NMR: (400 MHz, C$_6$D$_6$) δ=7.11 (s, 2H), 6.84 (s, 1H), 2.52-249 (m, 2H), 2.22-2.19 (m, 2H), 1.59-1.54 (m, 6H), 1.45-1.32 (m, 12H), 1.18 (s, 18H), 0.99-0.94 (m, 6H), −8.33 (t, J$_{H-P}$=45.9 Hz). $^{31}$P NMR (121 MHz, C$_6$D$_6$) δ=139.6.

Synthesis of [(PC$_{NHC}$P)FeH$_3$B(CH$_2$CH$_3$))$_3$][Na$_2$](I$_5$). In the glovebox, to a frozen suspension of complex 2 (299.0 mg, 0.5 mmol) in toluene (5 mL) was added—drop wise—a solution of sodium triethylborohydride (NaBHEt$_3$; 1.0 mL, 1.0 mmol) from a 1 M stock solution in toluene. The resulting reaction mixture was stirred for 2 h at −78° C. and for an additional 6 h at room temperature. Hereafter, the reaction mixture was filtered through a pad of, which was washed with an amount of toluene (5 mL). The toluene solution was concentrated under reduced pressure to yield a green solid. The crude solid was re-dissolved in pentane (10 mL) and the title compound was obtained as dark brown crystals upon recrystallization from a concentrated pentane solution at −40° C. Yield: 252 mg (60%). $^1$H NMR (400 MHz, THF-d$_8$): δ (ppm) 6.99 (s, 2H, m-bpy-H), 6.45 (s, 2H, m-bpy-H), 2.11 (m, 4H, (CH$_3$)$_2$CH), 1.28 (s, 18H, $^t$Bu), 1.12 (m, 24H, (CH$_3$)$_2$CH), 0.75 (s (broad), 12H, B(CH$_2$CH$_3$)$_3$, 0.07 (s (broad), 8H, B(CH$_2$CH$_3$)$_3$−12.25 (s, 1H, Fe—H), −14.04 (t, $^2$J$_{P-H}$=43.0 Hz, 2H, Fe—H). $^{31}$P {$^1$H} NMR (162 MHz, toluene-d$_8$): δ (ppm) 141.28 (s).

Synthesis of [(PC$_{NHC}$P)Fe(H)(η$^2$-H$_2$Bpin)] (I$_7$). In the glovebox, to a stirred solution of complex 2 (598.6 mg, 1.0 mmol) in THF (50 mL) was added 4,4,5,5-tetramethyl-1,3,2-dioxaborolane (HBpin; 435.3 μL, 3.0 mmol). The resulting reaction mixture was stirred for 12 h at room temperature, where after all volatiles were removed under reduced pressure. Hereafter the crude solid was re-dissolved in pentane (25 mL) and filtered through a pad of Celite. Next, the pentane was removed under reduced pressure and the title compound was obtained as purple crystals upon recrystallization from a concentrated pentane solution −35° C. Yield 615 mg (88%). $^1$H NMR (300 MHz, C$_6$D$_6$): δ (ppm) 7.08 (s, 2H, m-bpy-H), 6.82 (s, 2H, m-bpy-H), 3.26 (hept, J=6.9 Hz, 2H, (CH$_3$)$_2$CH), 2.49 (hept, J=6.7 Hz, 2H, (CH$_3$)$_2$CH), 1.46 (dd, J=16.3, 6.8 Hz, 6H, (CH$_3$)$_2$CH), 1.39 (dd, J=15.6, 7.7 Hz, 6H, (CH$_3$)$_2$CH), 1.35 (s, 6, CH$_3$(HBpin)), 1.31 (s, 6, CH$_3$(HBpin)), 1.30 (dd, J=16.9, 5.9 Hz, 6H, (CH$_3$)$_2$CH), 1.21 (s, 18H, 113u), 1.12 (dd, J=14.8, 6.8 Hz, 1H. (CH$_3$)$_2$CH), −11.87 (s, 1H, FeHB), −12.24 (s, 1H, FeHB), −15.03 (td, J=48.5, 11.3 Hz, 1H, Fe—H). $^{13}$C {$^1$H} NMR (101 MHz, C$_6$D$_6$): δ (ppm) 141.48 ((o-bpy-C)), 139.07 (t, o-bpy-C), 120.79 (p-bpy-C), 116.30 (m-bpy-C), 111.91 (m-bpy-C), 80.48 (OC-Bpin), 34.92 (q-$^t$Bu), 30.49 ($^t$Bu), 26.87 (t, (CH$_3$)$_2$C), 25.06 ((CH$_3$)$_2$C), 25.02 ((CH$_3$)$_2$C), 24.49 (t, (CH$_3$)$_2$C), 20.76 (CH$_3$—Bpin), 20.38 (CH$_3$—Bpin), 18.10 (t, (CH$_3$)$_2$C), 17.38 (t, (CH$_3$)$_2$C). $^{31}$P {$^1$H} NMR (162 MHz, C$_6$D$_6$): δ (ppm) 132.07. Elemental Analysis: Anal. Calcd. (%) for C$_{20}$H$_{22}$F$_6$N$_3$OP: C, 63.62, H, 9.38, N, 4.01; Found: C, 63.47, H, 9.42, N, 3.84. HRMS (TOF MS ES$^+$, positive ion; m/z): calcd. for [C$_{37}$H$_{64}$BO$_2$N$_2$P$_2$Fe]$^+$ ([$^i$PrPCPFeH$_2$Bpin]$^+$): 697.3885; found 697.3892.

Synthesis of [(PC$_{NHC}$P)Fe(H)($\eta^2$-H$_2$BH$_2$] (I$_9$). In the glovebox, to a stirred solution of complex 1 (639.4 mg, 1.0 mmol) in ethanol:acetonitrile (100 mL; 1:1 (v/v)), sodium borohydride (NaBH$_4$; 113.49 mg, 3.0 mmol) was added in one portion. The resulting reaction mixture was stirred for 2 h at room temperature, where after all volatiles were removed under reduced pressure. Hereafter the crude solid was re-dissolved in diethylether (25 mL) and filtered through a pad of Celite. Next, the diethylether was removed under reduced pressure and the title compound was obtained as purple crystals upon recrystallization from a concentrated solution of diethyl ether at −35° C. Yield 496.7 mg (85%). $^1$H NMR (400 MHz, C$_6$D$_6$): δ (ppm): 7.08 (s, 2H, m-bpy-H), 6.86 (s, 2H, m-bpy-H), 5.29 (s, 2H, BH$_2$), 2.95 (hept, J=6.9 Hz, 2H, (CH$_3$)$_2$CH), 2.55-2.41 (m, 2H, (CH$_3$)$_2$CH), 1.41 (dd, J=16.1, 7.1 Hz, 6H, (CH$_3$)$_2$CH), 1.34 (dd, J=9.7, 6.0 Hz, 6H, (CH$_3$)$_2$CH), 1.24 (dd, J=7.2 Hz, 6H, (CH$_3$)$_2$CH), 1.20 (s, 18, $^t$Bu), 1.07 (dd, J=14.6, 6.9 Hz, 6H, (CH$_3$)$_2$CH), −11.80 (s, 1H, FeHB), −12.63 (s, 1H, FeHB), −23.08 (t, J=52.6 Hz, 1H, FeH). $^{13}$C {$^1$H} NMR (101 MHz, C$_6$D$_6$): δ (ppm) 198.55 (NCN), 141.43 (o-bpy-C), 137.54 (t, o-bpy-C), 121.03 (p-bpy-C), 116.00 (m-bpy-C), 111.83 (m-bpy-C), 34.60 (q-$^t$Bu), 30.10 ($^t$B), 25.03 (t, (CH$_3$)$_2$C), 24.55 (t, (CH$_3$)$_2$C), 20.08 ((CH$_3$)$_2$C), 19.72 ((CH$_3$)$_2$C), 17.66 ((CH$_3$)$_2$C), 17.04 ((CH$_3$)$_2$C). $^{31}$P {$^1$H} NMR (162 MHz, C$_6$D$_6$): δ (ppm) 118.3 (s), 117.99 (s). Elemental Analysis: Anal. Calcd. (%) for C$_{31}$H$_{55}$BFeN$_2$P$_2$: C, 63.71, H, 9.49, N, 4.79; Found: C, 63.84, H, 9.68, N, 4.69. HRMS (TOF MS ES$^+$, positive ion; m/z): calcd. for [C$_{31}$H$_{54}$BN$_2$P$_2$Fe]$^+$ ([$^i$PrPCPFeH$_2$BH$_2$]$^+$):583.3205; found 583.3209.

Synthesis of [((PC$_{NHC}$P)Fe(p-Tol)$_2$N$_2$] (II$_4$). In the N$_2$ filled glovebox, to a thawing suspension of [(PC$_{NHC}$P)Fe(Cl/Br)(p-Tol)] (35.8 mg, 0.05 mmol) in benzene (2 mL) was added—drop wise over 5 min—a thawing suspension of p-TolMgBr (100 μL, 1 M solution in THF, THF was first evaporated under vacuum and re-dissolved in benzene) in benzene (5 ml). The resulting reaction mixture was stirred for 12 h at 25° C. (color of reaction mixture changes from yellow/brownish to green to purple) and became homogenous. After 12 h the solution was evaporated under vacuum and washed with diethyl ether (2×2 ml). Hereafter, the residue was dissolved in benzene (2 ml) and filtered through a pad of Celite, which was washed with an additional amount of benzene (1 mL). The benzene solution was concentrated under vacuum and the title compound was obtained as dark purple crystals upon crystallization after slow evaporation of benzene at room temperature. Note: Color of solution changes under vacuum to green (N$_2$ decoordinated complex). $^1$H NMR (600 MHz, C$_6$D$_6$): δ (ppm) 8.88 (d, J=7.7 Hz, 2H, p-Tol), 7.44 (s, m-bpy-H), 7.16 (2 h, p-Tol), 6.85 (s, 2H, m-bpy-H), 6.29 (d, J=9.6 Hz, 2H, p-Tol), 5.30 (d, J=7.5 Hz, 2H, p-Tol), 5.30 (s, 3H, p-Tol), 2.08 (m, 4H, (CH$_3$)$_2$CH), 1.23 (dd, J=12.8, 6.9 Hz, 12H, (CH$_3$)$_2$CH), 1.12 (s, 18H, $^t$Bu), 0.81 (dd, J=14.1, 7.2 Hz, 12H, (CH$_3$)$_2$CH). $^{31}$P {$^1$H} NMR (243 MHz, C$_6$D$_6$): δ (ppm) 95.12 (s).

Synthesis of [(PC$_{NHC}$P)Fe(Cl/Br)(p-Tol)] (II$_5$/II$_6$). In the N$_2$ filled glovebox, to a thawing suspension of complex 1 (64 mg, 0.1 mmol) in benzene (5 mL) was added—drop wise over 5 min—a thawing suspension of p-TolMgBr (100 μL, 1 M solution in THF, THF was first evaporated under vacuum and re-dissolved in benzene) in benzene (5 ml). The resulting reaction mixture was stirred for 2 h at 25° C. (color of reaction mixture changed from yellow/brownish to green) and became homogenous. Hereafter, the solvent was concentrated under reduced pressure to 2 ml and filtered through a pad of Celite, which was washed with an additional amount of benzene (1 mL). The benzene solution was concentrated under vacuum and the title compound was obtained as dark green crystals upon crystallization after slow evaporation of benzene at room temperature. $^1$H NMR (600 MHz, C$_6$D$_6$): δ (ppm) 7.23, 6.90, 6.87, 3.13, 2.96, 2.58, 2.49, 2.03, 2.00, 1.69, 1.61, 1.18, 0.94, 0.83, 0.56. All the peaks were broadened and unable to assign due to merging of peaks both belonging to the Fe—Br and Fe—Cl complexes. $^{31}$P {$^1$H} NMR (243 MHz, C$_6$D$_6$): δ (ppm) 82.43 (s).

REFERENCES

Alig, L.; Fritz, M.; Schneider, S., *Chem. Rev.* 2019, 119, 2681-2751

Atzrodt, J.; Derdau, V.; Kerr, W. J.; Reid, M., *Angew. Chem. Int. Ed.* 2018, 57, 1758-1784

Baker, T. M.; Mako, T. L.; Vasilopoulos, A.; Li, B.; Byers, J. A.; Neidig, M. L., *Organometallics* 2016, 35, 3692-3700

Bauer, G.; Hu, X., *Inorganic Chemistry Frontiers* 2016, 3, 741-765

Bauer, I.; Knölker, H. J., *Chem. Rev.* 2015, 115, 3170-3387

Beach, N. J.; Blacquiere, J. M.; Drouin, S. D.; Fogg, D. E., *Organometallics* 2009, 28, 441-447

Brown, H. C.; Campbell Jr., J. B., *Aldrichim. Acta* 1981, 14, 3-11

Brown, R. M.; Borau Garcia, J.; Valjus, J.; Roberts, C. J.; Tuononen, H. M.; Parvez, M.; Roesler, R., *Angew. Chem. Int. Ed.* 2015, 54, 6274-6277

Brunet, J. J., *Chem. Rev.* 1990, 90, 1041-1059

Camp, A. M.; Kita, M. R.; Blackburn, P. T.; Dodge, H. M.; Chen, C.-H.; Miller, A. J. M., *J. Am. Chem. Soc.* 2021, 143, 2792-2800

Carney, J. R.; Dillon, B. R.; Thomas, S. P., *Eur. J. Org. Chem.* 2016, 2016, 3912-3929

Chen, C.; Dugan, T. R.; Brennessel, W. W.; Weix, D. J.; Holland, P. L., *J. Am. Chem. Soc.* 2014, 136, 945-955

Cordova, A., *Catalytic Asymmetric Conjugate Reactions*, Wiley-VCH Verlag GmbH & Co, Weinheim, Germany, 2010

Cornils, B.; Herrmann, W. A.; Beller, M.; Paciello, R., *Applied Homogeneous Catalysis with Organometallic Compounds: A Comprehensive Handbook in Four Volumes,* 3 ed., Wiley-VCH Verlag GmbH & Co, Weinheim, Germany, 2017

Cramer, R.; Lindsey, R. V., *J. Am. Chem. Soc.* 1966, 88, 3534-3544

Crossley, S. W. M.; Barabé, F.; Shenvi, R. A., *J. Am. Chem. Soc.* 2014, 136, 16788-16791

Crossley, S. W. M.; Obradors, C.; Martinez, R. M.; Shenvi, R. A., *Chem. Rev.* 2016, 116, 8912-9000

De-Botton, S.; Filippov, D. S. O. A.; Shubina, E. S.; Belkova, N. V.; Gelman, D., *ChemCatChem* 2020, 12, 5959-5965

Dröge, T.; Glorius, F., *Angew. Chem. Int. Ed.* 2010, 49, 6940-6952

Eizawa, A.; Arashiba, K.; Tanaka, H.; Kuriyama, S.; Matsuo, Y.; Nakajima, K.; Yoshizawa, K.; Nishibayashi, Y., *Nat. Commun.* 2017, 8, 14874

Elmore, C. S., in *Annu. Rep. Med. Chem., Vol.* 44 (Ed.: J. E. Macor), Academic Press, 2009, pp. 515-534

Farrell, K.; Albrecht, M., in *The Privileged Pincer-Metal Platform: Coordination Chemistry & Applications* (Eds.: G. van Koten, R. A. Gossage), Springer International Publishing, Cham, 2016, pp. 45-91

Fritz, M.; Schneider, S., in *The Periodic Table II: Catalytic, Materials, Biological and Medical Applications* (Ed.: D. M. P. Mingos), Springer International Publishing, Cham, 2019, pp. 1-36

Fuku-en, S.-i.; Yamamoto, J.; Kojima, S.; Yamamoto, Y., *Chem. Lett.* 2014, 43, 468-470

Fürstner, A., *ACS Central Science* 2016, 2, 778-789

Gebbink, R. J. M. K.; Moret, M. E., *Non-Noble Metal Catalysis: Molecular Approaches and Reactions*, Wiley-VCH Verlag GmbH & Co, Weinheim, Germany, 2019

Gorgas, N.; Stöger, B.; Veiros, L. F.; Kirchner, K., *ACS Catal.* 2016, 6, 2664-2672

Gorgas, N.; Alves, L. G.; Stöger, B.; Martins, A. M.; Veiros, L. F.; Kirchner, K., *J. Am. Chem. Soc.* 2017, 139, 8130-8133

Gorgas, N.; Kirchner, K., *Acc. Chem. Res.* 2018, 51, 1558-1569

Gorgas, N.; Stöger, B.; Veiros, L. F.; Kirchner, K., *ACS Catal.* 2018, 8, 7973-7982

Green, S. A.; Crossley, S. W. M.; Matos, J. L. M.; Vásquez-Céspedes, S.; Shevick, S. L.; Shenvi, R. A., *Acc. Chem. Res.* 2018, 51, 2628-2640

Gunanathan, C.; Hölscher, M.; Pan, F.; Leitner, W., *J. Am. Chem. Soc.* 2012, 134, 14349-14352

Gutsulyak, D. V.; Piers, W. E.; Borau-Garcia, J.; Parvez, M., *J. Am. Chem. Soc.* 2013, 135, 11776-11779

Hapke, M.; Hilt, G., *Cobalt Catalysis in Organic Synthesis: Methods and Reactions*, Wiley, 2020

Harris, C. F.; Bayless, M. B.; van Leest, N. P.; Bruch, Q. J.; Livesay, B. N.; Bacsa, J.; Hardcastle, K. I.; Shores, M. P.; de Bruin, B.; Soper, J. D., *Inorg. Chem.* 2017, 56, 12421-12435

Harris, C. F.; Kuehner, C. S.; Bacsa, J.; Soper, J. D., *Angew. Chem. Int. Ed.* 2018, 57, 1311-1315

Hartwig, J. F., *Organotransition Metal Chemistry: From Bonding to Catalysis, University Science Books*, 2010

Holland, P. L., *Chem* 2017, 2, 443-444

Jiang, Y.; Gendy, C.; Roesler, R., *Organometallics* 2018, 37, 1123-1132

Jennerjahn, R.; Jackstell, R.; Piras, I.; Franke, R.; Jiao, H.; Bauer, M.; Beller, M., *ChemSusChem* 2012, 5, 734-739

Jones, W. D., *Acc. Chem. Res.* 2003, 36, 140-146

Junge, K.; Papa, V.; Beller, M., *Chem. Eur. J.* 2019, 25, 122-143

Kapat, A.; Sperger, T.; Guven, S.; Schoenebeck, F., *Science* 2019, 363, 391

Kaplan, H. Z.; Li, B.; Byers, J. A., *Organometallics* 2012, 31, 7343-7350

Katsnelson, A., *Nat. Med.* (N.Y., NY, U.S.) 2013, 19, 656-656

Kim, D.; Pillon, G.; DiPrimio, D. J.; Holland, P. L., *J. Am. Chem. Soc.* 2021, 143, 3070-3074

Kumar, A.; Zhou, T.; Emge, T. J.; Mironov, O; Saxton, R. J.; Krogh-Jespersen, K.; Goldman, A. S., *J. Am. Chem. Soc.* 2015, 137, 9894-9911

Langer, R.; Diskin-Posner, Y.; Leitus, G.; Shimon, L. J. W.; Ben-David, Y.; Milstein, D., *Angew. Chem. Int. Ed.* 2011a, 50, 9948-9952

Langer, R.; Leitus, G.; Ben-David, Y.; Milstein, D., *Angew. Chem. Int. Ed.* 2011b, 50, 2120-2124

Larionov, E.; Li, H.; Mazet, C., *Chem. Commun.* 2014, 50, 9816-9826

Larsen, C. R.; Grotjahn, D. B., *J. Am. Chem. Soc.* 2012, 134, 10357-10360

Larsen, C. R.; Erdogan, G.; Grotjahn, D. B., *J. Am. Chem. Soc.* 2014, 136, 1226-1229

Lenges, C. P.; White, P. S.; Marshall, W. J.; Brookhart, M., *Organometallics* 2000, 19, 1247-1254

Li, G.; Kuo, J. L.; Han, A.; Abuyuan, J. M.; Young, L. C.; Norton, J. R.; Palmer, J. H., *J. Am. Chem. Soc.* 2016, 138, 7698-7704

Liu, W.; Ackermann, L., *ACS Catal.* 2016, 6, 3743-3752

Liu, X.; Li, B.; Liu, Q., *Synthesis* 2019, 51, 1293-1310

Ludwig, J. R.; Schindler, C. S., *Chem* 2017, 2, 313-316

Lutz, S. A.; Hickey, A. K.; Gao, Y.; Chen, C.-H.; Smith, J. M., *J. Am. Chem. Soc.* 2020

Mahrwald, R., *Modern Aldol Reactions*, Wiley-VCH Verlag GmbH & Co, Weinheim, Germany, 2008

Manna, C. M.; Kaplan, H. Z.; Li, B.; Byers, J. A., *Polyhedron* 2014, 84, 160-167

Massad, I.; Marek, I., *ACS Catal.* 2020, 10, 5793-5804

Massad, I.; Sommer, H.; Marek, I., *Angew. Chem. Int. Ed.* 2020, 59, 15549-15553

Mayer, M.; Welther, A.; Jacobi von Wangelin, A., *ChemCatChem* 2011, 3, 1567-1571

Miyaura, N.; Suzuki, A., *Chem. Rev.* 1995, 95, 2457-2483

Mokhtarzadeh, C. C.; Margulieux, G. W.; Carpenter, A. E.; Weidemann, N.; Moore, C. E.; Rheingold, A. L.; Figueroa, J. S., *Inorg. Chem.* 2015, 54, 5579-5587

Molloy, J. J.; Morack, T.; Gilmour, R., *Angew. Chem. Int. Ed.* 2019, 58, 13654-13664

Morris, R. H., *Dalton Trans.* 2018, 47, 10809-10826

Mukherjee, A.; Milstein, D., *ACS Catal.* 2018, 8, 11435-11469

Nakamura, E.; Sato, K., *Nat. Mater.* 2011, 10, 158-161

Obligacion, J. V.; Neely, J. M.; Yazdani, A. N.; Pappas, I.; Chirik, P. J., *J. Am. Chem. Soc.* 2015, 137, 5855-5858

Palmer, W. N.; Chirik, P. J., *ACS Catal.* 2017, 7, 5674-5678

Parkin, G., *Journal of Labelled Compounds and Radiopharmaceuticals* 2007, 50, 1088-1114

Peruzzini, M.; Poli, R., (Edt.), Elsevier, Amsterdam, 2001, pp. 1-578

Plikhta, A.; Pothig, A.; Herdtweck, E.; Rieger, B., *Inorg. Chem.* 2015, 54, 9517-9528

Pony Yu, R.; Hesk, D.; Rivera, N.; Pelczer, I.; Chirik, P. J., *Nature* 2016, 529, 195-199

Pospech, J.; Fleischer, I.; Franke, R.; Buchholz, S.; Beller, M., *Angew. Chem. Int. Ed.* 2013, 52, 2852-2872

Prechtl, M. H. G.; Hölscher, M.; Ben-David, Y.; Theyssen, N.; Loschen, R.; Milstein, D.; Leitner, W., *Angew. Chem. Int. Ed.* 2007, 46, 2269-2272

Rivada-Wheelaghan, O.; Chakraborty, S.; Shimon, L. J. W.; Ben-David, Y.; Milstein, D., *Angew. Chem. Int. Ed.* 2016, 55, 6942-6945

Schild, D. J.; Peters, J. C., *ACS Catal.* 2019, 9, 4286-4295

Steinke, T.; Shaw, B. K.; Jong, H.; Patrick, B. O.; Fryzuk, M. D.; Green, J. C., *J. Am. Chem. Soc.* 2009, 131, 10461-10466

Sternberg, H. W.; Markby, R.; Wender, I., *J. Am. Chem. Soc.* 1956, 78, 5704-5705

Sternberg, H. W.; Markby, R.; Wender, I., *J. Am. Chem. Soc.* 1957, 79, 6116-6121

Subramaniyan, V.; Dutta, B.; Govindaraj, A.; Mani, G., *Dalton Trans.* 2019, 48, 7203-7210

Sung, S.; Wang, Q.; Krämer, T.; Young, R. D., *Chem. Sci* 2018, 9, 8234-8241

Suzuki, A., *Angew. Chem. Int. Ed.* 2011, 50, 6722-6737

Tooley, P. A.; Arndt, L. W.; Darensbourg, M. Y., *J. Am. Chem. Soc.* 1985, 107, 2422-2427

Wang, D.; Astruc, D., *Chem. Rev.* 2015, 115, 6621-6686

Wang, Y.; Qin, C.; Jia, X.; Leng, X.; Huang, Z., *Angew. Chem. Int. Ed.* 2017, 56, 1614-1618

Wen, H.; Liu, G.; Huang, Z., *Coord. Chem. Rev.* 2019, 386, 138-153

Wiedner, E. S.; Chambers, M. B.; Pitman, C. L.; Bullock, R. M.; Miller, A. J. M.; Appel, A. M., *Chem. Rev.* 2016, 116, 8655-8692

Yang, H.; Zarate, C.; Palmer, W. N.; Rivera, N.; Hesk, D.; Chirik, P. J., *ACS Catal.* 2018, 8, 10210-10218

Yu, Y.; Sadique, A. R.; Smith, J. M.; Dugan, T. R.; Cowley, R. E.; Brennessel, W. W.; Flaschenriem, C. J.; Bill, E.; Cundari, T. R.; Holland, P. L., *J. Am. Chem. Soc.* 2008, 130, 6624-6638

Yu, R. P.; Darmon, J. M.; Semproni, S. P.; Turner, Z. R.; Chirik, P. J., *Organometallics* 2017, 36, 4341-4343

Yu, X.; Zhao, H.; Li, P.; Koh, M. J., *J. Am. Chem. Soc.* 2020, 142, 18223-18230

Zarate, C.; Yang, H.; Bezdek, M. J.; Hesk, D.; Chirik, P. J., *J. Am. Chem. Soc.* 2019, 141, 5034-5044

Zhang, J.; Zhang, S.; Gogula, T.; Zou, H., *ACS Catal.* 2020, 7486-7494

What is claimed is:

1. A metal complex of formula I:

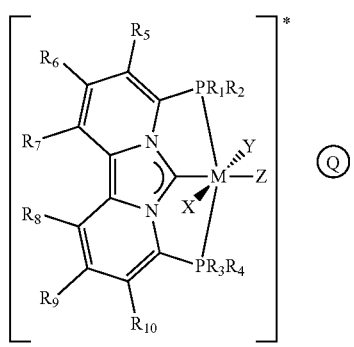

wherein:

$R_1$, $R_2$, $R_3$, and $R_4$ each independently is selected from the group consisting of $(C_1-C_{18})$alkyl, $(C_2-C_{18})$alkenyl, $(C_3-C_7)$cycloalkyl, —O—$(C_1-C_{18})$alkyl, $(C_3-C_{12})$heterocyclyl, a 6-14-membered aryl, and a 5-10-membered heteroaryl; or $R_1$ and $R_2$, and/or $R_3$ and $R_4$, together with the phosphorus atom to which they are attached form a heterocyclic ring optionally containing one or more heteroatoms selected from the group consisting of O, N, and S;

$R_5$, $R_6$, $R_7$, $R_8$, $R_9$, and $R_{10}$ each independently is selected from the group consisting of H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, —$CF_3$, —OR, —SR, and —NRR', or any two of adjacent $R_5$, $R_6$, $R_7$, $R_8$, $R_9$, and $R_{10}$ together with the carbon atoms to which they are attached form a 5-14-membered ring optionally containing one or more heteroatoms selected from the group consisting of O, N, and S;

M is an earth-abundant metal having an oxidation state selected from the group consisting of −2, −1, 0, +1, +2, +3, +4, +5, and +6;

X, Y and Z each independently is selected from the group consisting of H, deuterium (D), tritium (T), $N_2$, CO, NO, $N_2O$, $(C_1-C_{18})$alkyl, $(C_2-C_{18})$alkenyl, $(C_3-C_7)$cycloalkyl, —O—$(C_1-C_{18})$alkyl, $(C_3-C_{12})$heterocyclyl, a 6-14-membered aryl, a 5-10-membered heteroaryl, halogen, azide ($N_3^-$), cyanide ($CN^-$), cyanate ($OCN^-$), isocyanide (RNC), isocyanate (RNCO), thiocyanate ($SCN^-$), isothiocyanate (RNCS), sulfide ($S^{2-}$), oxo ($O^{2-}$), peroxo (R—O—O), hydroperoxo (H—O—O$^-$), superoxide ($O_2^-$), —NRR', —SR, and a coordinating solvent; or one of X, Y and Z is selected from the group consisting of H, D and T, and the other two of X, Y and Z form a bidentate ligand;

R and R' each independently is selected from the group consisting of H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, and a trialkylsilyl;

Q is an optional counter ion; and the asterisk represents an optional net charge of said metal complex which depends on the oxidation state of said metal and the groups X, Y and Z, provided that at least one of X, Y and Z each independently is selected from the group consisting of H, D, and T.

2. The metal complex of claim 1, wherein:

(i) $R_1$, $R_2$, $R_3$, and $R_4$ each independently is selected from the group consisting of $(C_1-C_8)$alkyl, $(C_3-C_6)$cycloalkyl, and a 6-10-membered aryl; or (ii) $R_5$, $R_6$, $R_7$, $R_8$, $R_9$, and $R_{10}$ each independently is H or $(C_1-C_8)$alkyl, or any two of adjacent $R_5$, $R_6$, $R_7$, $R_8$, $R_9$, and $R_{10}$ together with the carbon atoms to which they are attached form a 5-10-membered ring optionally containing one or more heteroatoms selected from the group consisting of O, N and S; or (iii) X, Y and Z each independently is selected from the group consisting of H, D, T, $N_2$, and CO; or one of X, Y and Z is selected from the group consisting of H, D and T, and the other two of X, Y and Z form a bidentate ligand; or (iv) M is selected from the group consisting of Fe, Mn, Ni, and Co, having an oxidation state selected from −2, −1, 0, +1, +2, and +3.

3. The metal complex of claim 2, wherein:

(i) $R_1$, $R_2$, $R_3$, and $R_4$ each independently is a branched $(C_1-C_6)$alkyl; or (ii) $R_5$, $R_7$, $R_8$, and $R_{10}$ each is H.

4. The metal complex of claim 3, wherein $R_1$, $R_2$, $R_3$, $R_4$ $R_6$, and $R_9$ each is isopropyl or tert-butyl.

5. The metal complex of claim 1, wherein:

$R_1$, $R_2$, $R_3$, and $R_4$ each independently is selected from the group consisting of $(C_1-C_8)$alkyl, $(C_3-C_6)$cycloalkyl, and a 6-10-membered aryl;

$R_5$, $R_6$, $R_7$, $R_8$, $R_9$, and $R_{10}$ each independently is H or $(C_1-C_5)$alkyl, or any two of adjacent $R_5$, $R_6$, $R_7$, $R_8$, $R_9$, and $R_{10}$ together with the carbon atoms to which they are attached form a 5-10-membered ring optionally containing one or more heteroatoms selected from the group consisting of O, N, and S;

X, Y and Z each independently is selected from the group consisting of H, D, T, $N_2$, and CO, or one of X, Y and Z is selected from the group consisting of H, D and T, and the other two of X, Y and Z form a bidentate ligand; and M is selected from the group consisting of Fe, Mn, Ni, and Co, having an oxidation state selected from −2, −1, 0, +1, +2, and +3.

6. The metal complex of claim 5, wherein $R_1$, $R_2$, $R_3$, and $R_4$ each independently is a branched $(C_1-C_6)$alkyl; and $R_5$, $R_7$, $R_8$, and $R_{10}$ each is H.

7. The metal complex of claim 6, wherein $R_1$, $R_2$, $R_3$, $R_4$, $R_6$, and $R_9$ each is isopropyl or tert-butyl.

8. The metal complex of claim 7, wherein;
(i) $R_1$, $R_2$, $R_3$, and $R_4$ each is isopropyl; and $R_6$ and $R_9$ each is tert-butyl; and/or
(ii) M is selected from the group consisting of Fe, Co, and Mn.

9. The metal complex of claim 8, wherein $R_1$, $R_2$, $R_3$, and $R_4$ each is isopropyl; $R_5$, $R_7$, $R_8$, and $R_{10}$ each is H; $R_6$ and $R_9$ each is tert-butyl; and:
(i) X and Y each is H or D; Z is $N_2$; and M is Fe having an oxidation state of +2 (herein identified complex $I_1$ or $I_2$, respectively);
(ii) X and Z each is CO; Y is H or D; and M is Mn having an oxidation state of +1 (herein identified complex $I_3$ or $I_4$, respectively);
(iii) X, Y and Z each is H or D; and M is Fe having an oxidation state of +2 (herein identified complex $I_5$ or $I_6$, respectively);
(i) one of X, Y and Z is H or D; the other two of X, Y and Z form the bidentate ligand $\eta^2$-$H_2$Bpin; and M is Fe having an oxidation state of +2 (herein identified complex $I_7$ or $I_8$, respectively); or
(ii) one of X, Y and Z is H or D; the other two of X, Y and Z form the bidentate ligand $\eta^2$-$H_2BH_2$; and M is Fe having an oxidation state of +2 (herein identified complex $I_9$ or $I_{10}$, respectively).

10. A metal complex of formula II:

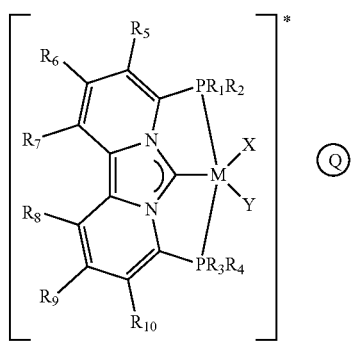

II wherein:
$R_1$, $R_2$, $R_3$, and $R_4$ each independently is selected from the group consisting of $(C_1-C_{18})$alkyl, $(C_2-C_{18})$alkenyl, $(C_3-C_7)$cycloalkyl, —O—$(C_1-C_{18})$alkyl, $(C_3-C_{12})$heterocyclyl, a 6-14-membered aryl, and a 5-10 membered heteroaryl; or $R_1$ and $R_2$, and/or $R_3$ and $R_4$, together with the phosphorus atom to which they are attached form a heterocyclic ring optionally containing one or more heteroatoms selected from the group consisting of O, N, or and S;
$R_5$, $R_6$, $R_7$, $R_8$, $R_9$, and $R_{10}$ each independently is selected from the group consisting of H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, —$CF_3$, —OR, —SR, and —NRR', or any two of adjacent $R_5$, $R_6$, $R_7$, $R_8$, $R_9$, and $R_{10}$ together with the carbon atoms to which they are attached form a 5-14-membered ring optionally containing one or more heteroatoms each independently selected from the group consisting of O, N or and S;
M is an earth-abundant metal having an oxidation state selected from the group consisting of –2, –1, 0, +1, +2, +3, +4, +5, and +6;
X and Y each independently is selected from the group consisting of H, deuterium (D), tritium (T), $N_2$, CO, NO, $N_2O$, $(C_1-C_{18})$alkyl, $(C_2-C_{18})$alkenyl, $(C_3-C_7)$cycloalkyl, —O—$(C_1-C_{18})$alkyl, $(C_3-C_{12})$heterocyclyl, a 6-14-membered aryl, a 5-10-membered heteroaryl, halogen, azide ($N_3^-$), cyanide ($CN^-$), cyanate ($OCN^-$), isocyanide (RNC), isocyanate (RNCO), thiocyanate ($SCN^-$), isothiocyanate (RNCS), sulfide ($S^{2-}$), oxo ($O^{2-}$), peroxo (R—O—O), hydroperoxo (H—O—$O^-$), superoxide ($O_2^-$), —NRR', —SR, and a coordinating solvent; or X and Y form a bidentate ligand;
R and R' each independently is selected from the group consisting of H, $(C_1-C_{18})$alkyl, $(C_2-C_{18})$alkenyl, $(C_3-C_7)$cycloalkyl, $(C_3-C_{12})$heterocyclyl, a 6-14-membered aryl, a 5-10-membered heteroaryl, and a trialkylsilyl;
Q is an optional counter ion; and
the asterisk represents an optional net charge of said metal complex which depends on the oxidation state of said metal and the groups X and Y.

11. The metal complex of claim 10, wherein:
(i) $R_1$, $R_2$, $R_3$, and $R_4$ each independently is selected from the group consisting of $(C_1-C_8)$alkyl, $(C_3-C_6)$cycloalkyl, and a 6-10-membered aryl; or
(ii) $R_5$, $R_6$, $R_7$, $R_8$, $R_9$, and $R_{10}$ each independently is H or $(C_1-C_8)$alkyl, or any two of adjacent $R_5$, $R_6$, $R_7$, $R_8$, $R_9$, and $R_{10}$ together with the carbon atoms to which they are attached to form a 5-10-membered ring optionally containing one or more heteroatoms selected from the group consisting of O, N and S;
(iii) X and Y each independently is a halogen, CO, NO, $N_2O$, H, D, $N_2$, $(C_1-C_8)$alkyl, $(C_3-C_7)$cycloalkyl, $(C_3-C_{12})$heterocyclyl, a 6-14-membered aryl, or a 5-10-membered heteroaryl; or
(iv) M is selected from the group consisting of Fe, Mn, Ni, and Co, having an oxidation state selected from the group consisting of –2, –1, 0, +1, +2, and +3.

12. The metal complex of claim 11, wherein:
(i) $R_1$, $R_2$, $R_3$, and $R_4$ each independently is a branched $(C_1-C_6)$alkyl; or
(ii) wherein $R_5$, $R_7$, $R_8$, and $R_{10}$ each is H.

13. The metal complex of claim 12, wherein $R_1$, $R_2$, $R_3$, $R_4$, $R_6$, and $R_9$ each is isopropyl or tert-butyl.

14. The metal complex of claim 10, wherein:
$R_1$, $R_2$, $R_3$, and $R_4$ each independently is selected from the group consisting of $(C_1-C_8)$alkyl, $(C_3-C_6)$cycloalkyl, and a 6-10-membered aryl;
$R_5$, $R_6$, $R_7$, $R_8$, $R_9$, and $R_{10}$ each independently is H or $(C_1-C_8)$alkyl, or any two of adjacent $R_5$, $R_6$, $R_7$, $R_8$, $R_9$, and $R_{10}$ together with the carbon atoms to which they are attached to form a 5-10-membered ring optionally containing one or more heteroatoms selected from the group consisting of O, N and S;
X and Y each independently is a halogen, CO, NO, $N_2O$, H, D, $N_2$, $(C_1-C_8)$alkyl, $(C_3-C_7)$cycloalkyl, $(C_3-C_{12})$heterocyclyl, a 6-14-membered aryl, or a 5-10-membered heteroaryl; and
M is selected from the group consisting of Fe, Mn, Ni, and Co, having an oxidation state selected from –2, –1, 0, +1, +2, and +3.

15. The metal complex of claim 14, wherein $R_1$, $R_2$, $R_3$, and $R_4$ each independently is a branched $(C_1-C_6)$alkyl; and $R_5$, $R_7$, $R_8$, and $R_{10}$ each is H.

16. The metal complex of claim 15, wherein $R_1$, $R_2$, $R_3$, and —$R_4$, $R_6$ and R each is isopropyl or tert-butyl $R_1$, $R_2$, $R_3$, and $R_4$ each is isopropyl; and $R_6$ and $R_9$ each is tert-butyl.

17. The metal complex of claim 16, wherein:
(i) $R_1$, $R_2$, $R_3$, and $R_4$ each is isopropyl; and $R_6$ and $R_9$ each is tert-butyl; and/or
(ii) M is selected from the group consisting of Fe, Co, and Mn.

18. The metal complex of claim 17, wherein $R_1$, $R_2$, $R_3$, and $R_4$ each is isopropyl; $R_5$, $R_7$, $R_8$, and $R_{10}$ each is H; $R_6$ and $R_9$ each is tert-butyl; and
(i) X and Y each is $C_1$; and M is Fe having an oxidation state of +2 (herein identified complex II$_1$);
(ii) X and Y each is $N_2$; and M is Fe having an oxidation state of 0 (herein identified complex II$_2$);
(iii) X is H; Y is $N_2$; and M is Fe having an oxidation state of 0 (herein identified complex II$_3$);
(iv) X and Y each independently is p-toluene; and M is Fe having an oxidation state of +2 (herein identified complex II$_4$); or
(v) X is $C_1$ or Br; Y is p-toluene; and M is Fe having an oxidation state of +2 (herein identified complex II$_5$ or II$_6$, respectively).

19. A composition comprising a metal complex according to claim 1.

20. A method for hydrogen isotope exchange (HIE) of $C(sp^3)$-H and/or $C(sp^2)$-H bond in an organic compound such as a pharmaceutically active compound, to thereby replace the hydrogen atom in said $C(sp^3)$-H bond and/or said $C(sp^2)$-H bond with either deuterium or tritium, said method comprising reacting said organic compound with a metal complex according to claim 1, in the presence of a deuterium or tritium source, respectively,
wherein said organic compound being optionally substituted with a group selected from the group consisting of halogen, pseudo-halogen, —OR, —SR, —NRR', —B(OR)$_2$, —BR$_2$—SiR$_3$, —Si(OR)$_3$, —CO—O—R—, —O—CO—R—, —CO—NRR', =O, =S, —CHO, —CO—SR, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, and a 5-10-membered heteroaryl, wherein R and R' each independently is selected from the group consisting of H, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, and a 5-10-membered heteroaryl.

21. The method of claim 20, wherein:
(i) said organic compound is an aromatic or heteroaromatic compound, or (C$_2$-C$_{20}$)alkene; or
(ii) said organic compound is (C$_1$-C$_{20}$)alkane.

22. The method of claim 21, wherein:
(i) said organic compound is an aromatic or heteroaromatic compound, or (C$_2$-C$_{20}$)alkene; and said method is for HIE of $C(sp^2)$-H bond in said organic compound; or
(ii) said organic compound is (C$_1$-C$_{20}$)alkane; and said method is for HIE of $C(sp^3)$-H bond in said organic compound.

23. The method of claim 20, wherein said deuterium source is a deuterated organic compound selected from the group consisting of benzene-d$_6$, chloroform-d, or acetone-d$_6$, deuterium oxide (D$_2$O), deuterium gas (D$_2$), and a mixture thereof; or said tritium source is tritiated benzene, or tritium gas (T$_2$).

24. The method of claim 23, wherein said deuterium source is deuterium gas or said tritium source is tritium gas, and said gas is introduced to the reaction at a pressure of up to about 10 bar.

25. The method of claim 20, carried out at a temperature of from −40° C. to about 100° C.; and/or in the presence of a polar- or non-polar solvent.

26. The method of claim 25, wherein said polar solvent is an aprotic solvent selected from the group consisting of acetone, dichloromethane, tetrahydrofuran, dimethyl sulfoxide, and acetonitrile, or a protic solvent selected from the group consisting of water, methanol, and acetic acid; and said non-polar solvent is selected from the group consisting of pentane, hexane, cyclohexane, diethylether, chloroform, carbon tetrachloride, benzene, and toluene.

27. A method of isomerization of a 1-alkene to 2-alkene, comprising reacting said 1-alkene with a metal complex according to claim 10, in a solvent,
wherein said alkene being optionally substituted with one or more substituents each independently selected from the group consisting of (C$_1$-C$_{18}$)alkyl, (C$_2$-C$_{18}$)alkenyl, (C$_3$-C$_7$)cycloalkyl, halogen, —OR, —SR, —NRR', —B(OR)$_2$, —BR$_2$—SiR$_3$, —Si(OR)$_3$—CHO, —O—CO—R, —CO—O—R, —CO—NRR', —NR—CO—R, =O, =S, (C$_3$-C$_{12}$)heterocyclyl, a 6-14-membered aryl, a 5-10-membered heteroaryl, and an electron withdrawing group; and R and R' each independently selected from the group consisting of H, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, a 5-10-membered heteroaryl, and a trialkylsilyl.

28. The method of claim 27, wherein said solvent is selected from the group consisting of benzene, toluene, acetonitrile, propionitrile, benzonitrile, tetrahydrofuran, 2-methyltetrahydrofuran, acetone, 1,4-dioxane, diethyl ether, nitromethane, propylene carbonate, benzene, fluorobenzene, hexafluorobenzene, difluorobenzene, chlorobenzene, hexane, pentane, heptane, neo-pentane, dimethylformamide, ethylacetate, and dimethylsulfoxide.

29. The method of claim 27, wherein:
(i) one of X and Y is H, D, or T; and/or
(ii) said method is carried out at a temperature from about 20° C. to about 120° C.

30. A method for isomerization of an alkene substituted at a terminal position thereof with an aryl to thereby perform double bond migration by one or more positions towards said aryl, said method comprising reacting said alkene with a metal complex according to claim 10, in a solvent,
wherein said alkene and said aryl each independently being optionally substituted with one or more substituents each independently selected from the group consisting of (C$_1$-C$_{18}$)alkyl, (C$_2$-C$_{18}$)alkenyl, (C$_3$-C$_7$)cycloalkyl, halogen, —OR, —SR, —NRR', —B(OR)$_2$, —BR$_2$—SiR$_3$, —Si(OR)$_3$, —CHO, —O—CO—R, —CO—O—R, —CO—NRR', —NR—CO—R, =O, =S, (C$_3$-C$_{12}$)heterocyclyl, a 6-14-membered aryl, a 5-10-membered heteroaryl, and an electron withdrawing group; and R and R' each independently selected from the group consisting of H, (C$_1$-C$_{18}$)alkyl, (C$_2$-C$_{18}$)alkenyl, (C$_3$-C$_7$)cycloalkyl, (C$_3$-C$_{12}$)heterocyclyl, a 6-14-membered aryl, a 5-10-membered heteroaryl, and a trialkylsilyl.

31. The method of claim 30, wherein said solvent is selected from the group consisting of benzene, toluene, acetonitrile, propionitrile, benzonitrile, tetrahydrofuran, 2-methyltetrahydrofuran, acetone, 1,4-dioxane, diethyl ether, nitromethane, propylene carbonate, benzene, fluorobenzene, hexafluorobenzene, difluorobenzene, chlorobenzene, hexane, pentane, heptane, neo-pentane, dimethylformamide, ethylacetate, and dimethylsulfoxide.

32. The method of claim 30, wherein:
(i) one of X and Y is H, D, or T; and/or
(ii) said method is carried out at a temperature from about 20° C. to about 120° C.

33. The metal complex of claim 1, wherein:
(i) M is selected from the group consisting of Fe, Mn, Ni, Co, Sc, Ti, V, Cr, Cu, Bi, and Zn; or
(ii) said coordinating solvent is selected from the group consisting of $H_2O$, $D_2O$, acetonitrile, propionitrile, benzonitrile, tetrahydrofuran, 2-methyltetrahydrofuran, acetone, 1,4-dioxane, diethyl ether, methanol, ethanol, isopropyl alcohol, n-butanol, nitromethane, propylene carbonate, benzene, dimethylformamide, and dimethylsulfoxide; or
(iii) said trialkylsilyl is trimethylsilyl; or
(iv) two of X, Y and Z, each independently is selected from the group consisting of H, D, and T.

34. The metal complex of claim 10, wherein:
(i) M is selected from the group consisting of Fe, Mn, Ni, Co, Sc, Ti, V, Cr, Cu, Bi, and Zn; or
(ii) said coordinating solvent is selected from the group consisting of $H_2O$, $D_2O$, acetonitrile, propionitrile, benzonitrile, tetrahydrofuran, 2-methyltetrahydrofuran, acetone, 1,4-dioxane, diethyl ether, methanol, ethanol, isopropyl alcohol, n-butanol, nitromethane, propylene carbonate, benzene, dimethylformamide, and dimethylsulfoxide; or
(iii) said trialkylsilyl is trimethylsilyl.

35. A composition comprising a metal complex according to claim 10.

\* \* \* \* \*